US012486310B2

(12) United States Patent
Mendoza et al.

(10) Patent No.: US 12,486,310 B2
(45) Date of Patent: Dec. 2, 2025

(54) METASTASIS INHIBITING PROTEIN

(71) Applicant: Brigham Young University, Provo, UT (US)

(72) Inventors: Christopher Mendoza, Provo, UT (US); Dario Mizrachi, Springville, UT (US)

(73) Assignee: BRIGHAM YOUNG UNIVERSITY, Provo, UT (US)

( * ) Notice: Subject to any disclaimer, the term of this patent is extended or adjusted under 35 U.S.C. 154(b) by 0 days.

(21) Appl. No.: 17/660,209

(22) Filed: Apr. 21, 2022

(65) Prior Publication Data

US 2023/0121248 A1    Apr. 20, 2023

Related U.S. Application Data

(60) Provisional application No. 63/296,322, filed on Jan. 4, 2022, provisional application No. 63/274,788, filed on Nov. 2, 2021, provisional application No. 63/177,703, filed on Apr. 21, 2021.

(51) Int. Cl.
*C07K 14/705* (2006.01)
*A61P 35/00* (2006.01)

(52) U.S. Cl.
CPC ............ *C07K 14/705* (2013.01); *A61P 35/00* (2018.01); *C07K 2319/02* (2013.01); *C07K 2319/74* (2013.01)

(58) Field of Classification Search
CPC ............. C07K 14/705; C07K 2319/02; C07K 2319/74; C07K 14/70596; A61P 35/00; C12N 15/62
See application file for complete search history.

(56) References Cited

U.S. PATENT DOCUMENTS

2020/0246420 A1    8/2020   Reshetnyak et al.

FOREIGN PATENT DOCUMENTS

| WO | 2021016174 A1 | 1/2021 | |
| WO | WO-2021093881 A1 * | 5/2021 | ............ A61K 35/17 |

OTHER PUBLICATIONS

Cambridge English Dictionary, definition of correspond, accessed on Mar. 14, 2024.*
Google Translation of WO2021093881 A1, accessed on Dec. 8, 2024. (Year: 2021).*
Chrystelle Lamagna, Dual Interaction of JAM-C with JAM-B and a B Integrin: Function in Junctional Complexes and Leukocyte Adhesion, molecular Biology of the Cell vol. 16, No. 10, 2005. (Year: 2005).*
Drent, E., Groen, R. W., Noort, W. A., Themeli, M., Lammerts van Bueren, J. J., Parren, P. W., Kuball, J., Sebestyen, Z., Yuan, H., de Bruijn, J., van de Donk, N: w., Martens, A. C., Lokhorst, H. M., & Mutis, T. (2016). Pre-clinical evaluation of CD38 chimeric antigen receptor engineered T cells for the treatment of multiple myeloma. Haematologica, 101 (5), 616-625. https://doi.org/10.3324/haematol. 2015 .137620.
Maude, S. L., Teachey, D. T., Porter, D. L., & Grupp, S. A. (2015). CD19-targeted chimeric antigen receptor T-cell therapy for acute lymphoblastic leukemia. Blood, 125(26), 4017-4023. https://doi.org/10.1182/blood-2014-12-580068.
(Mendoza, C et al.) Molecular Characterization of the Extracellular Domain of Human Junctional Adhesion Proteins. International Journal of Molecular Sciences. Mar. 27, 2021, vol. 22, No. 3482; pp. 1-13; abstract; p. 9, 4th paragraph; DOI: 10.3390/ijms22073482.
Tapmeier, T.T.; Moshnikova, A.; Beech, J.; Allen, D.; Kinchesh, P.; Smart, S.; Harris, A.; McIntyre, A.; Engelman, D.M.; Andreev, O.A.; et al. The pH low insertion peptide pHLIP Variant 3 as a novel marker of acidic malignant lesions. Proc. Natl. Acad. Sci. USA 2015, 112, 9710-9715.
Baghban, R., et al., "Tumor microenvironment complexity and therapeutic implications at a glance," Cell Communication and Signaling, 2020, 19 pages, 18, 59, BioMed Central, UK.
Shimono, Y., et al., "Immunoglobulin superfamily receptors and adherens junctions," Subcellular Biochemistry, 2012, pp. 137-170, 60, Springer Science+Business Media, DE.
Verschueren, E., et al., "The immunoglobulin superfamily receptome defines cancer-relevant networks associated with clinical outcome," Cell, 2020, 329.e319-344.e319, 182, Cell Press, US.
Wong, W., et al., "The role of immunoglobulin superfamily cell adhesion molecules in cancer metastasis," International Journal of Cell Biology, 2012, 340296, 9 pages, Hindawi, UK.
Steinbacher, T., et al., "Junctional adhesion molecule-A: Functional diversity through molecular promiscuity," Cellular and Molecular Life Sciences, 2018, pp. 1393-1409, 75, Springer Science+Business Media, DE.
Ebnet, K., "Junctional Adhesion Molecules (JAMs): Cell adhesion receptors with pleiotropic functions and cell physiology and development," Physiological Reviews, 2017, pp. 1529-1554, 97, The American Physiological Society, US.
Mendoza, C., et al., "Molecular Characterization of the extracellular domain of human junctional adhesion proteins," International Journal of Molecular Sciences, 2021, 3482, 13 pages, 22, Multidisciplinary Digital Publishing Institute, CH.
Mendoza, C., et al., "Calcium regulates the interplay between the tight junction and epithelial adherens junction at the plasma membrane," FEBS Letters, 2021, pp. 219-231, 596, Wiley, US.
Li, J., "Context-dependent roles of claudins in tumorigenesis," Frontiers in Oncology, 2021, 676781, 17 pages, 11, Frontiers Media SA, CH.

(Continued)

*Primary Examiner* — Lianko G Garyu
*Assistant Examiner* — Erinne R Dabkowski
(74) *Attorney, Agent, or Firm* — Barnes & Thornburg LLP; Ryan L. Marshall

(57) ABSTRACT

Protein compositions for the treatment of cancer that concomitantly reduce metastasis are disclosed. The proteins include three functional domains for targeting cancer cells, promoting tumor cell adhesion, and signaling to CAR-T cells. Methods of using and making the proteins are also disclosed.

16 Claims, 15 Drawing Sheets
(5 of 15 Drawing Sheet(s) Filed in Color)

Specification includes a Sequence Listing.

(56) References Cited

OTHER PUBLICATIONS

Wang, Y., et al., "JAM-A knockdown accelerates the proliferation and migration of human keratinocytes, and improves wound healing in rats via FAK/Erk signaling," Cell Death Discovery, 2018, 848, 11 pages, 9, Nature Research, UK.

Tian, Y., et al., "Junctional adhesion molecule-A, an epithelial-mesenchymal transition inducer, correlates with metastasis and poor prognosis in human nasopharyngeal cancer," Carcinogenesis, 2015, pp. 41-48, 36, Oxford University Press, UK.

Turaga, S.M., et al., "JAM-A functions as a female microglial tumor suppressor in glioblastoma," Neuro-Oncology, 2020, pp. 1591-1601, 22, Oxford University Press, UK.

Lee, J.K., et al. "Systemic surfaceome profiling identifies target antigens for immune-based therapy in subtypes of advanced prostate cancer," Proceedings of the National Academy of Sciences of the United States of America, 2018, E4473E4482, 115, United States National Academy of Sciences, US.

Tedder, T.F., and Isaacs, C.M., "Isolation of cDNAs encodi.ing the CD19 antigen of human and mouse B lymphocytes. A new member of the immunoglobulin superfamily," Journal of Immunology, 1989, pp. 712-717, 143, American Association of Immunologists, US.

Nadler, L.M., "B4, a human B lymphocyte-associated antigen expressed on normal, mitogen-activated, and malignant B lymphocyte," Journal of Immunology, 1983, pp. 244-250, 131, American Association of Immunologists, US.

De Oliveira, S.N., et al., "A CD19/Fc fusion protein for detection for detection of anti-CD19 chimeric antigen receptors," Journal of Translational Medicine, 2013, 23, 9 pages, 11, BioMed Central, UK.

Neelapu, S.S., et al., "Axicabtagene Ciloleucel CAR T-Cell Therapy in Refractory Large B-Cell Lymphoma," New England Journal of Medicine, 2017, pp. 2531-2544, 377, Massachusetts Medical Society, US.

Roberts, Z.J., et al., "Axicabtagene ciloleucil, a first-in-class CAR T cell therapy for aggressive NHL," Leukemia and Lymphoma, 2018, pp. 1785-1796, 59, Informa, UK.

Chen, Y., et al., "CAR-macrophage: A new immunotherapy candidate against solid tumors," Biomedicine and Pharmacotherapy, 2021, 111605, 5 pages, 139, Elsevier, NL.

Marofi, F., et al., "CAR T cells in solid tumors: Challenges and opportunities," Stem Cell Research, 2021, 16 pages, 12, 81, Elsevier, NL.

George, K., and Woollett, G., "Insulins as drugs or biologics in the USA: What difference does it make and why does it matter?" BioDrugs, 2019, pp. 447-451, 33, Adis International, NZ.

Kow, C.S., and Hasan, SS., "Optimal time for the resumption of biologics after COVID-19," JAAD International, 2020, p. 189, 1, Elsevier, NL.

Dimitrov, D.S., "Therapeutic proteins," Methods in Molecular Biology, 2012, pp. 1-26, 899, Humana Press, Springer Science+Business Media, DE.

Su, Z., et al., "Understanding the targeting mechanisms of multi-specific biologics in immunotherapy with multiscale modeling," iScience, 2020, 101835, 12 pages, 23, Cell Press, US.

Glaesner, W., et al., "Engineering and characterization of the long-acting glucagon-like peptide-1 analogue LY2189265, an Fc fusion protein," Diabetes/Metabolism Research and Reviews, 2010, pp. 287-296, 26, Wiley, US.

Kratz, F., "Albumin as a drug carrier: Design of prodrugs, drug conjugates, and nanoparticles," Journal of Controlled Release, 2008, pp. 171-183, 132, Elsevier, DE.

Muttenthaler, M., et al., "Trends in peptide drug discovery," Nature Reviews Drug Discovery, 2021, pp. 309-325, 20, Nature Publishing Group, UK.

Schmidt, S.R., "Fusion-proteins as biopharmaceuticals—Applications and challenges," Current Opinion in Drug Discovery and Development, 2009, pp. 284-295, 12, Current Drugs, US.

Strohl, W.R., "Fusion proteins for half-life extension of biologics as a strategy to make biobetters," BioDrugs, 2015, pp. 215-239, 29, Adis International, NZ.

Ascierto, P.A., "Combination approaches and anti-PD1 therapies: The focus of new research at ESMO and SMR," Melanoma Management, 2015, pp. 9-14, 2, Future Medicine, UK.

Greenblatt, K., and Khaddour, K., "Trastuzumab," 2022, StatPearls, StatPearls Publishing, US.

Hinner, M.J., et al., "Tumor-localized costimulatory T-cell engagement by the 4-1BB/HER2 bispecific antibody-anticalin fusion PRS-343," Clinical Cancer Research, 2019, pp. 5878-5889, 25, American Association for Cancer Research, US.

Ambrose, C., et al., "Anti-CD19 CAR T cells potently redirected to kill solid tumor cells," PLoS One, 2021, e0247701, 28 pages, 16, Public Library of Science, US.

Martyniszyn, A., et al., "Bispecific CAR T Cells for the treatment of B-cell malignancies," Human Gene Therapy, 2017, pp. 1147-1157, 28, 12, Mary Ann Liebert, US.

Dai, H., et al., "Bispecific CAR-T cells targeting both CD19 and CD22 for therapy of adults with relapsed or refractory B cell acute lymphoblastic leukemia," Journal of Hematology and Oncology, 2020, 11 pages, 13, 30, BioMed Central, UK.

Ueda, T., et al., "In Vitro Differentiation of T Cell: From CAR-Modified T-iPSC," Methods in Molecular Biology, 2019, pp. 85-91, 2048, Humana Press, US.

Ackermann, M., et al., "Bioreactor-based mass production of human iPSC-derived macrophages enables immunotherapies against bacterial airway infections," Nature Communications, 2018, 5088, 13 pages, 9, NatureResearch, UK.

Zhu, H., et al., "Pluripotent stem cell-derived NK cells with high-affinity noncleavable CD16a mediate improved antitumor activity," Blood, 2020, pp. 399-410, 135, American Society of Hematology, US.

Musial-Siwek, M., et al., "Tuning the insertion properties of pHLIP," Biochimica et Biophysica Acta, 2010, pp. 1041-1046, 1798, Elsevier, DE.

Reshetnyak, Y.K., et al., "Energetics of peptide (pHLIP) binding to and folding across a lipid bilayer membrane," 2008, Proceedings of the National Academy of Sciences, pp. 15340-15345, 105, United States National Academy of Sciences, US.

An, M., et al., "pH-(low)-insertion-peptide (pHLIP) translocation of membrane impermeable phalloidin toxin inhibits cancer cell proliferation," Proceedings of the National Academy of Sciences, pp. 20246-20250, 107, United States National Academy of Sciences, US, Nov. 23, 2010.

Garcia, E., et al., "Inhibition of triple negative breast cancer metastasis and invasiveness by novel drugs that target epithelial to mesenchymal transition," Scientific Reports, 2021, 11757, 15 pages, 11, Nature Research, UK.

Wang, K., et al., "CD19: A biomarker for B cell development, lymphoma diagnosis and therapy," Experimental Hematology and Oncology, 2012, 36, 7 pages, 1, BioMed Central, UK.

Guo, Y., et al., "Efficiency and side effects of anti-CD38 CAR T cells in an adult patient with relapsed B-ALL after failure of bi-specific CD19/CD22 CAR T cell treatment," Cellular and Molecular Immunology, 2020, pp. 430-432, 17, Nature Research, UK.

Cordoba, S., et al., "CAR T cells with dual targeting of CD19 and CD22 in pediatric and young adult patients with relapsed or refractory B cell acute lymphoblastic leukemia: A phase 1 trial," Nature Medicine, 2021, pp. 1797-1805, 27, Nature Research, UK.

Wan, X., et al., "Outcomes of Anti-CD19 CAR-T treatment of pediatric B-all with bone marrow and extramedullary relapse," Cancer Research and Treatment, 2021, 19 pages, Epub ahead of print, Korean Cancer Assocation, KR.

Wang, Z., et al., "New development in CAR-T cell therapy," Journal of Hematology and Oncology, 2017, 53, 11 pages, 10, BioMed Central, UK.

Wei, J., et al., "Clinical development of CAR T cell therapy in China: 2020 Update," Cellular and Molecular Immunology, 2021, pp. 792-804, 18, Nature Research, UK.

Simmons, T.D., et al., "Changes in intracellular adp:Atp ratios as a marker of apoptosis," The Scientific World Journal, 2001, 58, 2 pages, 1, Hindawi, UK.

(56) References Cited

OTHER PUBLICATIONS

Chan, G.K., et al., "A simple high-content cell cycle assay reveals frequent discrepancies between cell number and ATP and MTS proliferation assays," PLos One, 2013, e63583, 15 pages, 8, Public Library of Science, US.

Dobson, E.T.A., et al., "ImageJ and cell profiler: Complements in open-source bioimage analysis," Current Protocols, 2021, e89, 19 pages, 1, Wiley, US.

Juanes, M.A., et al., "EB1 Directly regulates APC-mediated actin nucleation," Current Biology, 2020, 4763.e4768-4772.e4768, 30, Cell Press, US.

Petterson, E.F., et al., "UCSF Chimera—A visualization system for exploratory research and analysis," Journal of Computational Chemistry, 2004, pp. 1605-1612, 25, Wiley, US.

Petterson, E.F., et al., "UCSF ChimeraX: Structure visualization for researchers, educators, and developers," 2021, Protein Science, pp. 70-82, 30, Wiley, US.

Lobstein, J., et al., "Shuffle, a novel Escherichia coli protein expression strain capable of correctly folding disulfide bonded proteins in its cytoplasm," Microbial Cell Factories, 2012, 56, 16 pages, 11, BioMed Central, UK.

Ren, G., "Use of the shuffle strains in production of proteins," Current Protocols in Protein Science, 2016, pp. 5-26, 85, Wiley, US.

Martin, T.A., "The role of tight junctions in cancer metastasis," Seminars in Cell and Developmental Biology, 2014, pp. 224-231, 36, Elsevier, DE.

Bhat, A.A., et al., "Tight Junction Proteins and Signaling Pathways in Cancer and Inflammation: A Functional Crosstalk," Frontiers in Physiology, 2018, 1942, 19 pages, 9, Frontiers Media, CH.

Lauko, A., et al., "Junctional Adhesion Molecules in Cancer: A Paradigm for the Diverse Functions of Cell-Cell Interactions in Tumor Progression," 2020, Cancer Research, pp. 4878-4885, 80, American Association for Cancer Research, US.

Solimando, A.G., et al., "JAM-A as a prognostic factor and new therapeutic target in multiple myeloma," Leukemia, 2018, pp. 736-743, 32, Nature Publishing Group, UK.

Solimando, A.G., et al., "Halting the vicious cycle within the multiple myeloma ecosystem: Blocking Jam-A on bone marrow endothelial cells restores angiogenic homeostasis and suppresses tumor progression," Haematologica, 2021, pp. 1943-1956, 106, Ferrata Storti Foundation, IT.

Sachs, F., "Mechanical Transduction and the Dark Energy of Biology," Biophysical Journal, 2018, pp. 3-9, 114, Cell Press, US.

Nava, P., et al., "JAM-A regulates epithelial proliferation through Akt/beta-catenin signaling," EMBO Reports, 2011, pp. 314-320, 12, EMBO Press, DE.

Naik, M.U., et al., "Attenuation of junctional adhesion molecule-A is a contributing factor for breast cancer cell invasion," Cancer Research, 2008, pp. 2194-2203, 68, American Association for Cancer Research, US.

Bednarek, R., "Functional inhibition of F11 receptor (F11R/junctional adhesion molecule-A/JAM-A) activity by a F11R-derived peptide in breast cancer and its microenvironment," Breast Cancer Research and Treatment, 2020, pp. 325-335, 179, Spriger Netherlands, NL.

Magara, K., et al., "Elevated expression of JAM-A promotes neoplastic properties of lung adenocarcinoma," Cancer Science, 2017, pp. 2306-2314, 108, Wiley-Blackwell, US.

Janiszewska, M., et al., "Cell adhesion in cancer: Beyond the migration of single cells," Journal of Biological Chemistry, 2020, pp. 2495-2505, 295, American Society for Biochemistry and Molecular Biology, US.

Vleminckx, K., et al., "Genetic manipulation of E-cadherin expression by epithelial tumor cells reveals an invasion suppressor role," Cell, 1991, pp. 107-119, 66, Cell Press, US.

Shields, B.D., et al., "Loss of E-cadherin inhibits CD103 antitumor activity and reduces checkpoint blockade responsiveness in melanoma," Cancer Research, 2019, pp. 1113-1123, 79, American Association for Cancer Research, US.

Song, Y., et al., "Restoring E-cadherin expression by natural compounds for anticancer therapies in genital and urinary cancers," Molecular Therapy Oncolytics Therapy, 2019, pp. 130-138, 14, Elsevier, DE.

\* cited by examiner

Tumor

Tumor + CM19XA

Tumor + CM19XA
+ anti-CD19 CAR T cells

SEQUENCE LISTING

<160> NUMBER OF SEQ ID NOS: 10

<210> SEQ ID NO 1
<211> LENGTH: 6933
<212> TYPE: DNA
<213> ORGANISM: Artificial Sequence
<220> FEATURE:
<223> OTHER INFORMATION: Nucleic acid seqeunce for plasmid pET28a-
      CM19XA used in this stuy

<400> SEQUENCE: 1
actatatccg gattggcgaa tgggacgcgc cctgtagcgg cgcattaagc gcggcgggtg     60
tggtggttac gcgcagcgtg accgctacac ttgccagcgc cctagcgccc gctcctttcg    120

```
ctttcttccc ttcctttctc gccacgttcg ccggctttcc ccgtcaagct ctaaatcggg      180
ggctcccttt agggttccga tttagtgctt tacggcacct cgaccccaaa aaacttgatt      240
agggtgatgg ttcacgtagt gggccatcgc cctgatagac ggttttttcgc cctttgacgt     300 tggagtccac gttctttaat agtggactct tgttccaaac tggaacaaca ctcaacccta      360
tctcggtcta ttcttttgat ttataaggga ttttgccgat tcggcctat tggttaaaaa       420 atgagctgat ttaacaaaaa tttaacgcga attttaacaa aatattaacg cttacaattt      480
aggtggcact tttcggggaa atgtgcgcgg aacccctatt tgtttatttt tctaaataca      540
ttcaaatatg tatccgctca tgaattaatt cttagaaaaa ctcatcgagc atcaaatgaa      600
actgcaattt attcatatca ggattatcaa taccatattt ttgaaaaagc cgtttctgta      660
atgaaggaga aaactcaccg aggcagttcc ataggatggc aagatcctgg tatcggtctg      720
cgattccgac tcgtccaaca tcaatacaac ctattaattt cccctcgtca aaataaggt      780 tatcaagtga gaaatcacca tgagtgacga ctgaatccgg tgagaatggc aaaagtttat      840
gcatttcttt ccagacttgt tcaacaggcc agccattacg ctcgtcatca aaatcactcg      900
catcaaccaa accgttattc attcgtgatt gcgcctgagc gagacgaaat acgcgatcgc      960
tgttaaaagg acaattacaa acaggaatcg aatgcaaccg gcgcaggaac actgccagcg     1020
catcaacaat attttcacct gaatcaggat attcttctaa tacctggaat gctgttttcc     1080
cggggatcgc agtggtgagt aaccatgcat catcaggagt acgataaaa tgcttgatgg      1140 tcggaagagg cataaattcc gtcagccagt ttagtctgac catctcatct gtaacatcat     1200
tggcaacgct acctttgcca tgtttcagaa acaactctgg cgcatcgggc ttcccataca     1260
atcgatagat tgtcgcacct gattgcccga cattatcgcg agcccattta tacccatata     1320
aatcagcatc catgttggaa tttaatcgcg gcctagcaga agacgtttcc cgttgaatat     1380
ggctcataac ccccttgta ttactgttta tgtaagcaga cagttttatt gttcatgacc      1440
aaaatccctt aacgtgagtt ttcgttccac tgagcgtcag accccgtaga aaagatcaaa     1500
ggatcttctt gagatccttt ttttctgcgc gtaatctgct gcttgcaaac aaaaaaacca     1560
ccgctaccag cggtggtttg tttgccggat caagagctac caactctttt tccgaaggta     1620
actggcttca gcagagcgca gataccaaat actgtccttc tagtgtagcc gtagttaggc     1680
caccacttca agaactctgt agcaccgcct acatacctcg ctctgctaat cctgttacca     1740
gtggctgctg ccagtggcga taagtcgtgt cttaccgggt tggactcaag acgatagtta     1800
ccggataagc gcagcggtc gggctgaacg gggggttcgt gcacacagcc cagcttggag      1860
cgaacgacct acaccgaact gagataccta cagcgtgagc tatgagaaag cgccacgctt     1920
cccgaaggga gaaaggcgga caggtatccg gtaagcggca gggtcggaac aggagagcgc     1980
acgagggagc ttccagggg aaacgcctgg tatctttata gtcctgtcgg gtttcgccac      2040
ctctgacttg agcgtcgatt tttgtgatgc tcgtcagggg ggcggagcct atggaaaaac     2100
gccagcaacg cggccttttt acggttcctg gccttttgct ggccttttgc tcacatgttc     2160
tttcctgcgt tatcccctga ttctgtggat aaccgtatta ccgcctttga gtgagctgat     2220
accgctcgcc gcagccgaac gaccgagcgc agcgagtcag tgagcgagga agcggaagag     2280
cgcctgatgc ggtattttct ccttacgcat ctgtgcggta tttcacaccg caatggtgca     2340
ctctcagtac aatctgctct gatgccgcat agttaagcca gtatacactc cgctatcgct     2400
acgtgactgg gtcatggctg cgccccgaca cccgccaaca cccgctgacg cgccctgacg     2460
```

-continued

```
ggcttgtctg ctcccggcat ccgcttacag acaagctgtg accgtctccg ggagctgcat    2520
gtgtcagagg ttttcaccgt catcaccgaa acgcgcgagg cagctgcggt aaagctcatc    2580
agcgtggtcg tgaagcgatt cacagatgtc tgcctgttca tccgcgtcca gctcgttgag    2640
tttctccaga agcgttaatg tctggcttct gataaagcgg gccatgttaa gggcggtttt    2700
ttcctgtttg gtcactgatg cctccgtgta agggggattt ctgttcatgg gggtaatgat    2760
accgatgaaa cgagagagga tgctcacgat acgggttact gatgatgaac atgcccggtt    2820
actggaacgt tgtgagggta acaactggc ggtatggatg cggcgggacc agagaaaaat    2880
cactcagggt caatgccagc gcttcgttaa tacagatgta ggtgttccac agggtagcca    2940
gcagcatcct gcgatgcaga tccggaacat aatggtgcag ggcgctgact ccgcgtttc    3000 cagactttac gaaacacgga aaccgaagac cattcatgtt gttgctcagg tcgcagacgt    3060
tttgcagcag cagtcgcttc acgttcgctc gcgtatcggt gattcattct gctaaccagt    3120
aaggcaaccc cgccagccta gccgggtcct caacgacagg agcacgatca tgcgcacccg    3180
tggggccgcc atgccggcga taatggcctg cttctcgccg aaacgtttgg tggcgggacc    3240
agtgacgaag gcttgagcga gggcgtgcaa gattccgaat accgcaagcg acaggccgat    3300
catcgtcgcg ctccagcgaa agcggtcctc gccgaaaatg acccagagcg ctgccggcac    3360
ctgtcctacg agttgcatga taaagaagac agtcataagt gcggcgacga tagtcatgcc    3420
ccgcgcccac cggaaggagc tgactgggtt gaaggctctc aagggcatcg gtcgagatcc    3480
cggtgcctaa tgagtgagct aacttacatt aattgcgttg cgctcactgc ccgctttcca    3540
gtcgggaaac ctgtcgtgcc agctgcatta atgaatcggc caacgcgcgg ggagaggcgg    3600
tttgcgtatt gggcgccagg gtggtttttc ttttcaccag tgagacgggc aacagctgat    3660
tgcccttcac cgcctggccc tgagagagtt gcagcaagcg gtccacgctg gtttgcccca    3720
gcaggcgaaa atcctgtttg atggtggtta acggcgggat ataacatgag ctgtcttcgg    3780
tatcgtcgta tcccactacc gagatatccg caccaacgcg cagcccggac tcggtaatgg    3840
cgcgcattgc gcccagcgcc atctgatcgt tggcaaccag catcgcagtg gaacgatgc    3900 cctcattcag catttgcatg gtttgttgaa aaccggacat ggcactccag tcgccttccc    3960
gttccgctat cggctgaatt tgattgcgag tgagatattt atgccagcca gccagacgca    4020
gacgcgccga gacagaactt aatgggcccg ctaacagcgc gatttgctgg tgacccaatg    4080
cgaccagatg ctccacgccc agtcgcgtac cgtcttcatg ggagaaaata atactgttga    4140
tgggtgtctg gtcagagaca tcaagaaata acgccggaac attagtgcag gcagcttcca    4200
cagcaatggc atcctggtca tccagcggat agttaatgat cagcccactg acgcgttgcg    4260
cgagaagatt gtgcaccgcc gctttacagg cttcgacgcc gcttcgttct accatcgaca    4320
ccaccacgct ggcacccagt tgatcggcgc gagatttaat cgccgcgaca atttgcgacg    4380
gcgcgtgcag ggccagactg gaggtggcaa cgccaatcag caacgactgt ttgcccgcca    4440
gttgttgtgc cacgcggttg ggaatgtaat tcagctccgc catcgccgct tccactttt    4500 cccgcgtttt cgcagaaacg tggctggcct ggttcaccac gcgggaaacg gtctgataag    4560
agacaccggc atactctgcg acatcgtata acgttactgg tttcacattc accaccctga    4620
attgactctc ttccgggcgc tatcatgcca taccgcgaaa ggttttgcgc cattcgatgg    4680
tgtccgggat ctcgacgctc tcccttatgc gactcctgca ttaggaagca gcccagtagt    4740
aggttgaggc cgttgagcac cgccgccgca aggaatggtg catgcaagga gatgcgcccc    4800
aacagtcccc cggccacggg gcctgccacc atacccacgc cgaaacaagc gctcatgagc    4860
```

-continued

```
ccgaagtggc gagcccgatc ttccccatcg gtgatgtcgg cgatataggc gccagcaacc    4920
gcacctgtgg cgccggtgat gccggccacg atgcgtccgg cgtagaggat cgagatctcg    4980
atcccgcgaa attaatacga ctcactatag ggaattgtg agcggataac aattcccctc     5040
tagaaataat tttgtttaac tttaagaagg agatatacca tgggcagcag ccatcatcat    5100
catcatcaca gcagcggcct ggtgccgcgc ggcagccata tggaaaacct gtatttccag    5160
gggcccgagg aacccctggt ggtgaaagtc gaggagggcg ataacgctgt cctgcaatgc    5220 cttaaggggaa cgtctgacgg ccccacacaa caattaacat ggtctcgcga atccccttg    5280 aagccctttt tgaaactgtc attaggcttg cccggtcttg gatccacat gcgtccatta    5340 gcgatttggc ttttcatctt caatgtctcg caacaaatgg gcggtttcta cctttgtcaa    5400
cctggacccc ctagtgaaaa agcgtggcaa cccgggtgga ctgtcaatgt cgaaggatct    5460
ggcgagcttt tccgttggaa cgtaagtgac ttaggtggac tgggctgcgg tcttaaaaat    5520
cgctccagcg agggcccaag tagtccatct ggcaaactga tgtcgccaaa gctttatgtt    5580
tgggcaaaag atcgcccaga aatttgggaa ggtgagccgc cctgcttacc accccgtgat    5640
tctttgaacc aatcacttag ccaggactta actatggcac cagggagtac gctttggttg    5700
agttgcggcg ttcctcctga ttcagtctcc cgcggccctc tgtcttggac gcacgtccat    5760
ccaaggggcc cgaagtccct gttaagcctt gagttgaaag atgaccgccc tgctcgcgat    5820
atgtgggtca tggaaacggg gttgctttta ccgcgtgcca cagcgcaaga tgcgggaaaa    5880
tattactgcc accgcggaaa tttaacgatg tccttccatt tggagatcac cgcccgtccg    5940
gtattgtggc actggctgct gcgcacaggg ggctggaaag ggggatccgg tgggtctgga    6000
ggaagtggcg gaagtggtgg atctggcggt agttccgtga cggtccactc atctgagccg    6060
gaagttcgca ttcctgaaaa caaccccgta aaactgagtt gcgccattc agggttttca     6120 tcacctcgcg tcgaatggaa attcgatcaa ggtgacacca ctcgcttagt gtgttataac    6180
aacaaaatca cggcgtcata cgaggatcgc gttactttct taccaacagg catcaccttt    6240
aaatctgtaa cacgcgagga tacaggaacc tatacttgta tggtttcgga ggagggtggg    6300
aattcgtacg gcgaggtaaa agtcaaattg attgtgttag tcccgccttc aaagcccacg    6360
gttaatattc cctcgtctgc tacaattggt aaccgcgccg ttcttacatg ctccgaacaa    6420
gatggtagtc cgccctccga atatacatgg ttcaaggacg gcatcgtaat gccaacaaat    6480
ccgaaaagta cacgcgcttt cagcaattcg tcatacgtct aaatcccac caccggcgaa    6540 ttggtcttcg atccactttc agcctctgac actggtgagt actcatgcga ggctcgtaat    6600
ggctatggta cgccaatgac aagtaacgct gtacgcatgg aggcggtcga acgcaacgtt    6660
ggagttgcct gtgagcagaa tcccatctac tgggcgcgct atgcggactg gttattcacg    6720
acacccttac tgctgttgga cttagcccctt cttgttgacg ccgatgaggg aactgggtga    6780
tgactcgagc accaccacca ccaccactga gatccggctg ctaacaaagc ccgaaggaa    6840 gctgagttgg ctgctgccac cgctgagcaa taactagcat aaccccttgg ggcctctaaa    6900
cgggtcttga ggggttttt gctgaaagga gga                                  6933
```

<210> SEQ ID NO 2
<211> LENGTH: 566
<212> TYPE: PRT
<213> ORGANISM: Artificial Sequence
<220> FEATURE:
<223> OTHER INFORMATION: translation product of "pET28a-CM19XA" used in this study -continued

```
<400> SEQUENCE: 2

Met Gly Ser Ser His His His His His His Ser Ser Gly Leu Val Pro
1               5                   10                  15

Arg Gly Ser His Met Glu Asn Leu Tyr Phe Gln Gly Pro Glu Glu Pro
            20                  25                  30

Leu Val Val Lys Val Glu Glu Gly Asp Asn Ala Val Leu Gln Cys Leu
        35                  40                  45

Lys Gly Thr Ser Asp Gly Pro Thr Gln Gln Leu Thr Trp Ser Arg Glu
50                  55                  60

Ser Pro Leu Lys Pro Phe Leu Lys Leu Ser Leu Gly Leu Pro Gly Leu
65                  70                  75                  80

Gly Ile His Met Arg Pro Leu Ala Ile Trp Leu Phe Ile Phe Asn Val
                85                  90                  95

Ser Gln Gln Met Gly Gly Phe Tyr Leu Cys Gln Pro Gly Pro Pro Ser
            100                 105                 110

Glu Lys Ala Trp Gln Pro Gly Trp Thr Val Asn Val Glu Gly Ser Gly
        115                 120                 125

Glu Leu Phe Arg Trp Asn Val Ser Asp Leu Gly Gly Leu Gly Cys Gly
130                 135                 140

Leu Lys Asn Arg Ser Ser Glu Gly Pro Ser Ser Pro Ser Gly Lys Leu
145                 150                 155                 160

Met Ser Pro Lys Leu Tyr Val Trp Ala Lys Asp Arg Pro Glu Ile Trp
                165                 170                 175

Glu Gly Glu Pro Pro Cys Leu Pro Pro Arg Asp Ser Leu Asn Gln Ser
            180                 185                 190

Leu Ser Gln Asp Leu Thr Met Ala Pro Gly Ser Thr Leu Trp Leu Ser
        195                 200                 205

Cys Gly Val Pro Pro Asp Ser Val Ser Arg Gly Pro Leu Ser Trp Thr
210                 215                 220

His Val His Pro Lys Gly Pro Lys Ser Leu Leu Ser Leu Glu Leu Lys
225                 230                 235                 240

Asp Asp Arg Pro Ala Arg Asp Met Trp Val Met Glu Thr Gly Leu Leu
                245                 250                 255

Leu Pro Arg Ala Thr Ala Gln Asp Ala Gly Lys Tyr Tyr Cys His Arg
            260                 265                 270

Gly Asn Leu Thr Met Ser Phe His Leu Glu Ile Thr Ala Arg Pro Val
        275                 280                 285

Leu Trp His Trp Leu Leu Arg Thr Gly Gly Trp Lys Gly Gly Ser Gly
290                 295                 300

Gly Ser Gly Gly Ser Gly Gly Ser Gly Gly Ser Gly Gly Ser Ser Val
305                 310                 315                 320

Thr Val His Ser Ser Glu Pro Glu Val Arg Ile Pro Glu Asn Asn Pro
                325                 330                 335

Val Lys Leu Ser Cys Ala Tyr Ser Gly Phe Ser Ser Pro Arg Val Glu
            340                 345                 350

Trp Lys Phe Asp Gln Gly Asp Thr Thr Arg Leu Val Cys Tyr Asn Asn
        355                 360                 365

Lys Ile Thr Ala Ser Tyr Glu Asp Arg Val Thr Phe Leu Pro Thr Gly
370                 375                 380

Ile Thr Phe Lys Ser Val Thr Arg Glu Asp Thr Gly Thr Tyr Thr Cys
385                 390                 395                 400

Met Val Ser Glu Glu Gly Gly Asn Ser Tyr Gly Glu Val Lys Val Lys
```

```
                        405                 410                 415
Leu Ile Val Leu Val Pro Pro Ser Lys Pro Thr Val Asn Ile Pro Ser
                420                 425                 430

Ser Ala Thr Ile Gly Asn Arg Ala Val Leu Thr Cys Ser Glu Gln Asp
            435                 440                 445

Gly Ser Pro Pro Ser Glu Tyr Thr Trp Phe Lys Asp Gly Ile Val Met
        450                 455                 460

Pro Thr Asn Pro Lys Ser Thr Arg Ala Phe Ser Asn Ser Ser Tyr Val
465                 470                 475                 480

Leu Asn Pro Thr Thr Gly Glu Leu Val Phe Asp Pro Leu Ser Ala Ser
                485                 490                 495

Asp Thr Gly Glu Tyr Ser Cys Glu Ala Arg Asn Gly Tyr Gly Thr Pro
            500                 505                 510

Met Thr Ser Asn Ala Val Arg Met Glu Ala Val Glu Arg Asn Val Gly
        515                 520                 525

Val Ala Cys Glu Gln Asn Pro Ile Tyr Trp Ala Arg Tyr Ala Asp Trp
530                 535                 540

Leu Phe Thr Thr Pro Leu Leu Leu Leu Asp Leu Ala Leu Leu Val Asp
545                 550                 555                 560

Ala Asp Glu Gly Thr Gly
            565

<210> SEQ ID NO 3
<211> LENGTH: 1641
<212> TYPE: DNA
<213> ORGANISM: Artificial Sequence
<220> FEATURE:
<223> OTHER INFORMATION: Nucleic acid seqeunce for JAM A-pHLIP fusion
      protein

<400> SEQUENCE: 3
gaaaacctgt atttccaggg gcccgaggaa cccctggtgg tgaaagtcga ggagggcgat      60
aacgctgtcc tgcaatgcct taagggaacg tctgacggcc ccacacaaca attaacatgg     120
tctcgcgaat cccccttgaa gcccttttttg aaactgtcat taggcttgcc cggtcttggg     180
atccacatgc gtccattagc gatttggctt ttcatcttca atgtctcgca acaaatgggc     240
ggtttctacc tttgtcaacc tggacccccct agtgaaaaag cgtggcaacc cgggtggact     300
gtcaatgtcg aaggatctgg cgagcttttc cgttggaacg taagtgactt aggtggactg     360
ggctgcggtc ttaaaaatcg ctccagcgag ggcccaagta gtccatctgg caaactgatg     420
tcgccaaagc tttatgtttg ggcaaaagat cgcccagaaa tttgggaagg tgagccgccc     480
tgcttaccac cccgtgattc tttgaaccaa tcacttagcc aggacttaac tatggcacca     540
gggagtacgc tttggttgag ttgcggcgtt cctcctgatt cagtctcccg cggccctctg     600
tcttggacgc acgtccatcc aaagggcccg aagtccctgt taagccttga gttgaaagat     660
gaccgccctg ctcgcgatat gtgggtcatg gaaacggggt tgcttttacc gcgtgccaca     720
gcgcaagatg cgggaaaata ttactgccac gcgggaaatt aacgatgtcc ttccatttg     780 gagatcaccg cccgtccggt attgtggcac tggctgctgc gcacaggggg ctggaaaggg     840
ggatccggtg gtctggagg aagtggcgga agtggtggat ctggcggtag ttccgtgacg     900
gtccactcat ctgagccgga agttcgcatt cctgaaaaca accccgtaaa actgagttgc     960
gcctattcag ggttttcatc acctcgcgtc gaatggaaat tcgatcaagg tgacaccact    1020
cgcttagtgt gttataacaa caaaatcacg gcgtcatacg aggatcgcgt tactttctta    1080
```

```
ccaacaggca tcacctttaa atctgtaaca cgcgaggata caggaaccta tacttgtatg   1140
gtttcggagg agggtgggaa ttcgtacggc gaggtaaaag tcaaattgat tgtgttagtc   1200
ccgccttcaa agcccacggt taatattccc tcgtctgcta caattggtaa ccgcgccgtt   1260
cttacatgct ccgaacaaga tggtagtccg ccctccgaat atacatggtt caaggacggc   1320
atcgtaatgc caacaaatcc gaaaagtaca cgcgctttca gcaattcgtc atacgtctta   1380
aatcccacca ccggcgaatt ggtcttcgat ccactttcag cctctgacac tggtgagtac   1440
tcatgcgagg ctcgtaatgg ctatggtacg ccaatgacaa gtaacgctgt acgcatggag   1500
gcggtcgaac gcaacgttgg agttgcctgt gagcagaatc ccatctactg ggcgcgctat   1560
gcggactggt tattcacgac acccttactg ctgttggact tagcccttct tgttgacgcc   1620
gatgagggaa ctgggtgatg a                                            1641
```

<210> SEQ ID NO 4
<211> LENGTH: 545
<212> TYPE: PRT
<213> ORGANISM: Artificial Sequence
<220> FEATURE:
<223> OTHER INFORMATION: Amino acid sequence for CM19XA:CD19-JAM_A-pHLIP

<400> SEQUENCE: 4

Glu Asn Leu Tyr Phe Gln Gly Pro Glu Glu Pro Leu Val Val Lys Val
1               5                   10                  15

Glu Glu Gly Asp Asn Ala Val Leu Gln Cys Leu Lys Gly Thr Ser Asp
                20                  25                  30

Gly Pro Thr Gln Gln Leu Thr Trp Ser Arg Glu Ser Pro Leu Lys Pro
            35                  40                  45

Phe Leu Lys Leu Ser Leu Gly Leu Pro Gly Leu Gly Ile His Met Arg
        50                  55                  60

Pro Leu Ala Ile Trp Leu Phe Ile Phe Asn Val Ser Gln Gln Met Gly
65                  70                  75                  80

Gly Phe Tyr Leu Cys Gln Pro Gly Pro Pro Ser Glu Lys Ala Trp Gln
                85                  90                  95

Pro Gly Trp Thr Val Asn Val Glu Gly Ser Gly Glu Leu Phe Arg Trp
            100                 105                 110

Asn Val Ser Asp Leu Gly Gly Leu Gly Cys Gly Leu Lys Asn Arg Ser
        115                 120                 125

Ser Glu Gly Pro Ser Ser Pro Ser Gly Lys Leu Met Ser Pro Lys Leu
    130                 135                 140

Tyr Val Trp Ala Lys Asp Arg Pro Glu Ile Trp Glu Gly Glu Pro Pro
145                 150                 155                 160

Cys Leu Pro Pro Arg Asp Ser Leu Asn Gln Ser Leu Ser Gln Asp Leu
                165                 170                 175

Thr Met Ala Pro Gly Ser Thr Leu Trp Leu Ser Cys Gly Val Pro Pro
            180                 185                 190

Asp Ser Val Ser Arg Gly Pro Leu Ser Trp Thr His Val His Pro Lys
        195                 200                 205

Gly Pro Lys Ser Leu Leu Ser Leu Glu Leu Lys Asp Asp Arg Pro Ala
    210                 215                 220

Arg Asp Met Trp Val Met Glu Thr Gly Leu Leu Leu Pro Arg Ala Thr
225                 230                 235                 240

Ala Gln Asp Ala Gly Lys Tyr Tyr Cys His Arg Gly Asn Leu Thr Met
                245                 250                 255

Ser Phe His Leu Glu Ile Thr Ala Arg Pro Val Leu Trp His Trp Leu 260                 265                 270
Leu Arg Thr Gly Gly Trp Lys Gly Gly Ser Gly Gly Ser
            275                 280                 285
Gly Gly Ser Gly Gly Ser Gly Gly Ser Ser Val Thr Val His Ser Ser
        290                 295                 300
Glu Pro Glu Val Arg Ile Pro Glu Asn Asn Pro Val Lys Leu Ser Cys
305                 310                 315                 320
Ala Tyr Ser Gly Phe Ser Ser Pro Arg Val Glu Trp Lys Phe Asp Gln
                325                 330                 335
Gly Asp Thr Thr Arg Leu Val Cys Tyr Asn Asn Lys Ile Thr Ala Ser
            340                 345                 350
Tyr Glu Asp Arg Val Thr Phe Leu Pro Thr Gly Ile Thr Phe Lys Ser
        355                 360                 365
Val Thr Arg Glu Asp Thr Gly Thr Tyr Thr Cys Met Val Ser Glu Glu
    370                 375                 380
Gly Gly Asn Ser Tyr Gly Glu Val Lys Val Lys Leu Ile Val Leu Val
385                 390                 395                 400
Pro Pro Ser Lys Pro Thr Val Asn Ile Pro Ser Ser Ala Thr Ile Gly
                405                 410                 415
Asn Arg Ala Val Leu Thr Cys Ser Glu Gln Asp Gly Ser Pro Pro Ser
            420                 425                 430
Glu Tyr Thr Trp Phe Lys Asp Gly Ile Val Met Pro Thr Asn Pro Lys
        435                 440                 445
Ser Thr Arg Ala Phe Ser Asn Ser Ser Tyr Val Leu Asn Pro Thr Thr
    450                 455                 460
Gly Glu Leu Val Phe Asp Pro Leu Ser Ala Ser Asp Thr Gly Glu Tyr
465                 470                 475                 480
Ser Cys Glu Ala Arg Asn Gly Tyr Gly Thr Pro Met Thr Ser Asn Ala
                485                 490                 495
Val Arg Met Glu Ala Val Glu Arg Asn Val Gly Val Ala Cys Glu Gln
            500                 505                 510
Asn Pro Ile Tyr Trp Ala Arg Tyr Ala Asp Trp Leu Phe Thr Thr Pro
        515                 520                 525
Leu Leu Leu Leu Asp Leu Ala Leu Leu Val Asp Ala Asp Glu Gly Thr
    530                 535                 540
Gly
545

<210> SEQ ID NO 5
<211> LENGTH: 1635
<212> TYPE: DNA
<213> ORGANISM: Artificial Sequence
<220> FEATURE:
<223> OTHER INFORMATION: Nucleic acid sequence for CD19-JAM_B-pHLIP

<400> SEQUENCE: 5
gaaaacctgt atttccaggg gccagaagaa ccgttagtag tgaaagtaga ggaaggtgat      60
aacgctgttc tgcaatgtct taagggtaca tccgatgggc ccactcagca gttaacttgg     120
agtcgtgagt caccccttaa gccctttttg aagctttccc ttggcttacc tggactggga     180
atccacatgc gccctttggc aatctggctg tttattttta acgtctcaca gcaaatgggg     240
ggattctatt tgtgccaacc tgggccccca gtgagaaag cgtggcaacc aggttggacc     300
gtgaacgttg aaggttcagg tgagttattc cgctggaacg tgtccgacct tggaggctta     360
ggttgtggct taaagaaccg ttcatcagag gggccctcca gccccagtgg taagctgatg     420

```
agtccaaagc tgtacgtgtg ggctaaagat cgtcccgaaa tctgggaagg ggaaccaccg      480
tgtctgcctc ctcgtgacag tttaaaccag tcgctgtcac aggaccttac catggcccct      540
gggtccacct tatggctgag ttgcggcgtt ccaccggatt cggtttcacg cggccctctg      600
agttggactc acgtccaccc taaggggccg aaaagcttgt tatcgttgga gctgaaagac      660
gaccgcccgg ctcgtgatat gtgggtaatg agacaggat tactttgcc tcgcgcaact        720 gcacaagatg cgggtaagta ttactgccac cgtgggaact tgaccatgag cttccacttg      780
gagattaccg cacgcccggt tttatggcac tggttgttac gtaccggtgg ctggaagggt      840
ggatcgggcg gctctggggg gagcggcgga tcaggaggta gcggggtag tttctccgcg       900 ccgaaagatc agcaagtagt cactgccgta gaatatcagg aggcgattct ggcgtgtaaa      960
acgcctaaaa agaccgtctc gtcacgtctt gagtggaaga aactgggacg ttctgtttcc     1020
tttgtttact atcaacagac gttgcagggt gatttcaaaa atcgtgctga gatgattgat     1080
ttcaacatcc gtattaagaa cgtcactcgc tctgatgcag ggaaataccg ttgcgaagta     1140
agcgcacctt cggaacaggg ccagaattta gaggaagata cggtgacctt ggaggtgttg     1200
gtagctccgg cagtcccgtc ctgcgaagta ccgagttctg ccctgtcggg gactgttgta     1260
gagcttcgtt gccaagacaa ggaagggaat cctgctccgg aatacacctg gttcaaggat     1320
ggcatccgtc ttctggaaaa cccgcgcctt ggtagccaaa gcacaaactc ctcctacacc     1380
atgaatacta agactggtac gctgcagttc aataccgtga gcaagctgga caccggcgaa     1440
tattcttgtg aggcacgcaa cagcgtcggg tatcgtcgtt gccccggtaa acgcatgcaa     1500
gtagatgact tgaacatttc cgcatgcgag cagaatccca tctactgggc gcgttacgcc     1560
gattggttgt tcacgacgcc gttgctgtta cttgatcttg cgttactggt ggatgcagat     1620
gaaggaacag ggtga                                                      1635
```

<210> SEQ ID NO 6
<211> LENGTH: 544
<212> TYPE: PRT
<213> ORGANISM: Artificial Sequence
<220> FEATURE:
<223> OTHER INFORMATION: Amino acid sequence for CD19XB:CD19-JAM_B-pHLIP

<400> SEQUENCE: 6

```
Glu Asn Leu Tyr Phe Gln Gly Pro Glu Glu Pro Leu Val Val Lys Val
1               5                   10                  15

Glu Glu Gly Asp Asn Ala Val Leu Gln Cys Leu Lys Gly Thr Ser Asp
            20                  25                  30

Gly Pro Thr Gln Gln Leu Thr Trp Ser Arg Glu Ser Pro Leu Lys Pro
        35                  40                  45

Phe Leu Lys Leu Ser Leu Gly Leu Pro Gly Leu Gly Ile His Met Arg
    50                  55                  60

Pro Leu Ala Ile Trp Leu Phe Ile Phe Asn Val Ser Gln Gln Met Gly
65                  70                  75                  80

Gly Phe Tyr Leu Cys Gln Pro Gly Pro Pro Ser Glu Lys Ala Trp Gln
                85                  90                  95

Pro Gly Trp Thr Val Asn Val Glu Gly Ser Gly Glu Leu Phe Arg Trp
            100                 105                 110

Asn Val Ser Asp Leu Gly Gly Leu Gly Cys Gly Leu Lys Asn Arg Ser
        115                 120                 125

Ser Glu Gly Pro Ser Ser Pro Ser Gly Lys Leu Met Ser Pro Lys Leu
    130                 135                 140
```

```
Tyr Val Trp Ala Lys Asp Arg Pro Glu Ile Trp Glu Gly Glu Pro Pro
145                 150                 155                 160

Cys Leu Pro Pro Arg Asp Ser Leu Asn Gln Ser Leu Ser Gln Asp Leu
            165                 170                 175

Thr Met Ala Pro Gly Ser Thr Leu Trp Leu Ser Cys Gly Val Pro Pro
        180                 185                 190

Asp Ser Val Ser Arg Gly Pro Leu Ser Trp Thr His Val His Pro Lys
    195                 200                 205

Gly Pro Lys Ser Leu Leu Ser Leu Glu Leu Lys Asp Asp Arg Pro Ala
210                 215                 220

Arg Asp Met Trp Val Met Glu Thr Gly Leu Leu Leu Pro Arg Ala Thr
225                 230                 235                 240

Ala Gln Asp Ala Gly Lys Tyr Tyr Cys His Arg Gly Asn Leu Thr Met
                245                 250                 255

Ser Phe His Leu Glu Ile Thr Ala Arg Pro Val Leu Trp His Trp Leu
        260                 265                 270

Leu Arg Thr Gly Gly Trp Lys Gly Gly Ser Gly Gly Ser Gly Gly Ser
        275                 280                 285

Gly Gly Ser Gly Gly Ser Gly Gly Ser Phe Ser Ala Pro Lys Asp Gln
290                 295                 300

Gln Val Val Thr Ala Val Glu Tyr Gln Glu Ala Ile Leu Ala Cys Lys
305                 310                 315                 320

Thr Pro Lys Lys Thr Val Ser Ser Arg Leu Glu Trp Lys Lys Leu Gly
            325                 330                 335

Arg Ser Val Ser Phe Val Tyr Tyr Gln Gln Thr Leu Gln Gly Asp Phe
            340                 345                 350

Lys Asn Arg Ala Glu Met Ile Asp Phe Asn Ile Arg Ile Lys Asn Val
        355                 360                 365

Thr Arg Ser Asp Ala Gly Lys Tyr Arg Cys Glu Val Ser Ala Pro Ser
370                 375                 380

Glu Gln Gly Gln Asn Leu Glu Glu Asp Thr Val Thr Leu Glu Val Leu
385                 390                 395                 400

Val Ala Pro Ala Val Pro Ser Cys Glu Val Pro Ser Ser Ala Leu Ser
                405                 410                 415

Gly Thr Val Val Glu Leu Arg Cys Gln Asp Lys Glu Gly Asn Pro Ala
            420                 425                 430

Pro Glu Tyr Thr Trp Phe Lys Asp Gly Ile Arg Leu Leu Glu Asn Pro
            435                 440                 445

Arg Leu Gly Ser Gln Ser Thr Asn Ser Ser Tyr Thr Met Asn Thr Lys
        450                 455                 460

Thr Gly Thr Leu Gln Phe Asn Thr Val Ser Lys Leu Asp Thr Gly Glu
465                 470                 475                 480

Tyr Ser Cys Glu Ala Arg Asn Ser Val Gly Tyr Arg Arg Cys Pro Gly
                485                 490                 495

Lys Arg Met Gln Val Asp Asp Leu Asn Ile Ser Ala Cys Glu Gln Asn
            500                 505                 510

Pro Ile Tyr Trp Ala Arg Tyr Ala Asp Trp Leu Phe Thr Thr Pro Leu
        515                 520                 525

Leu Leu Leu Asp Leu Ala Leu Leu Val Asp Ala Asp Glu Gly Thr Gly
        530                 535                 540

<210> SEQ ID NO 7
<211> LENGTH: 1635
```

<212> TYPE: DNA
<213> ORGANISM: Artificial Sequence
<220> FEATURE:
<223> OTHER INFORMATION: Nucleic acid sequence for CM19XC:CD19-JAM_C-pHLIP

<400> SEQUENCE: 7

```
gaaaacctgt atttccaggg gcccgaagaa ccccttgtag ttaaagtaga agagggtgac      60
aatgccgttc ttcagtgttt aaaaggcaca tcagacgggc ccacacagca gttgacatgg     120
agccgtgaat ccccccttgaa gccattttta agctgtcct tagggttacc ggggttaggt     180
atccacatgc gcccccttgc tatctggctt tttatcttta acgtatctca gcagatgggg     240
ggcttctacc tttgccagcc gggtcccccct tcagagaaag cctggcagcc gggctggaca     300
gtcaatgtgg aaggcagcgg cgagttgttt cgctggaatg tctcagatct tggggcttg     360
gggtgtggcc ttaaaaatcg ctcttcggag ggaccctcaa gcccgagtgg aaaacttatg     420
tcgcctaagc tttacgtatg gctaaggac cgccctgaga tttggaggg agaacccct     480
tgtttacctc cccgtgattc gttgaaccaa tctttatccc aggatttaac tatggcgcca     540
ggatcaactt tatggctgag ctgcggggtg cccctgact cagtgtcccg cgggcctta     600
agttggacgc atgtgcaccc taaggggcca aaatcgctgc tgagtttga gcttaaggat     660
gatcgcccag cgcgtgatat gtgggtaatg gaaactgggt tgctgttgcc ccgtgcgacc     720
gctcaggatg ccgggaagta ttattgtcac cgcggcaacc ttaccatgtc atttcatttg     780
gaaatcaccg cccgcccagt tttgtggcat tggcttttgc gcactggcgg gtggaaaggc     840
ggttcaggag gcagcggcgg tagcggtggt agcggaggtt caggcgggtc ggtaaatctg     900
aaatcatcga atcgcactcc tgtagttcaa gagtttgaga gcgttgagtt aagctgcatt     960
attacgcgata gtcagacatc agatcctcgt atcgagtgga aaaagattca ggacgagcaa    1020
actacttacg tcttcttcga caacaaaatt cagggcgact ggctggccg cgcagagatt    1080
ctgggcaaaa ctagccttaa gatctggaac gtcacgcgcc gtgacagtgc attgtaccgc    1140
tgtgaagtgg tggcccgtaa cgaccgcaag gagatcgatg agattgttat tgaattgaca    1200
gttcaggtga agccagtaac cccagtgtgc cgtgtcccaa aggccgtacc ggttggtaaa    1260
atggcaactt tgcattgcca ggagtcagaa ggtcatccgc gcccacacta ttcgtggtat    1320
cgtaatgacg tacccttacc cactgattca cgcgctaatc ctcgcttccg caactcaagt    1380
ttccacttaa attccgaaac tggtacatta gtattcaccg ctgtccacaa ggacgactcg    1440
ggtcaatatt actgtattgc atctaatgac gccggatctg cacgttgcga agagcaggag    1500
atggaagtct acgatttaaa tgcttgtgaa caaaatccaa tttattgggc gcgctatgcc    1560
gattggttgt ttacaacgcc gttactgtta ttggatttag ctttacttgt agacgccgat    1620
gagggaacag gatga                                                      1635
```

<210> SEQ ID NO 8
<211> LENGTH: 544
<212> TYPE: PRT
<213> ORGANISM: Artificial Sequence
<220> FEATURE:
<223> OTHER INFORMATION: Amino acid sequence for CM19XC:CD19-JAM_C-pHLIP

<400> SEQUENCE: 8

```
Glu Asn Leu Tyr Phe Gln Gly Pro Glu Glu Pro Leu Val Val Lys Val
1               5                   10                  15

Glu Glu Gly Asp Asn Ala Val Leu Gln Cys Leu Lys Gly Thr Ser Asp
            20                  25                  30
```

-continued

```
Gly Pro Thr Gln Gln Leu Thr Trp Ser Arg Glu Ser Pro Lys Pro
            35                  40                  45

Phe Leu Lys Leu Ser Leu Gly Leu Pro Gly Leu Gly Ile His Met Arg
 50                  55                  60

Pro Leu Ala Ile Trp Leu Phe Ile Phe Asn Val Ser Gln Gln Met Gly
 65                  70                  75                  80

Gly Phe Tyr Leu Cys Gln Pro Gly Pro Pro Ser Glu Lys Ala Trp Gln
                     85                  90                  95

Pro Gly Trp Thr Val Asn Val Glu Gly Ser Gly Glu Leu Phe Arg Trp
                100                 105                 110

Asn Val Ser Asp Leu Gly Gly Leu Gly Cys Gly Leu Lys Asn Arg Ser
                115                 120                 125

Ser Glu Gly Pro Ser Ser Pro Ser Gly Lys Leu Met Ser Pro Lys Leu
            130                 135                 140

Tyr Val Trp Ala Lys Asp Arg Pro Glu Ile Trp Glu Gly Glu Pro Pro
145                 150                 155                 160

Cys Leu Pro Pro Arg Asp Ser Leu Asn Gln Ser Leu Ser Gln Asp Leu
                    165                 170                 175

Thr Met Ala Pro Gly Ser Thr Leu Trp Leu Ser Cys Gly Val Pro Pro
                180                 185                 190

Asp Ser Val Ser Arg Gly Pro Leu Ser Trp Thr His Val His Pro Lys
                195                 200                 205

Gly Pro Lys Ser Leu Leu Ser Leu Glu Leu Lys Asp Asp Arg Pro Ala
            210                 215                 220

Arg Asp Met Trp Val Met Glu Thr Gly Leu Leu Leu Pro Arg Ala Thr
225                 230                 235                 240

Ala Gln Asp Ala Gly Lys Tyr Tyr Cys His Arg Gly Asn Leu Thr Met
                    245                 250                 255

Ser Phe His Leu Glu Ile Thr Ala Arg Pro Val Leu Trp His Trp Leu
                260                 265                 270

Leu Arg Thr Gly Gly Trp Lys Gly Gly Ser Gly Gly Ser Gly Gly Ser
            275                 280                 285

Gly Gly Ser Gly Gly Ser Gly Gly Ser Val Asn Leu Lys Ser Ser Asn
            290                 295                 300

Arg Thr Pro Val Val Gln Glu Phe Glu Ser Val Glu Leu Ser Cys Ile
305                 310                 315                 320

Ile Thr Asp Ser Gln Thr Ser Asp Pro Arg Ile Glu Trp Lys Lys Ile
                    325                 330                 335

Gln Asp Glu Gln Thr Thr Tyr Val Phe Phe Asp Asn Lys Ile Gln Gly
                340                 345                 350

Asp Leu Ala Gly Arg Ala Glu Ile Leu Gly Lys Thr Ser Leu Lys Ile
                355                 360                 365

Trp Asn Val Thr Arg Arg Asp Ser Ala Leu Tyr Arg Cys Glu Val Val
            370                 375                 380

Ala Arg Asn Asp Arg Lys Glu Ile Asp Glu Val Ile Glu Leu Thr
385                 390                 395                 400

Val Gln Val Lys Pro Val Thr Pro Val Cys Arg Val Pro Lys Ala Val
                405                 410                 415

Pro Val Gly Lys Met Ala Thr Leu His Cys Gln Glu Ser Glu Gly His
                420                 425                 430

Pro Arg Pro His Tyr Ser Trp Tyr Arg Asn Asp Val Pro Leu Pro Thr
            435                 440                 445
```

```
Asp Ser Arg Ala Asn Pro Arg Phe Arg Asn Ser Ser Phe His Leu Asn
    450                 455                 460

Ser Glu Thr Gly Thr Leu Val Phe Thr Ala Val His Lys Asp Asp Ser
465                 470                 475                 480

Gly Gln Tyr Tyr Cys Ile Ala Ser Asn Asp Ala Gly Ser Ala Arg Cys
                485                 490                 495

Glu Glu Gln Glu Met Glu Val Tyr Asp Leu Asn Ala Cys Glu Gln Asn
                500                 505                 510

Pro Ile Tyr Trp Ala Arg Tyr Ala Asp Trp Leu Phe Thr Thr Pro Leu
            515                 520                 525

Leu Leu Leu Asp Leu Ala Leu Leu Val Asp Ala Asp Glu Gly Thr Gly
        530                 535                 540

<210> SEQ ID NO 9
<211> LENGTH: 1803
<212> TYPE: DNA
<213> ORGANISM: Artificial Sequence
<220> FEATURE:
<223> OTHER INFORMATION: Nucleic acid seqeuence for CM19X4:CD19-JAM4-
      pHLIP

<400> SEQUENCE: 9
```

| | | | | | |
|---|---|---|---|---|---|
| gaaaacctgt | atttccaggg | gccagaggaa | ccattagtgg | ttaaggtaga | ggaaggcgat | 60 |
| aatgcagtct | tacagtgtct | taaaggaact | tcagacggcc | cgacccaaca | gctgacttgg | 120 |
| tctcgtgaaa | gcccgttaaa | accettcctt | aagctgagcc | tgggtttgcc | tggtttagga | 180 |
| attcacatgc | gtcccettgc | gatctggctg | tttattttta | atgtgtctca | gcaaatgggc | 240 |
| gggttttact | tgtgtcagcc | agggcccccea | tcggagaagg | cttggcaacc | cggctggacc | 300 |
| gtgaacgtcg | agggtagtgg | ggaactttc | cgctggaacg | tttccgattt | aggcggtctt | 360 |
| ggctgcggcc | ttaagaatcg | ttcttcggaa | gggccgagtt | ccccgtctgg | aaagctgatg | 420 |
| tcacctaagt | tatatgtttg | gccaaggat | cgtccagaga | tttgggaggg | cgagccccc | 480 |
| tgtctgccgc | cacgtgacag | cctgaaccag | agtttgagcc | aggatcttac | gatggcccct | 540 |
| gggtcgactc | tttggttatc | gtgcggggtt | ccacccgact | cggtttcacg | cggccccta | 600 |
| tcgtggaccc | acgtacatcc | aaaggggccg | aaatcgttat | tgagcttgga | attaaaagat | 660 |
| gaccgtcctg | ctcgcgacat | gtgggtaatg | gagaccgggc | tgctgttacc | gcgtgcgact | 720 |
| gctcaagatg | ctggcaaata | ctattgccac | cgtgaaaact | tgactatgag | ctttcacctg | 780 |
| gaaatcacag | ctcgccccgt | tttatggcac | tggttgttac | gcacgggcgg | ttggaagggg | 840 |
| ggctcaggag | gtagcggcgg | gtcaggtgga | tcgggaggtt | ccggcgggag | tatgggacag | 900 |
| aaagaacgtt | caacagccga | tacactgcca | gatttggagg | agtggaagag | cgcagctggc | 960 |
| cttcgttggt | ggcagacagc | cgttgtggat | ggttctgggt | cagggaatga | ggtgattgag | 1020 |
| ggaccgcaga | atgcacgtgt | attgaagggt | tcccaggctc | gctttaactg | caccgtgagc | 1080 |
| cagggctgga | agctgattat | gtgggcactg | agcgacatgg | tggttctttc | agttcgccca | 1140 |
| atggagccta | tcatcacgaa | tgaccgcttc | actagtcagc | gctatgacca | aggggaaac | 1200 |
| ttcactagcg | agatgatcat | ccacaatgtc | gagccctctg | atagcggaaa | tatccgttgt | 1260 |
| tcactgcaga | attcgcgtct | tcacgggtct | gcgtaccttc | cgtccaggt | catggggagag | 1320 |
| ttatttatcc | caagcgtaaa | tttggtggta | gctgagaatg | agccctgtga | ggtgacttgt | 1380 |
| ctgccctctc | attggaccccg | cttgcccgac | atttcatggg | aattaggctt | gttggtctca | 1440 |
| cactcgtctt | attactttgt | accggaaccc | tctgatttgc | aatcagcagt | ctcaattctg | 1500 |

```
gctctgactc ctcaatcaaa cggtacgctt acgtgtgttg cgacatggaa aagtctgaaa    1560
gcgcgtaaat ccgcgacagt caatcttact gttattcgct gtccacaaga cacgggtgga    1620
gggattaata tcccaggagt attgtcctct ttaccgtcgc tggggttcag tcttccgaca    1680
tgggggaagg catgcgaaca aaatccaatt tattgggcgc gttatgctga ttggttattt    1740
acaaccccac tgttactgct tgatttggca ctgcttgttg acgctgacga gggcaccggc    1800
tga                                                                  1803

<210> SEQ ID NO 10
<211> LENGTH: 600
<212> TYPE: PRT
<213> ORGANISM: Artificial Sequence
<220> FEATURE:
<223> OTHER INFORMATION: Amino acid sequence for CM19X4:CD19-JAM4-pHLIP

<400> SEQUENCE: 10

Glu Asn Leu Tyr Phe Gln Gly Pro Glu Glu Pro Leu Val Val Lys Val
1               5                   10                  15

Glu Glu Gly Asp Asn Ala Val Leu Gln Cys Leu Lys Gly Thr Ser Asp
            20                  25                  30

Gly Pro Thr Gln Gln Leu Thr Trp Ser Arg Glu Ser Pro Leu Lys Pro
        35                  40                  45

Phe Leu Lys Leu Ser Leu Gly Leu Pro Gly Leu Gly Ile His Met Arg
    50                  55                  60

Pro Leu Ala Ile Trp Leu Phe Ile Phe Asn Val Ser Gln Gln Met Gly
65                  70                  75                  80

Gly Phe Tyr Leu Cys Gln Pro Gly Pro Pro Ser Glu Lys Ala Trp Gln
                85                  90                  95

Pro Gly Trp Thr Val Asn Val Glu Gly Ser Gly Glu Leu Phe Arg Trp
            100                 105                 110

Asn Val Ser Asp Leu Gly Gly Leu Gly Cys Gly Leu Lys Asn Arg Ser
        115                 120                 125

Ser Glu Gly Pro Ser Ser Pro Ser Gly Lys Leu Met Ser Pro Lys Leu
    130                 135                 140

Tyr Val Trp Ala Lys Asp Arg Pro Glu Ile Trp Glu Gly Glu Pro Pro
145                 150                 155                 160

Cys Leu Pro Pro Arg Asp Ser Leu Asn Gln Ser Leu Ser Gln Asp Leu
                165                 170                 175

Thr Met Ala Pro Gly Ser Thr Leu Trp Leu Ser Cys Gly Val Pro Pro
            180                 185                 190

Asp Ser Val Ser Arg Gly Pro Leu Ser Trp Thr His Val His Pro Lys
        195                 200                 205

Gly Pro Lys Ser Leu Leu Ser Leu Glu Leu Lys Asp Asp Arg Pro Ala
    210                 215                 220

Arg Asp Met Trp Val Met Glu Thr Gly Leu Leu Leu Pro Arg Ala Thr
225                 230                 235                 240

Ala Gln Asp Ala Gly Lys Tyr Tyr Cys His Arg Gly Asn Leu Thr Met
                245                 250                 255

Ser Phe His Leu Glu Ile Thr Ala Arg Pro Val Leu Trp His Trp Leu
            260                 265                 270

Leu Arg Thr Gly Gly Trp Lys Gly Gly Ser Gly Gly Ser Gly Gly Ser
        275                 280                 285

Gly Gly Ser Gly Gly Ser Gly Gly Ser Met Gly Gln Lys Glu Arg Ser
    290                 295                 300
```

```
Thr Ala Asp Thr Leu Pro Asp Leu Glu Glu Trp Lys Ser Ala Ala Gly
305                 310                 315                 320

Leu Arg Trp Trp Gln Thr Ala Val Val Asp Gly Ser Gly Ser Gly Asn
                325                 330                 335

Glu Val Ile Glu Gly Pro Gln Asn Ala Arg Val Leu Lys Gly Ser Gln
                340                 345                 350

Ala Arg Phe Asn Cys Thr Val Ser Gln Gly Trp Lys Leu Ile Met Trp
                355                 360                 365

Ala Leu Ser Asp Met Val Val Leu Ser Val Arg Pro Met Glu Pro Ile
            370                 375                 380

Ile Thr Asn Asp Arg Phe Thr Ser Gln Arg Tyr Asp Gln Gly Gly Asn
385                 390                 395                 400

Phe Thr Ser Glu Met Ile Ile His Asn Val Glu Pro Ser Asp Ser Gly
                405                 410                 415

Asn Ile Arg Cys Ser Leu Gln Asn Ser Arg Leu His Gly Ser Ala Tyr
                420                 425                 430

Leu Thr Val Gln Val Met Gly Glu Leu Phe Ile Pro Ser Val Asn Leu
            435                 440                 445

Val Val Ala Glu Asn Glu Pro Cys Glu Val Thr Cys Leu Pro Ser His
450                 455                 460

Trp Thr Arg Leu Pro Asp Ile Ser Trp Glu Leu Gly Leu Leu Val Ser
465                 470                 475                 480

His Ser Ser Tyr Tyr Phe Val Pro Glu Pro Ser Asp Leu Gln Ser Ala
                485                 490                 495

Val Ser Ile Leu Ala Leu Thr Pro Gln Ser Asn Gly Thr Leu Thr Cys
            500                 505                 510

Val Ala Thr Trp Lys Ser Leu Lys Ala Arg Lys Ser Ala Thr Val Asn
            515                 520                 525

Leu Thr Val Ile Arg Cys Pro Gln Asp Thr Gly Gly Gly Ile Asn Ile
        530                 535                 540

Pro Gly Val Leu Ser Ser Leu Pro Ser Leu Gly Phe Ser Leu Pro Thr
545                 550                 555                 560

Trp Gly Lys Ala Cys Glu Gln Asn Pro Ile Tyr Trp Ala Arg Tyr Ala
                565                 570                 575

Asp Trp Leu Phe Thr Thr Pro Leu Leu Leu Leu Asp Leu Ala Leu Leu
            580                 585                 590

Val Asp Ala Asp Glu Gly Thr Gly
            595                 600
```

METASTASIS INHIBITING PROTEIN

CROSS-REFERENCE TO RELATED APPLICATIONS

This application claims the benefit of U.S. provisional application 63/177,703 filed on Apr. 21, 2021, U.S. provisional application 63/274,788 filed Nov. 2, 2021, and U.S. provisional application 63/296,322 filed on Jan. 4, 2022, the disclosures of which are hereby incorporated in their entirety by reference herein.

REFERENCE TO SEQUENCE LISTING

A sequence listing entitled "82570-356302_Sequence Listing_2022-12-01_ST25.txt" is an ASCII text file and is incorporated herein by reference in its entirety. The text file was created on Dec. 1, 2022, and is 9.35 KB in size.

TECHNICAL FIELD

The disclosure generally relates to biologic products to treat cancer, and more specifically biologic products that promote cancer cell adhesion thereby reducing metastasis and concomitantly enhance CAR-T treatment.

BACKGROUND

Decades of evidence suggest that alterations in the adhesion properties of neoplastic cells endow them with an invasive and migratory phenotype. Tight junctions (TJs) are present in endothelial and epithelial cells. Tumors arise from such tissues, thus, the role of TJ proteins in the tumor microenvironment is important. In tight junctions, junctional adhesion molecules (JAM) play a key role in assembly of the tight junctions and control of cell-cell adhesion. Reprogramming of immune cells using chimeric antigen receptors (CAR) to allow for target recognition and eradication of tumors is an FDA approved therapy. The CAR-T cells recognize cell-surface proteins, such as CD19 a B-cell surface molecule followed by cancer cell death. CD19 is not a unique marker for tumors, liquid or solid. Metastasis still occurs in patients undergoing CAR-T therapy. There is, therefore, a need in the art to address alternate cancer therapies that concomitantly reduce cancer metastasis and proliferation.

BRIEF SUMMARY

A three-domain, fusion protein is disclosed that includes a detection sequence that associates with cancer cells, a cell adhesion sequence, a signaling sequence configured to signal targeting of an anti-signaling CAR-T cell.

In some embodiments, the detection sequence identifies low pH of cancer cells and inserts the detection sequence into the cancer cell plasma membrane. In some embodiments, the detection sequence corresponds to a pH-low-insertion peptide (pHLIP).

In some embodiments, the cell adhesion sequence is an IgSF protein. In some embodiments, the cell adhesion sequence is selected from JAM-A, JAM-B, JAM-C, and JAM-4. In some embodiments, the cell adhesion sequence is JAM-A. In some embodiments, the cell adhesion sequence is JAM-B. In some embodiments, the cell adhesion sequence is JAM-C. In some embodiments, the cell adhesion sequence is JAM-4. In some embodiments, the cell adhesion sequence is JAM-A. In some embodiments, the cell adhesion sequence increases tumor cell-tumor cell adhesion. In some embodiments, the cell adhesion sequence increases tumor cell adhesion to cellular matrix.

In some embodiments, the fusion protein also includes linking segment located between the cell adhesion sequence and the signaling sequence.

In some embodiments, the signaling sequence is an IgSF protein selected from CD19, CD22, CD133, Her-2, EGFR, and mesothelin. In some embodiments, the signaling sequence is CD19. In some embodiments, the signaling sequence is CD22. In some embodiments, the signaling sequence is CD133. In some embodiments, the signaling sequence is Her-2. In some embodiments, the signaling sequence is EGFR. In some embodiments, the signaling sequence is and mesothelin.

In some embodiments, the fusion protein is selected from SEQ ID NO. 4, SEQ ID NO. 6, SEQ ID NO. 8, and SEQ ID NO. 10. In some embodiments, fusion protein is SEQ ID NO. 4. In some embodiments, fusion protein is SEQ ID NO. 6. In some embodiments, fusion protein is SEQ ID NO. 8. In some embodiments, fusion protein is SEQ ID NO. 10.

In another aspect, a system for treating cancer and reducing cancer metastasis includes a fusion protein described herein and CAR-T cells configured to recognize the signaling sequence.

In another aspect, a method for treating cancer is disclosed that includes providing a therapeutically effective amount of a fusion protein described herein to a patient in need thereof. In some embodiments, the method includes providing a therapeutically effective amount of CAR-T cells that recognize the signaling sequence and induce cancer cell death.

In another aspect, a method for manufacturing a cancer therapy includes expressing a protein from a DNA sequence encoding a detection sequence, a cell adhesion sequence, and a signaling sequence, wherein the signaling sequence is configured to signal targeting of an anti-signaling CAR-T cell. In some embodiments, the DNA sequence is selected from SEQ ID NO. 1, SEQ ID NO. 3, SEQ ID NO. 5, SEQ ID NO. 7, and SEQ ID NO. 9.

BRIEF DESCRIPTION OF THE DRAWINGS

The patent or application file contains at least one drawing executed in color. Copies of this patent or patent application publication with color drawing(s) will be provided to the Office upon request and payment of any necessary fee.

A detailed description of the invention is hereafter provided with specific reference being made to the drawings in which:

(FIG. 1B) Plasmid (pET28a) hosting CM19XA, contains a 6×His tag, N-terminal to CD19. (FIG. 1C) Size-exclusion chromatogram of CM19XA purification. (FIG. 1D) Coomassie stain of CM19XA purified fractions and JAM-A as a control.

Figure 1A:
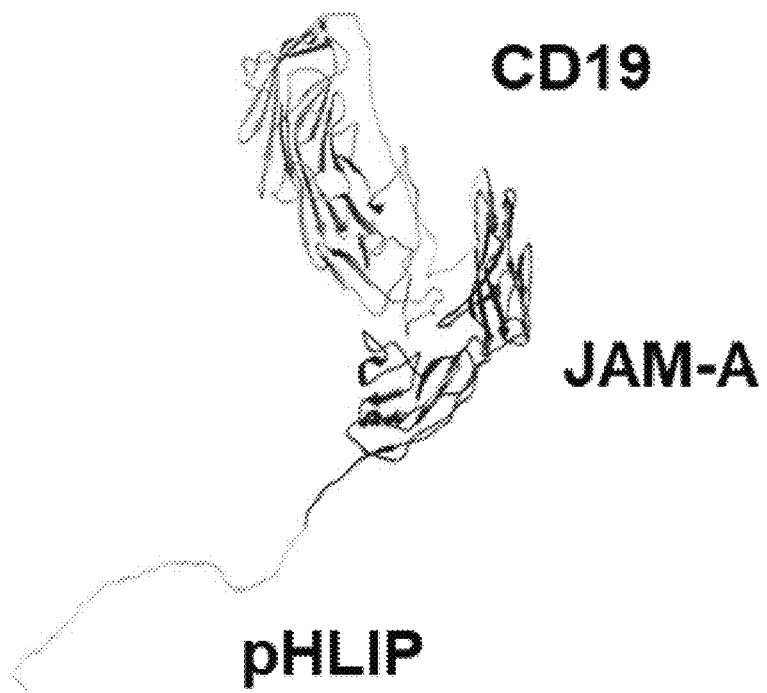
FIGS. 1A-1D depict CM19XA modeling and purification of a first embodiment, CM19XA (FIG. 1A) Computer model of CM19XA. CM19XA consists of CD19 (coral), GS linker (Gray), JAM-A (blue), and pHLIP peptide (yellow).

FIGS. 3A-3D depict observations from a wound healing assay in which movement of CAL27 cells 24 hours after removing the silicon inserts that separate the cells. The gap size at time 0 hours is 500 μm. Culture conditions: (FIG. 3A) control, no addition of proteins, (FIG. 3B) 1 μM JAM-A, (FIG. 3C) 1 μM CM19XA. For each condition, at least 900 individual cells were tracked using FastTrack Artificial Intelligence (AI) automated analysis system, an AI-based vision system from MetaVi Labs/Ibidi (cat no. 32200-3; IBIDI, Grafelfing, Germany). (FIG. 3D) Statistical analysis of the movement of CAL27 cells. The graph reports the average distance between edges of CAL27 cells. The data from four independent wound healing assay experiments are shown as the mean±SD. The statistics show that when comparing control versus JAM-A (*) results in a $p<0.04$. When comparing the control versus CM19XA we get () a p-value of $p<0.01$. These results show that the bigger gap from CM19XA cells is from an increase in TJ formation, which leads to a decrease in cell proliferation and migration. However, with JAM-A there was a decrease of the gap, showing that these cells are proliferating and migrating due to a decrease in TJ formation. These results show that CM19XA decreases the migration from the cancer cells, which is reflective of the decrease in proliferation. Scale bar in panels (FIGS. 3A-3**C) represents 100 μm.

FIGS. 4A-4B depict cell invasion assay of CAL27 cells in which (FIG. 4A) is a comparison of cell index in the absence of exogenous proteins (control) or 1 μM JAM-A. JAM-A triggers an increase of almost 8-fold invasion; (FIG. 4B) is a comparison of cell index in the absence of exogenous proteins (control) or 1 μM CM19XA. CM19XA decreases the rate of invasion by 25%. Statistical analysis was performed using Student's t-test. Panel A, (*) $p<0.005$; Panel B, (**) $p<0.05$.

FIGS. 5A-5C depict proliferation assay observations after 72-h post CAR-T cytotoxic assay of HUVEC, CAL27, or A549 cancer cells in which (FIG. 5A) CM19XA did not increase killing of HUVEC cells. This is because the pHLIP portion of the protein did not insert itself into the membrane of the noncancerous HUVEC cells. (FIG. 5B) Control resulted in the same results where there was no change in the proliferation. JAM-A resulted in an increase of proliferation in both mock and anti-CD19 CAR-T, validating the results from the wound healing assay and the other proliferation assays. CM19XA mock had similar results in proliferation to that of the control. CM19XA treated with anti-CD19 CAR-T cells had a decrease in proliferation, showing that there is an increase in killing. This means that the CD19 component of the CM19XA biologic can be detected by anti-CD19 CAR-T cells. (FIG. 5C) Control resulted in the same results where there was no change, similar to that of CAL27 cells. JAM-A resulted in an increase in proliferation that is similar to the results with the CAL27 cells. CM19XA mock had similar results as seen with CAL27 cells, where there was no killing of CAR-T cells, resulting in similar proliferation as the control. A549 cells CM19XA treated with anti-CD19 CAR-T showed similar results from CAL27 cells, where there was an increase in killing that reflects the decrease in proliferation. Overall, this experiment shows that CM19XA can be recognized by anti-CD19 CAR-T cells via the extracellular component of the biologic, increase cancer cell killing, and decrease proliferation. Statistical analysis was performed using Student's t-test, not statistical difference for panel A ($p<0.1$). Differences were observed with statistical significance for CAL27 ($p<0.01$) and A549 ($p<0.03$).

FIGS. 6A-6B depict observations of cytoxicity assay with images of CAL27 cells at 0 and 72 hours post protein treatment. Cells were incubated with either mock or CD19 CAR-T with a ratio of 1:5 (CAL27: CAR-T). (FIG. 6A) There was no killing observed in mock CAR-T (CAR-T not able to recognize CD19) with the control (no protein), JAM-A, and CM19XA. (FIG. 6B) Anti-CD19 CAR-T cells had no killing from 0 to 72 hours in the presence of the control or JAM-A. There was an increase in target killing of CAL27 cells in the presence of CM19XA, suggesting that the extracellular CD19 in the biologic can work as a recognition site for anti-CD19 CAR-T cells. Scale bar is 100 μm.

FIGS. 7A-7C depict a potential mechanism of action for an embodiment in which (FIG. 7A) tumor formed by cells (green with purple nucleus) establishing cell-cell interactions (black rectangles). One cell poses a risk for metastasis after losing cell attachments to the main tumor. (FIG. 7B) pHLIP (yellow) inserts itself into the membrane of cancer cells. JAM-A (blue) binds to other JAM proteins in the existing cell-cell interactions in trans allowing for homotypic or heterotypic interactions to occur. Additionally, CM19XA may establish de novo cell-cell interactions by creating trans homotypic interactions. CM19XA restrain weakly interacting cells from metastasizing, decreasing proliferation and metastasis. (FIG. 7C) Anti-CD19 CAR-T cells (brown) recognize the tumor cells displaying CD19 (coral) and proceed to eradicate the tumor (gray).

FIGS. 8A-8D depict computational models demonstrating modularity of metastasis-inhibiting protein. (FIG. 8A) CD19 (coral), GS linker (gray), JAM-A (blue), and pHLIP peptide (yellow). (FIG. 8B) CD19 (coral), GS linker (gray), JAM-B (red), and pHLIP peptide (yellow). (FIG. 8C) CD19 (coral), GS linker (gray), JAM-C(purple), and pHLIP peptide (yellow). (FIG. 8D) CD19 (coral), GS linker (gray), JAM 4 (cyan), and pHLIP peptide (yellow).

DETAILED DESCRIPTION

Various aspects are described below with reference to the drawings. The relationship and functioning of the various elements of the aspects may better be understood by reference to the following detailed description. However, aspects are not limited to those illustrated in the drawings or explicitly described below. It should be understood that the drawings are not necessarily to scale, and in certain instances, details may have been omitted that are not necessary for an understanding of aspects disclosed herein, such as conventional fabrication and assembly. Headings are provided for the convenience of the reader and to assist organization of the disclosure and should not be construed to limit or otherwise define the scope of the invention.

Cancer treatment traditionally involves chemotherapy and surgery. Other promising treatments such as genetically engineered T cells called CAR-T (chimeric antigen receptor T cells) target surface proteins such as CD19. Unfortunately, these treatments do not inhibit metastasis. Our biologic consists of 3 components: (1) A fusion protein that detects cancer cells based on their lower pH with the help of pHLIP; (2) JAM binding to other tight junction components with neighboring cells that inhibits the metastasis of cancer cells; (3) A signaling target protein domain, such as CD19, that allows for the recognition of anti-CAR-T (such as anti-CD19-CAR-T) cells to target and eradicate the tumor.

Applicant believes the present disclosure represents the first biologic containing three separate domains with distinct functions targeting cancer while concomitantly reducing metastasis by promoting cancer cell adhesion to other cancer cells.

For example, the present disclosures describes a composition (biologic) having three functional domains: (1) pH-low-insertion peptide (pHLIP) which recognizes the low pH of cancer cells leading to the insertion of the peptide into the plasma membrane; (2) an extracellular domain of JAM proteins that fosters cell-cell interaction (including cellular cohesion); and (3) CD19 to be targeted by CAR-T cells. These compositions target cancer cells, and when coupled with anti-CD19 CAR-T cells, not only promote the death of the cancer cells but also decrease proliferation and metastasis.

The production of a biologic that inhibits metastasis of cancer cells would improve upon currently available targeted cancer treatments. For example, using a fusion protein that would recognize the targeted cell and insert itself into the membrane based on the decreased pH of tumors, which would also allow for the increased interaction between these cancer cells by increasing the tight junctions would decrease the incidence of metastasis. Also, using a targeted signal located on the surface of the membrane of cancer cells that is recognized by existing CAR-T technology would allow for the recognition of a great variety of tumors. Current immune therapy methods are limited due to the need to create individual types of CAR-T cells that recognize different targets such as CD19, CD38 and others, and due to the cost of production. The reason for failure of some of the CAR-T treatments is based on the poor health of the individual, which can result in a low quantity of responsive amount of transformed immune cells.

In our studies, we purified the four members of the Junctional Adhesion Molecule (JAM) protein family JAM-A, -B, -C and 4. We determined that JAMs increase the cell-cell interactions when they are expressed in the tight junction of the cell. We also determined that there is an increase in binding between heterotypic interactions of JAMs compared to homotypic interactions and E-Cadherin. Using the JAM proteins, therefore, will allow for the formation of tight junctions in homotypic or heterotypic interactions that subsequently result in decreasing metastasis in cancer cells. Depending on the patient's target tissue and cancer type the selection of a specific JAM family such as JAM-A, -B, -C or -4 leads to increase tight junction formation with other members of the JAM family.

A peptide sequence known as pH-low-insertion peptide (pHLIP) can recognize changes in pH and insert itself into the membrane of cancer cells. The pHLIP inserts its C-terminus through a membrane under low pH conditions (about 6 to about 6.5). The pHLIP peptide can deliver compounds such as phalloidin which is linked to the C-terminus and is cleaved inside the cells. This results in the immobilization of cytoskeleton and multinucleation due to F actin binding and filament stabilization. Using this pHLIP peptide will allow the fusion biologic to target the cancer cell's low-pH environment, and insert itself into the cancer cell membrane.

Without wishing to be bound to any particularly theory, applicant proposes a method in which a biologic composed of a fusion protein that contains three domains with specific functions will induce cancer cell death while concomitantly reducing cancer cell metastasis. The first domain consists of a pH-sensitive peptide, pHLIP that recognizes and inserts itself into the membrane of cancer cells. The second domain consists of the Junctional Adhesion Molecule (such as JAM-A, -B, -C and -4) which increases the number of tight junctions, allowing for tumor cell-cell interactions that decrease metastasis. The third domain consists of an extracellular region of the target protein that has been seen in many cancers that is a signaling sequence recognizable by a corresponding CAR-T cell. In some embodiments, this signaling sequence is CD19. The signaling sequence (or region) enables CAR-T cells to recognize, bind to, and eradicate the tumor.

To achieve the goal of decreasing metastasis, we created a biologic consisting of a fusion protein N-CD19-GS Linker-JAM-pHLIP peptide-C. This technology is based on the combination of tight junction components that bind tighter than other tight junction components such as claudin proteins. This fusion protein allows the pHLIP peptide to recognize the lower-pH environment produced by cancer cells. When the peptide recognizes the decrease in pH, it incorporates itself into the membrane of the cancer cell. The JAM region of the fusion protein binds to neighboring JAMs, promoting tight junction formation that results in the inhibition of cancer cell metastasis. This approach harnesses the power of tight junctions that allow for the cancer cells to stay within the tumor and not spread throughout the body. The extracellular region of the fusion protein signals recognition by corresponding CAR-T cells that kill (eradicate) the tumor. The novelty of this approach is the introduction of a target site for CAR-T cells on the biologic that can recognize tumors that do not have natively have the extracellular region (CD 19, for example) in or on their membrane surface.

The power of cell adhesion can be harnessed to decrease the incidence of metastasis in tumor cells. Using the tight junction protein junctional adhesion molecules, or JAMs (-A, -B, -C and 4), the incidence of metastasis can be decreased. With the combination of pH-sensitive peptides, pHLIP with JAMs, we can decrease metastasis. Additionally, using CD19 in a fusion with JAMs (-A, -B, -C, and 4) will attract CAR-T cells to target these tumors.

Using the property of cell adhesion, the presently described fusion proteins enable the increase of the tight junction's strength in tumors to prevent metastasis. With the combination of the pHLIP technology, specific tumor cells that increase tumor cell-cell interactions through tight junctions can be enhanced (targeted), resulting in a decrease in metastasis of tumor cells. With the help of extracellular regions (such as CD19), the binding of CAR-T cells can be increased that will target and kill tumor cells.

1. Introduction

The tumor microenvironment (TME) is what surrounds a tumor, including blood vessels, immune cells, fibroblasts, signaling molecules, and extracellular matrix. The tumor and its microenvironment are closely related and constantly interact. Tumor cells achieve these interactions through cell-adhesion and recognition molecules, all members of the immunoglobulin superfamily (IgSF). Among the members of the IgSF are tight junction (TJ) components such as junctional adhesion molecules (JAMs) that act as gates and barriers to control the permeability of the paracellular space. JAMs are an IgSF subfamily that contain four members: A, B, C, and 4. These components are also responsible for compartmentalization of the cellular environment and the separation of tissues. JAM proteins form homotypic and heterotypic interaction among the same family members and may influence other members of the TJ. Contrary to the effects of other TJ components, JAMs are responsible for increased proliferation when downregulated. JAM-A upregulation has been associated with endothelial to mesenchymal transition (EMT). In glioblastoma cells, however, JAM-A may act as a tumor suppressor. In our studies, we determined that JAM homo- and heterotypic interactions are of high binding affinity, resulting in increased cell-to-cell interactions. We also determined that JAMs induced stronger cell adhesion than epithelial cadherin (E-CAD). Harnessing the function of JAMs in the TME may be of importance in translational solutions including those disclosed in the present application.

IgSF proteins play a role in cellular recognition. Tumors often display unique proteins that are naturally targeted by immune cells surveilling the homeostatic landscape. One antigen for cancer immunotherapy is the B-cell-specific surface marker CD19, used because of its expression in B-cell malignancies and lymphomas. An antigen recognizing CD19 (or other cell surface protein), therefore, known as anti-signaling (e.g. CD19) chimeric antigen receptor (CAR) T, is disclosed. It is fused to an intracellular signaling domain capable of activating T-cells to target and eradicate tumors. These CAR-Ts have a surface receptor that works like an antigen recognition domain that recognizes surface receptor targets (such as CD19) leading to activation, cytokine secretion, and cellular proliferation, which in turn lead to tumor eradication. CD19-directed CAR-T cell therapy has been successful in treating several B-cell lineage malignancies, including B-cell non-Hodgkin lymphoma (NHL). CD19-directed CAR-T cell therapy is a FDA-approved treatment that is being expanded to other immune cells and to treat solid tumors. The present disclosure builds on CAR-T cell therapy as a promising future for cancer treatments.

Biologics are powerful treatments that can be made of sugars, proteins, DNA, or composed of whole cells or tissues. Human insulin was the first recombinant biopharmaceutical approved in the United States in 1982. Protein-based therapeutics have been highly successful in the clinic and are recognized for their treatment potential. Based on their pharmacological activity, they can be divided into the categories of: (a) replacing a deficient protein, (b) enhancing a pathway, (c) performing a novel function or activity, (d) interference, and (e) delivering other compounds or proteins. They can be also be classified as non-covalent binding to their respective target, covalent bonding, and non-specific interactions with their respective targets. New engineered proteins—including bispecific mAbs and multi-specific fusion proteins, antibody-drug conjugates, and proteins with optimized pharmacokinetics—are currently under development. There are, however, no conceptually new developments in protein-based biologics. There has been no protein engineering applied to new strategies in decreasing cancer metastasis. Computational designs can be a theoretical approach to practical progress. A paradigm change in the methodologies and understanding of mechanisms is needed to overcome major challenges like the complexity of biological systems, resistance to therapy, and access to targets.

Fusion proteins and fusion peptides as biologics have been described. By joining different proteins that have different beneficial qualities, the potency, stability, and specificity of fusion proteins can be greatly enhanced compared with naturally occurring proteins. PRS-343 is a bispecific fusion protein targeting HER2 and CD137, a costimulatory receptor on T-cells. The PRS-343 architecture is derived from a trastuzumab variant and a CD137 specific anticalin. Anticalins are engineered variants of tear lipocalin and neutrophil-gelatinase-associated lipocalin (NGAL), where loops are randomized by mutagenesis. PRS-343 enables tumor-localized targeting of T-cells. This approach has the potential to provide a more localized activation of the immune system, resulting in higher efficacy and reduced peripheral toxicity. Following this report, the authors initiated a phase I clinical trial with PRS-343 as a first-in-class molecule.

In this application, we disclose a new type of protein-based biologic that aids cancer treatment with CAR-T therapies. We designed a modular three-part biologic that creates new strategies pertaining to pharmacological activity, and activity or function. In this disclosure, we describe the creation of a biologic that consists of three components: (1) a peptide that detects cancer cells based on their lower pH; (2) JAM extracellular domain for binding to other tight junction components in the tumor micro environment that inhibits the metastasis of cancer cells; (3) a signaling target protein domain (e.g. CD19) that allows for the recognition of anti-signaling CAR-T cells (e.g. anti-CD19 CAR-T cells). Our biologic is modular in that the JAM or anti-signaling domains can be exchanged for tumor-specific proteins that modulate cancer cell and tissue types.

Innovations that aid or CAR technology have been developed, such as the secretion of CD19-anti-Her2 bridging protein that allows for T-cell cytotoxicity both in vitro and in vivo. Other examples are the use of bispecific CAR-T to bring two cell types together such as cancer cells and T-cells, and the usage of donor stem cells or induced pluripotent stem cells to produce CAR specific treatments to derive natural killer cells, macrophages that can treat multiple myeloma. While these are very important contributions that target and treat cancer, patient medical needs remain unmet as several patient therapy still results in morbidity often from cancer cell metastasis. In our disclosure, we use a biologic to decrease cellular proliferation and metastasis.

Using JAMs as a part of our cell adhesion domain allows for the formation of cell adhesion homotypic or heterotypic interactions, or both. We recognized that JAM-A binds to other members of the family and coordinates the assembly of the TJ and the interplay with the adherens junction (AJ). The result of strengthening tumor cell-cell interactions subsequently result in decreasing metastasis in cancer cells. In order to introduce the extracellular domain of JAM proteins in the plasma membrane of tumor cells, we considered a peptide sequence known as pH-low-insertion peptide (pH-LIP) that recognizes changes in pH and insert itself into the membrane of cancer cells. The pHLIP inserts its C-terminus through a membrane under low pH conditions (about 6.0-about 6.5). We recognized that this peptide has been used for the delivery of therapeutics. In our design, we considered that pHLIP might allow the fusion biologic to target the cancer cell's low pH and insert itself into the membrane, resulting in the extracellular domain of JAMs to be anchored to the cell surface.

The production of a biologic that inhibits metastasis of cancer cells would improve upon currently available targeted cancer treatment. Inhibition of cancer cell proliferation and metastasis is important in controlling tumor growth, but it is also important to sensitize the tumor to therapeutics, decrease proliferation, and ultimately eradicate it. In one embodiment to accomplish this, we used the extracellular domain of human CD19. The human CD19 antigen is a transmembrane protein belonging to the IgSF. CD19 is a biomarker for normal and neoplastic B cells, as well as follicular dendritic cells. CAR-T is an emerging therapy that targets B cell malignancies based on their cell surface display of CD19. We considered that the addition of this extracellular CD19 domain to our biologic would synergistically complement existing CD19 CAR-T therapies for eradicating tumors. Our approach increases tumor cell-cell adhesion, preventing tumor growth and metastasis, while displaying CD19 on the surface of cancer cells. The combination of these three domains will not be restricted to blood malignancies employed in emerging CAR-T therapy but benefit solid tumors as well.

In one embodiment, we created a fusion protein identified hereafter as CM19XA. The number 19 denotes CD19 while the letter A represents JAM-A soluble domain. The advantages of this biologic are that it contains three separate domains with distinct functions that target cancer cells that can be used in any patient, regardless of their health. This biologic helps existing CAR-T cells target a tumor through the recognition of CD19, while decreasing metastasis. Our biologic is modular and CD19 may be exchanged for other cell surface biomarkers such as CD22, CD133, Her-2, EGFR, mesothelin, and others, and the JAM may be any of the four members of the subfamily, whichever is relevant to the tumor tissue of origin.

Recent advances in protein engineering have come from creating multi-functional chimeric proteins containing modules from various proteins. These modules are typically joined via an oligopeptide linker, the correct design of which can contribute to the desired function of new biologically active molecule. Thus, in some embodiments, the peptides include a linking segment located between the cell adhesion sequence and the signaling sequence.

As a component of recombinant fusion proteins, linkers have utility in the construction of stable, bioactive fusion proteins. The general properties of linkers derived from naturally-occurring multi-domain proteins can be considered as the foundation in linker design. Empirical linkers are generally classified into three categories according to their structures: flexible linkers, rigid linkers, and in vivo cleavable linkers. (See Fusion Protein Linkers: Property, Design and Functionality. Xiaoying Chen, Jennica Zaro, and Wei-Chiang Shen. Adv Drug Deliv Rev. 2013 Oct. 15; 65(10): 1357-1369. doi: 10.1016/j.addr.2012.09.039.)

Linkers can also play a contributory role in the engineering of fusion proteins. Linkers can affect protein properties such as expression level, solubility, and biological functions. For linker design and optimization, one of the key factors is the flexibility or rigidity of the linker sequence, which describes the tendency of a linker to maintain a stable conformation, impacting directly the physical distance between domains in a fusion protein. Library methods of design exist or can be easily constructed based on conventional practice and experimental designs depending on the fusion domains and desired function. (See Zliang Huang, Chong Zhang, Xin-Hui Xing. Design and construction of chimeric linker library with controllable flexibilities for precision protein engineering, Methods in Enzymology, Academic Press, Volume 647, 2021, Pages 23-49, ISSN 0076-6879, ISBN 9780128208182, https://doi.org/10.1016/bs.mie.2020.12.004.)

In order to use our biologic to decrease metastasis and to target these cancer cells for destruction by anti-CD19 CAR-T cells, we address the following questions: (1) Does CM19XA target cancer cells specifically? (2) Does CM19XA decrease metastasis by using the JAM components to establish and increase cell-cell interactions? (3) Does CD19 allow for the targeting of anti-CD19 CAR-T cells? (4) Does CM19XA work on other cancer cell lines? Answers to these questions are addressed in the examples below as illustrated by observations in the accompanying figures.

EXAMPLES

Except in the examples, or where otherwise expressly indicated, all numerical quantities in this description indicating amounts of material or conditions of reaction or use are to be understood as modified by the word "about" in describing the broadest scope of the invention. Practice within the numerical limits stated is generally preferred. The first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

Unless indicated otherwise, all technical and scientific terms used herein have the same meaning as commonly understood by one of ordinary skill in the art to which this invention belongs.

Throughout this application, where publications are referenced, the disclosures of these publications in their entireties are hereby incorporated by reference into this application to more fully describe the state of the art to which this invention pertains.

It is also to be understood that this invention is not limited to the specific embodiments and methods described below, as specific components or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "or" is understood to mean "and/or".

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. When one of these three terms is used, the presently disclosed and claimed subject matter can include the use of either of the other two terms.

2. Materials and Methods 2.1. Cloning, Protein Expression, and Purification

We synthesized the *E. coli* codon-optimized DNA sequence of CM19XA (Twist Bioscience, San Francisco, CA, USA). CM19XA was supplied by TWIST biosciences cloned in the expression vector pET28a, between restrictions sites NdeI and XhoI. A stop codon was introduced prior to the XhoI. The sequence upstream NdeI was the native sequence of pET28a which includes a 6×His-tag sequence. pET28a CM19XA is preserved by transformation in the bacterial strain DH5α. Plasmid purification of a single bacterial colony was performed using the Zyppy Plasmid Miniprep Kit from Zymo Research. Sanger sequencing was performed by Genewiz (South Plainfield, NJ, USA) to determine whether the plasmid coding for CD19-JAMApHLIP was correct and that there were no mutations present. After the verification of the plasmid sequence, we transformed the plasmid into SHuffle T7 express bacterial cells (New England Biolabs, Ipswich, NY, USA) to compare which bacterial strain would give us the highest protein yield. Cells are grown to an $OD_{600}$ of 1, followed by addition of 0.3 mM IPTG, and maintained at 16° C. for 18 hours. The French Press method was used to lyse the transformed bacterial cells. The resuspended cells were loaded into the Thermo Spectronic French Pressure Cell Press Model FA-078. Lysis was performed at 1500-2000 psi using 30 mL of Wash Buffer consisting of 500 mM NaCl and 30 mM Tris and the lysate was collected in a 50 mL conical tube. Centrifugation was performed on the lysate for 30 min at 10,000 RPM with a F15-8×50cy rotor.

The supernatant was decanted into a 50 mL tube containing Ni-NTA Agarose beads from Prometheus (catalog no. 20-512) and incubated while rotating for 1 h at 4° C. The column was washed with 100 mL of wash buffer containing 30 mM TRIS pH 7.5 and 500 mM NaCl, and 30 mM Imidazole pH 8.0. The supernatant was eluted for 3 min with 300 mM Imidazole, then concentrated using the Microsep Advance with 10 k Omega centrifugal device (reference no. MCP010C41) from Pall Corporation at 10,000 RPM for 10 min until a final volume of 2 mL was reached.

2.2. Size Exclusion Chromatography (SEC)

Size exclusion chromatography was performed using the NGC System (BioRad, Hercules, CA, USA). The column used was the ENrich™ SEC 65,010×300 mm, 24 mL, prepacked high-resolution SEC 650 column, with a size range of 5650 kDa (BioRad, Hercules, CA, USA). The protein peak was observed using the BioRad SEC software. The product peaks' positions were compared relative to those of the size exclusion standards from BioRad (catalog no. 151-1901). Protein concentration was determined using the Nanodrop Onec from Thermo Scientific. The running buffer used was PBS, and proteins were also stored in PBS. Purification of JAM-A was performed as described in our previous publication.

2.3. SDS-PAGE Assay

Two µg of boiled MBP, JAM-A, and CM19XA were electrophoresed on 8% SDS-PAGE gel (BioRad). Gel staining was performed using standard protocols.

2.4. Tissue Culture and In Vitro Experiments with CAL27 and A549 Cells

Tongue squamous cell carcinoma cells (Cal27, ATCC CRL-2095) were obtained from American Type Culture Collection (ATCC, Manassas, VA, USA) and cultured according to the guidelines provided by the organization. RPMI, calcium-free with 10% FBS was used for all manipulations and the experimental set-up of CAL27 cells. A549 cells, epithelial cell lung carcinoma, were obtained from ATCC (catalog reference CCL-185).

2.5. Proliferation Assay

The first day of the proliferation assay consisted of 30,000 CAL27 cells seeded on 48-well plates. On the second day (at approximately 16 hours), cells were treated with PBS or proteins at a final protein concentration of 1 µM (MBP-JAMA or CM19XA). After 24 hours, proliferation assays were performed using ATPlite Luminescence Assay System (product number 6016943, PerkinElmer, American Fork, UT, USA) following the manufacturer's instructions. After 72 hours of mock or anti-CD19 CAR-T killing assay for both CAL27 and A549 cells, we performed the ATPlite Luminescence Assay [49,50].

2.6. Wound Healing Assay

The wound healing assay was performed as follows: on the first day, 15,000 CAL27 cells were seeded on each chamber of the 2-well silicone insert (IBIDI, Gräfelfing, Germany) separated by a silicone gap of 500±100 µm. After 24 hours, proteins were added at a final concentration of 1 µM, JAM-A or CM19XA. Cells were incubated with the treatments for 2 hours at 37° C. Following the treatment, the silicon insert was removed. The wells were rinsed once with PBS and then each well was filled with DMEM F-12 media with 10% FBS (Genesee Scientific, El Cajon, CA, USA). The closure of the gap (500 µm+/−100 µm at time zero) was evaluated 16 hours post treatment using an Olympus IX70 microscope (Olympus Life Science, Waltham, MA, USA). Images were analyzed using cellSens Entry Microscopy Imaging Software by Olympus Life Science. The distance of the gaps was then quantified using ImageJ [51]. Data analyzed using FastTrack AI (IBIDI, Gräfelfing, Germany).

2.7. Real-Time Cell Invasion

Real-time cell invasion was determined after the various treatments. The xCEL-Ligence RTCA cell monitoring system was used to quantify real-time invasion of cells per the protocol suggested by the manufacturer (ACEA Biosciences, Blue Springs, MO, USA). The invasion was performed in 16-well CIM plates (n=10 groups per treatment, ACEA Biosciences, Blue Springs, MO, USA). The tops of the wells were coated using a 1:40 Matrigel concentration (Fisher Scientific, Pittsburgh, PA, USA). Then, a concentration of 20,000 CAL27 cells was used with 100 µL of 2% FBS RPMI, with and without proteins. The bottom chamber wells were treated with 160 µL of 10% FBS RPMI. Cells were placed in the xCeLLingence RTCA instrument, where the invasion readings were taken 4 times an hour for 24 hours.

2.8. CAR-T Cell Killing Assay

On the first day, 5000 CAL27 or A549 or HUVEC cells/well (catalog C0035C, Thermo Fisher Scientific, MA, USA) were plated on a 96-well plate. On day 2, cells were incubated for 3 h under the following conditions: 14 wells had no treatment, which was used as a control. In 16 of the wells, 1 µM soluble JAM-A protein was introduced. In 14 of the wells, 1 µM of CM19XA was introduced. On day 2, both mock CAR-T and anti-CD19 CAR-T were dispensed to half of the wells in each treatment. The killing assay was allowed to continue for a total of 72 hours.

2.9. Computer Models of the Biologic

Protein models were produced using UCSF Chimera v. 1.15 package from the Resource for Biocomputing, Visualization, and Informatics at the University of California, San Francisco (supported by NIH P41 RR-01081).

2.10. Statistical Analysis

Student's t-test was performed using GraphPad Prism version 8.0 to generate the graphs to compare control vs. JAM-A and CM19XA.

3. Results and Discussion 3.1. Expression and Purification of CM19XA in *E. coli*

Figure 1B:
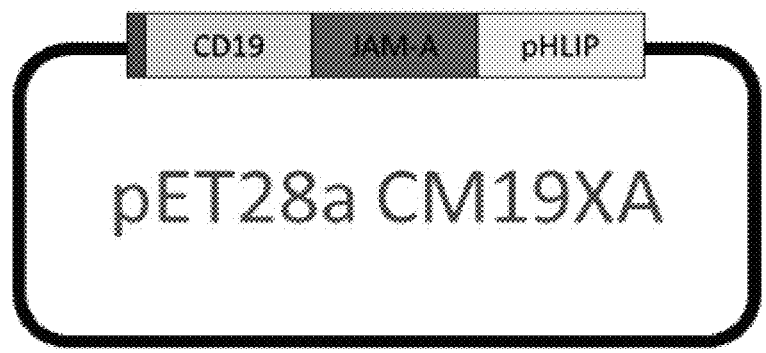
Figure 1C:
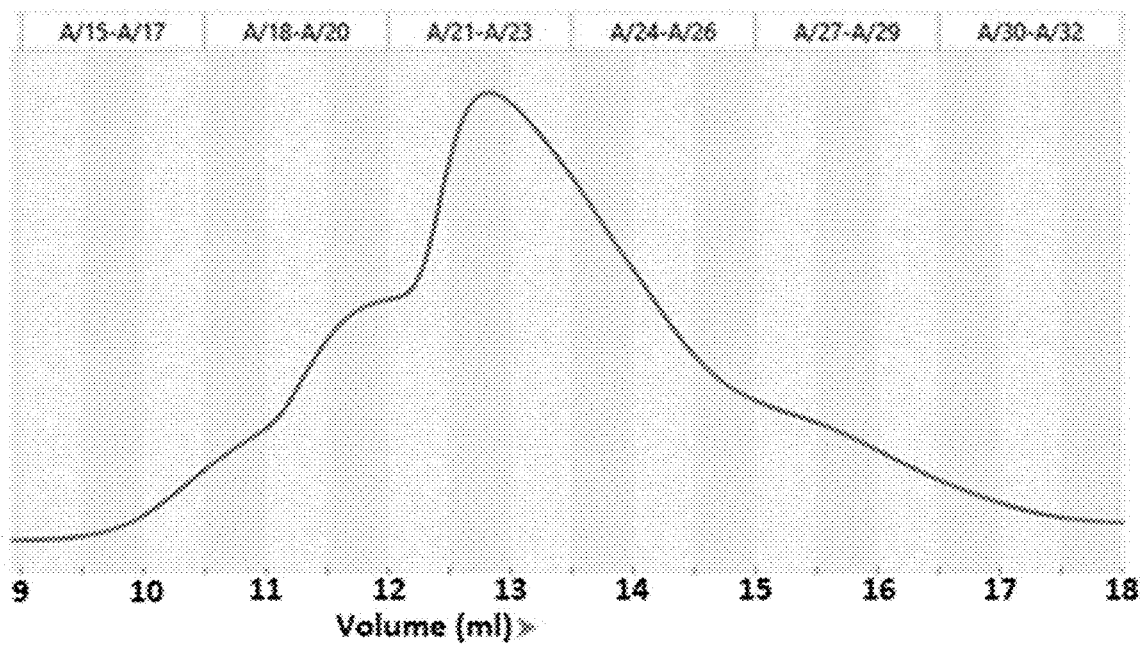
Figure 1D:
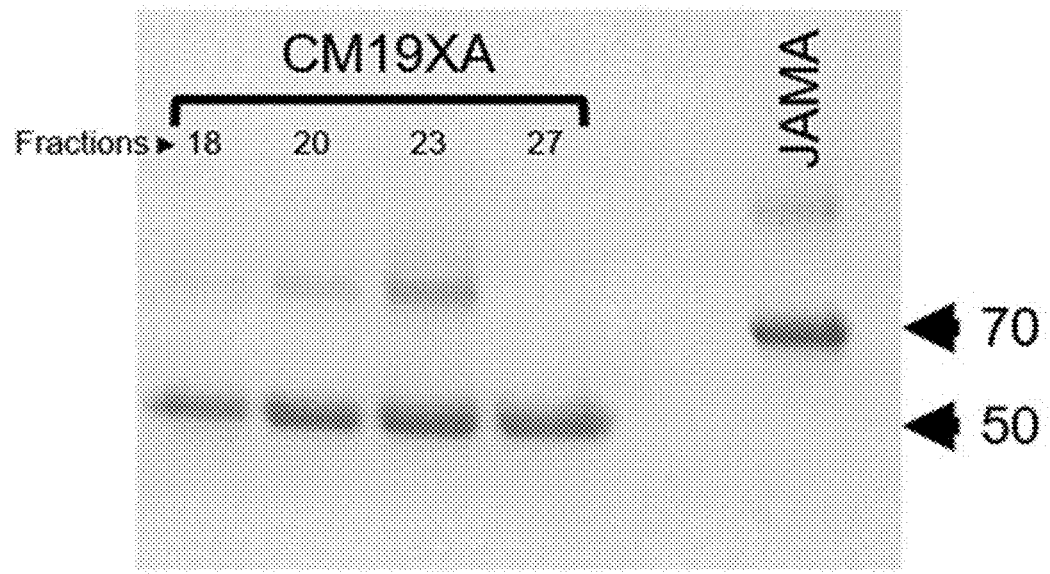

Extracellular domains of JAM-A were expressed as a fusion with CD19 and pHLIP containing an N-terminal 6x-HIS tag to allow for the use of Nickel NTA purification strategy (FIGS. 1A-1D). The resulting biologic protein referred after as CM19XA. CM19XA was modeled using UCSF Chimera to determine the folding of the protein (FIG. 1A). The model shows the CD19 (coral), with a Gly-Ser linker (gray) that connects JAM-A and the pHLIP peptide (yellow). After modeling, CM19XA was subcloned in a Kanamycin-resistant pET28a plasmid (FIG. 1B). Since two domains of CM19XA (CD19 and JAM-A) require proper disulfide formation to allow for the correct folding and function, we used the SHuffle T7 Express bacterial strain. This bacterial strain allows for the cytosolic expression of target proteins, while enabling proper disulfide bond formation and high protein yield. The plasmids hosting CM19XA, or JAM-A were transformed into SHuffle T7 bacterial cells and grown at 37° C. in LB containing kanamycin (required by pET28a) and spectinomycin (required by SHuffle cells). Ni-NTA resin affinity chromatography was followed by Size Exclusion Chromatography (SEC). The results of the purification of CM19XA by SEC showed dimers (FIG. 1C). The formation of dimers is consistent with our previous publication where we observed dimer formation with JAM-A. The protein size was determined to be about 61.5 kDa (FIG. 1D), as expected (Figure S1). JAM-A has a size of 70 kDa (FIG. 1D) because this protein is fused with MBP, as reported in our previous studies.

3.2. Proliferation Assay

To determine whether CM19XA targets cancer cells, we used the cell line CAL27 in a proliferation assay. We recognized that the membrane composition of the TJ is simple, consisting of claudin-1, JAM-A, and occludin. We also recognized that the downregulation of JAM-A through siRNA leads to cell proliferation. We confirmed this result and comparing the effects of the soluble extracellular domain of JAM-A and CM19XA in CAL27 cells. The comparison of these two proteins resulted in opposite CAL27 cell behavior in the proliferation assay (FIG. 2) that equates ATP production to cell proliferation. JAM-A increases the proliferation of the CAL27 cells with a ratio value of 1.239 compared to 1.000 obtained in the control (no proteins added). This means that JAM-A increases proliferation of CAL27 cells, perhaps by disrupting trans-interactions and fostering cis-binding to native JAM-A. This result is consistent with other observations. In contrast, CM19XA decreased the proliferation of CAL27 cells, 0.783-fold of the control. This means that CM19XA is functional by first inserting the pHLIP peptide into the membrane of the CAL27 cells, and second, the JAM-A domain establishes cell-to-cell interactions that lead to decreased CAL27 proliferation.

The proliferation assay of CAL27 cells shows that there is a decrease in the proliferation with the addition of CM19XA. The proliferation assay was different for the introduction of JAM-A, where there was an increase of proliferation as compared to no effect with the control. The data discussed above shows that soluble JAM-A decreases tumor cell-cell adhesion, leading to an increase in cellular proliferation. The biologic CM19XA increased cell-to-cell adhesion by increasing JAM protein binding to other TJ proteins either by homotypic or heterotypic interactions. This could be due to JAM-A not inserting itself into the membrane and binding to other JAMs (-A, -B, -C, and 4) in cis that cause an interruption in the cell-to-cell interactions meaning that there is a decrease in TJ trans interactions. In the case of CM19XA, the decrease in proliferation is caused by the pH sensitive region of the biologic inserting itself into the membrane of the cancer cells that allows the JAM-A portion of the biologic to reinforce the binding of native JAM proteins in trans leading to greater tumor cell-to-cell interactions. The phenotype observed, therefore, is consistent with decreased proliferation because CM19XA increases binding of TJ components such as JAMs.

3.3. Wound Healing Assay

In order to validate the ATP proliferation experiments where JAM-A increases CAL27 proliferation and CM19XA decreased CAL27 cell proliferation, we performed a wound healing assay. This assay allow us qualitatively and quantitatively determine whether the JAM-A portion of CM19XA would increase tumor cell-cell interactions, and as a result, decrease cell migration, resulting in a larger observed gap. Cell migration is important in many physiological processes that are heavily regulated. Wound healing and cancer cell migration assays are widely used for the understanding of cues that can increase or decrease cell migration. Thus, we decided to use CM19XA with CAL27 cells to determine the effect this biologic had on cell migration by performing wound healing assays.

Figure 2:
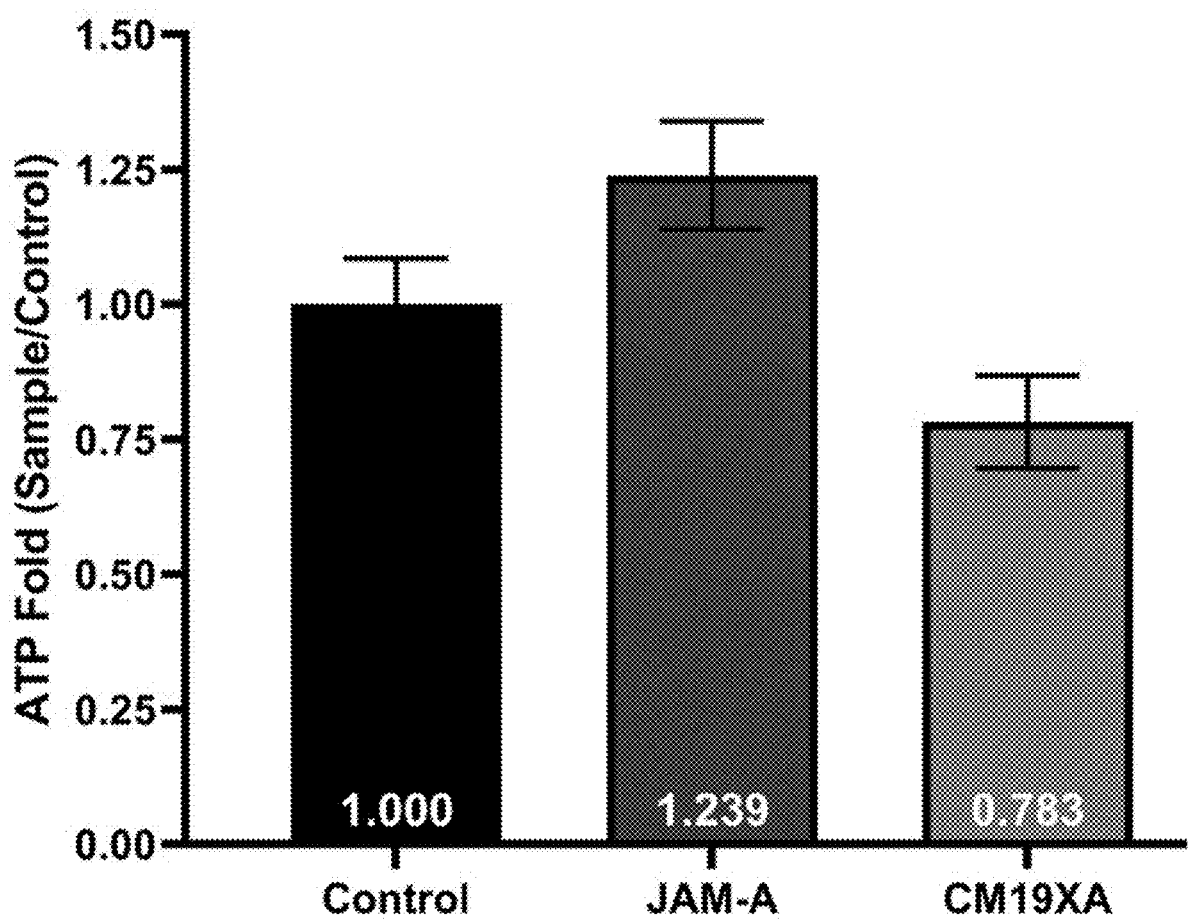
FIG. 2 depicts measurement of proliferation assay of Cal27 cells demonstrating CM19XA decreases Cal27 cell proliferation, wherein data are expressed as fold of CAL27 proliferation without treatment (control). JAM-A compared to the control increases proliferation, while CM19XA caused a decrease in proliferation compared to the control and JAM-A. This decrease in proliferation is due to the pHLIP portion of CM19XA inserting itself into the membrane, allowing for the JAM-A portion to bind to other JAM proteins in trans. As a result, the binding of JAM-A of CM19XA in trans allows for an increase in cell-to-cell interaction. Statistical analysis using Student's t-test was performed.
Figure 3A:
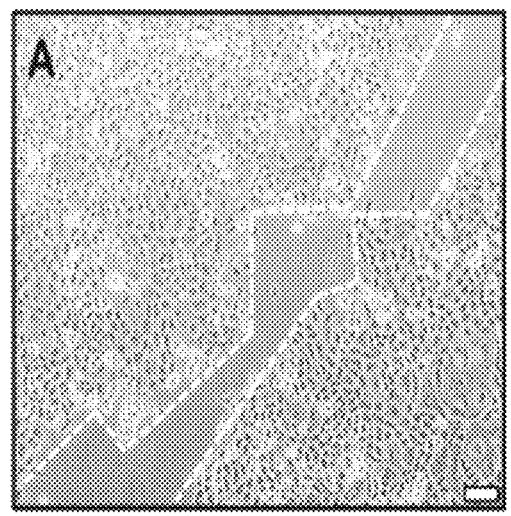
Figure 3B:
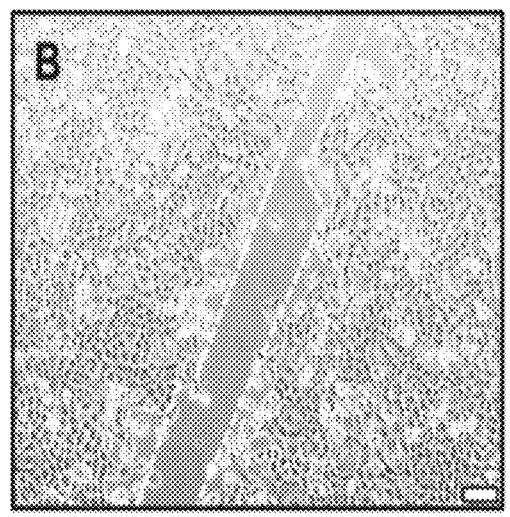
Figure 3C:
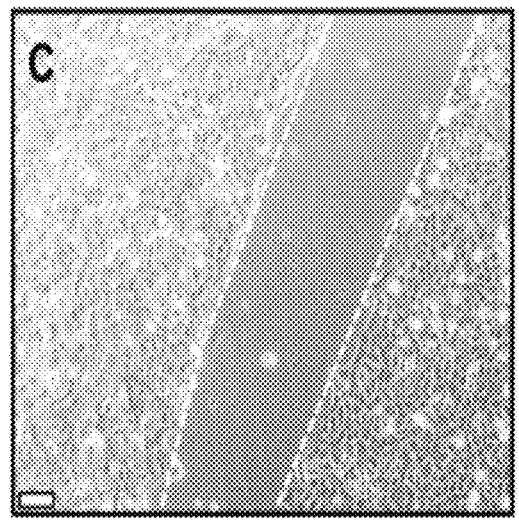
Figure 3D:
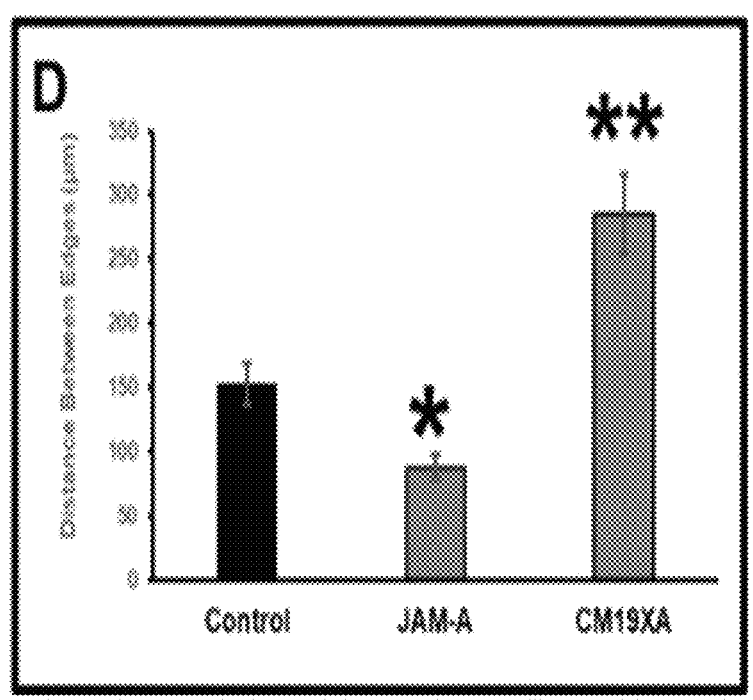

The wound healing experiments show the effects of our biologic, CM19XA qualitatively at FIGS. 3A-3C). We determined that soluble JAM-A increased cell migration, and as a result the gap created at the beginning of the experiment (500 μm) was decreased to an average of 88 μm determined from four independent experiments. Without addition of proteins (control), the gap closure was in average of 153 μm. This validated the ATP proliferation results shown in FIG. 2, where JAM-A increased CAL27 cell proliferation. The drastic result was observed with CM19XA where the gap was greater than the control and JAM-A, at 285 μm in average. This demonstrates that CM19XA is functional, and the JAM-A portion of the protein is able to establish cell-cell interactions, decreasing cell migration (FIGS. 3A-3D) and proliferation (FIG. 2). The analysis of the data as the mean±SD is presented in FIG. 3D.

3.4. Cell Invasion Assay

Figure 4A:
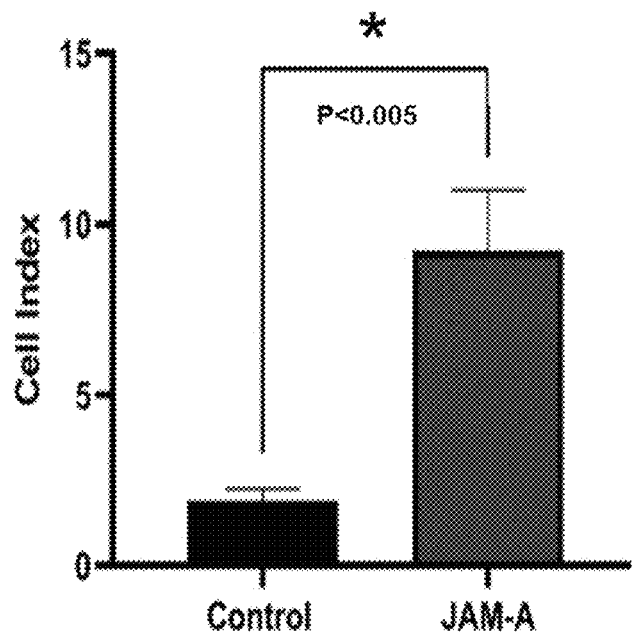
Figure 4B:
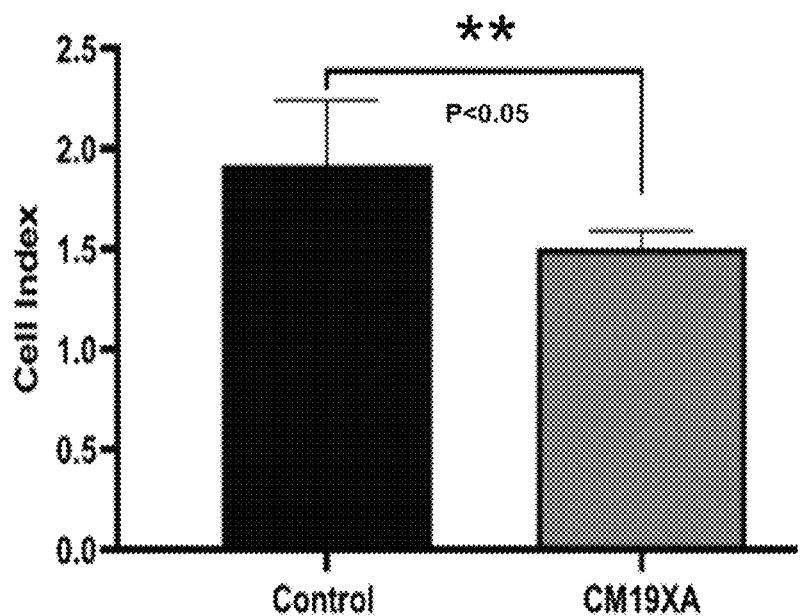

Based on the results of the wound healing assay, we determined the effect of CM19XA on cell invasion. Cell invasion recordings were observed to be low for the control containing only 10% FBS. JAM-A resulted in an increase of cell invasion (FIG. 4A), which could be due to how the protein is binding in cis to other JAMs, decreasing tumor cell-cell interactions and promoting proliferation. JAM-A increases cell invasion by about 8-fold compared to the control, which is consistent with the increase in proliferation (FIG. 2) and decreased gap in wound healing (FIGS. 3A-3D). CM19XA de-creased invasion by 25% compared to the control (FIG. 4B). The decrease in cancer cell invasion by CM19XA is consistent with the decrease in proliferation (FIG. 2), and an increase of gap formation in the wound healing assay (FIGS. 3A-3D), meaning that this biologic is binding in trans to other JAM proteins that decrease cellular proliferation, increase TJ formation, and as a result, decrease cell invasion (metastasis).

Cell invasion recordings were observed to be low for the control containing only 10% FBS. JAM-A resulted in an increase of cell invasion (FIG. 4A), which could be due to how the protein is binding in cis to other JAMs, decreasing cell-cell interactions and promoting proliferation. JAM-A increases cell invasion by about 8-fold compared to the control, which is consistent with the increase in proliferation (FIG. 2) and decreased gap in wound healing (FIGS. 3A-3D). CM19XA decreased invasion by 25% compared to the control (FIG. 4B). The decrease in cancer cell invasion by CM19XA is consistent with the decrease in proliferation (FIG. 2), and an increase of gap formation in the wound healing assay (FIGS. 3A-3D), meaning that this biologic is binding in trans to other JAM proteins that decrease cellular proliferation, increase TJ formation, and as a result, decrease cell invasion (metastasis).

3.5. CM19XA Only Targets Cancer Cells

Figure 5A:
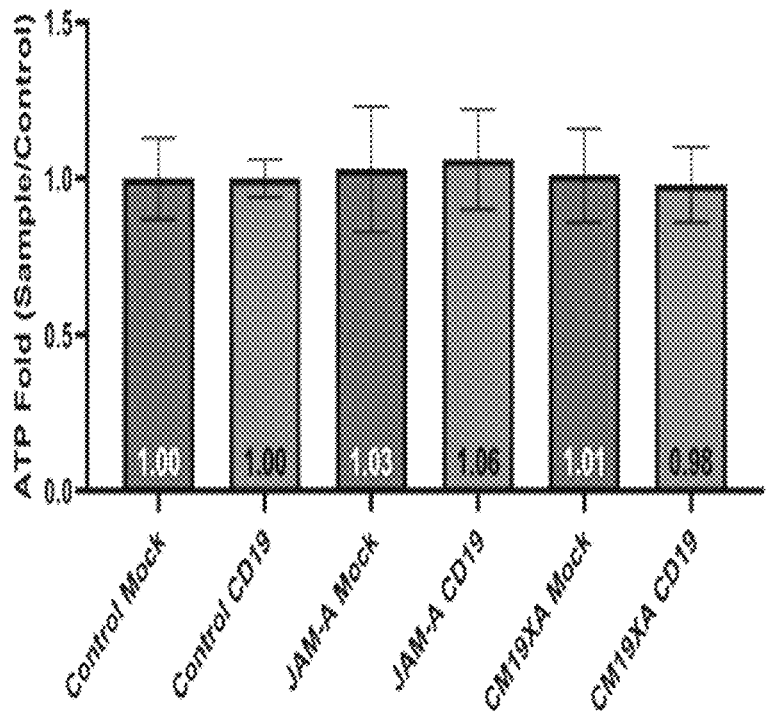

In order to determine whether CM19XA only targeted cancer cells, we used the non-cancerous HUVEC cell line. We determined that addition of soluble JAM-A protein increased cellular proliferation (FIG. 5A) as seen in the previous cell lines. CM19XA, however, did not increase the killing of HUVEC cells (FIG. 5A). This is due to the pHLIP peptide portion of the biologic not inserting itself into the membrane of the cells. Anti-CD19 CAR-T cells, therefore, are not recognizing the HUVEC cells or CM19XA, and, no killing occurs. This shows that CM19XA is cancer specific.

Figure 5B:
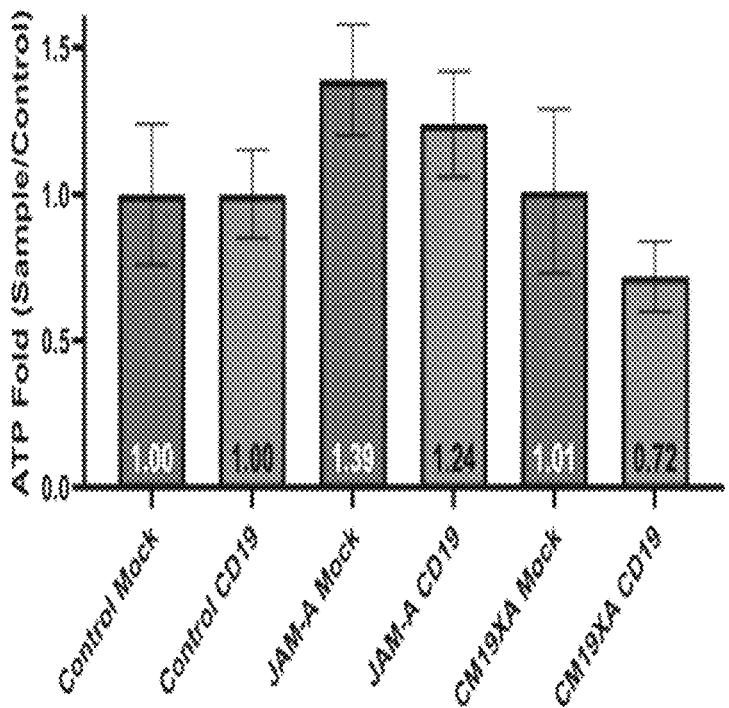
Figure 5C:
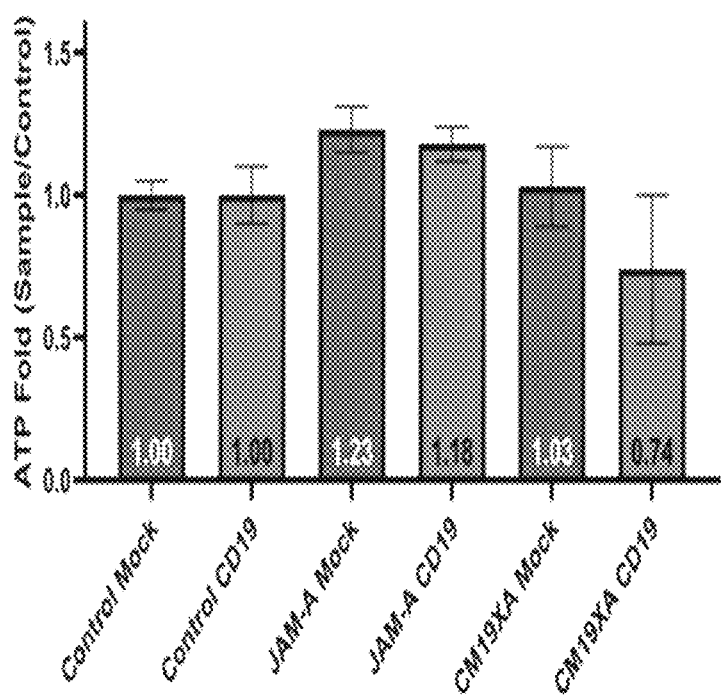
Figure 6A:
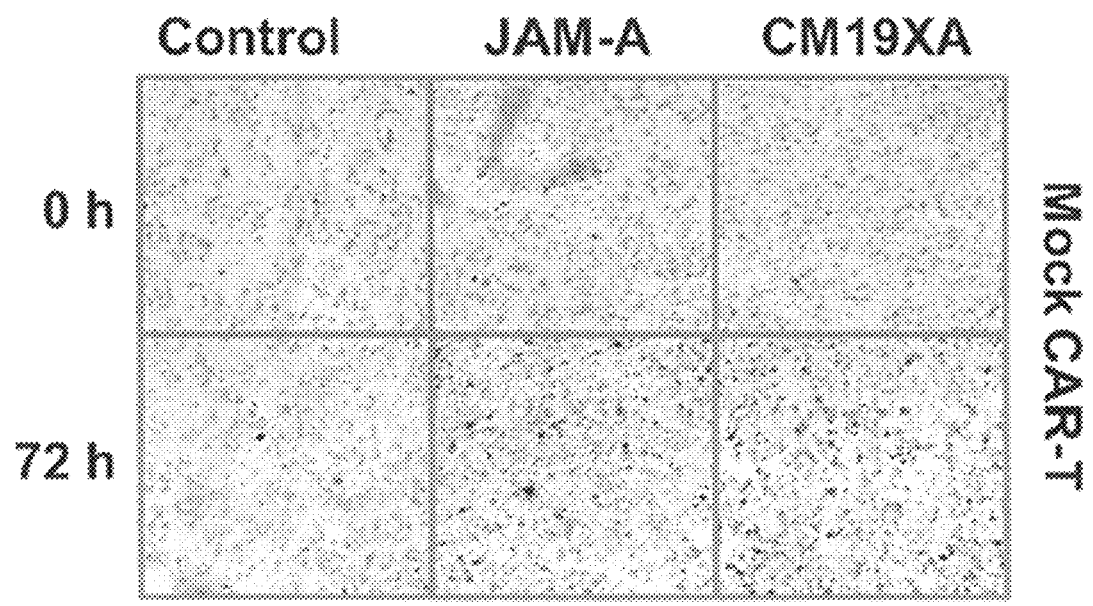
Figure 6B:
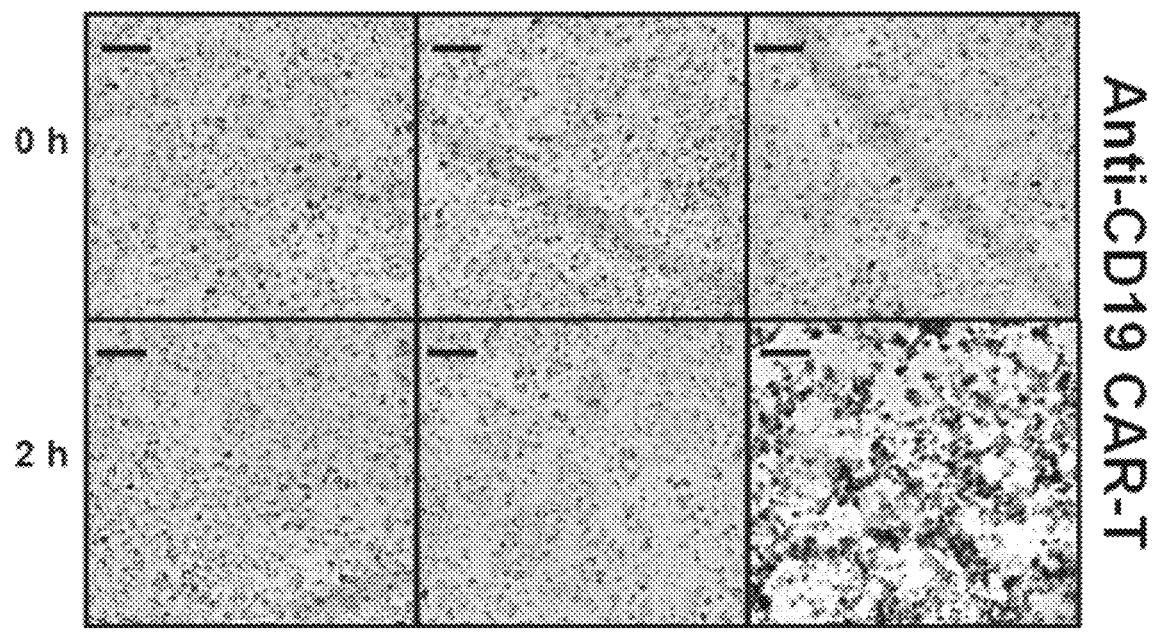

To determine whether CM19XA targets other cancer cells, we repeated the cytotoxicity experiments with A549 lung cancer cells. The cytotoxicity cell assay in FIG. 6B demonstrates that CAR-T is able to recognize the extracellular portion of CM19XA and kill the target CAL27 cells (FIG. 6B). The same effect seen with CAL27 cells was seen in A549 cells in proliferation assays after 72-hours after CAR-T treatment (FIG. 5C). JAM-A in CAL27 cells in the mock experiment showed an ATP fold increase of 1.39, similar to 1.23 in A549, suggesting an increase in proliferation. Similar results were seen in anti-CD19 with JAM-A for CAL27 cells: the ATP fold increase was 1.24 and for A549 the result was 1.18 suggesting that in both cases, JAM-A increases cellular proliferation compared to both the mock control and the CD19 control (FIGS. 6A-6B). When comparing to the CM19XA mock we see that the ATP fold increase for Ca127 cells is 1.01 and 1.03 for A549 which is similar to 1.00 as seen mock controls (FIGS. 5A-5C). This means that the mock CAR-T cell lines do not kill the target cell lines since they are not able to recognize the extracellular CD19 domain of CM19XA. When anti-CD19 CAR-T cells were used, however, we observed that there is decrease in the proliferation of 0.72 fold for CAL27 cells and 0.74 fold for A549 (FIGS. 5A-5C). Without wishing to be bound to any particularly theory, we believe the CM19XA is able to work in both cell lines by t (1) inserting itself using the pHLIP peptide domain, (2) increasing tight junction formation by JAM-A binding in trans to other JAM proteins that increase cell-to-cell interaction using the junctional adhesion molecule domain, and (3) CD19 acting as a recognition signal for anti-CD19 CAR-T cells to recognize and kill the targeted cancer cells.

3.6. Cytotoxicity Assay

To determine whether the CD19 portion of CM19XA worked as a signal to allow for CAR-T cells to recognize and kill cancer cells, we performed cytotoxicity assays. We used cultured cells as a model system to determine the functionality of extracellular CD19 as a target signal for anti-CD19 CAR-T cells. Cells were observed to grow without problems for mock CAR-T experiments using a CAR-T cell that did not recognize the CD19 portion of CM19XA as expected. There was no effect on the killing of CAL27 cells with the mock CAR-T experiments using control (no protein), JAM-A, and CM19XA (FIG. 6A). In contrast, when using the anti-CD19 CAR-T cells that recognize extracellular CD19, differences were observed. There was no killing in the control (no protein), or JAM-A condition, but there was an increase in killing when CM19XA was used (FIG. 6B). The increase of killing of anti-CD19 CAR-T cells targeting CM19XA was observed in the decrease of proliferation of CAL27 cells (FIG. 5B).

3.7. Proposed Mode of Action of CM19XA

Figure 7A:
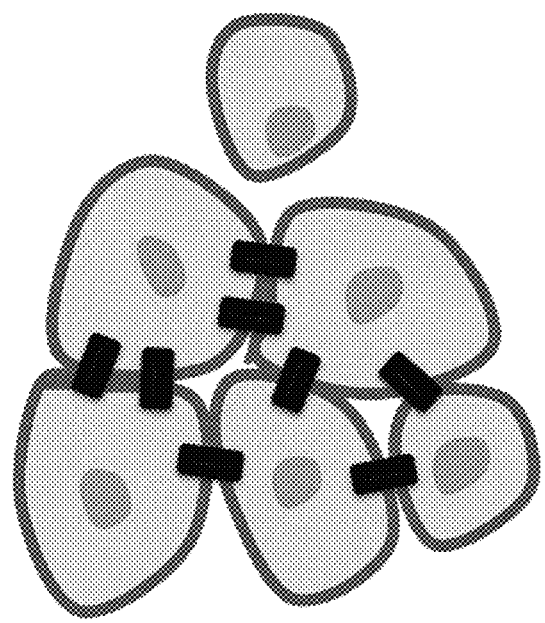
Figure 7B:
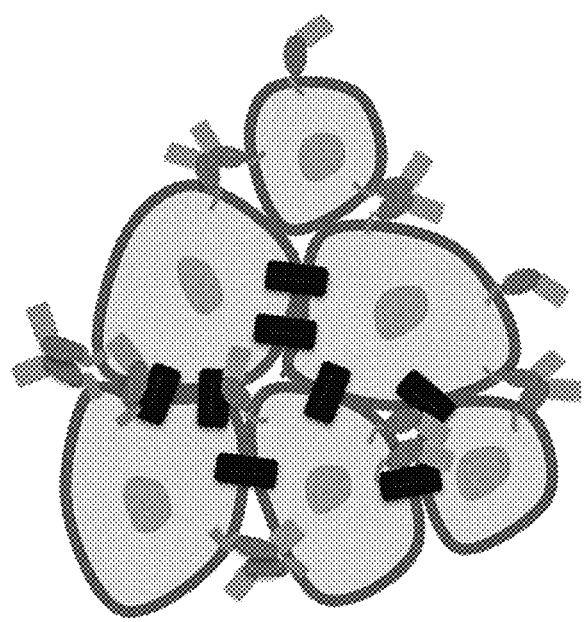
Figure 7C:
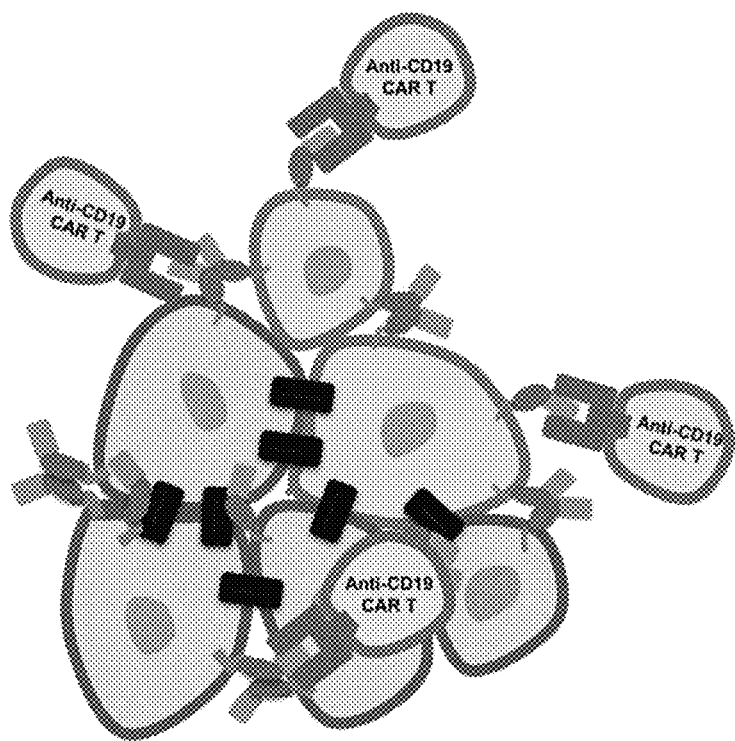
Figure 8A:
Figure 8B:
Figure 8C:
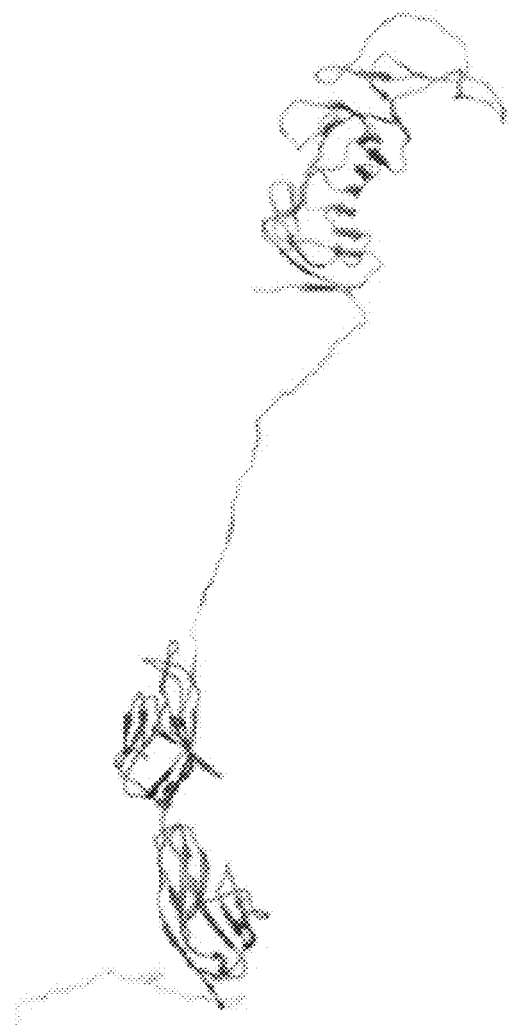
Figure 8D:
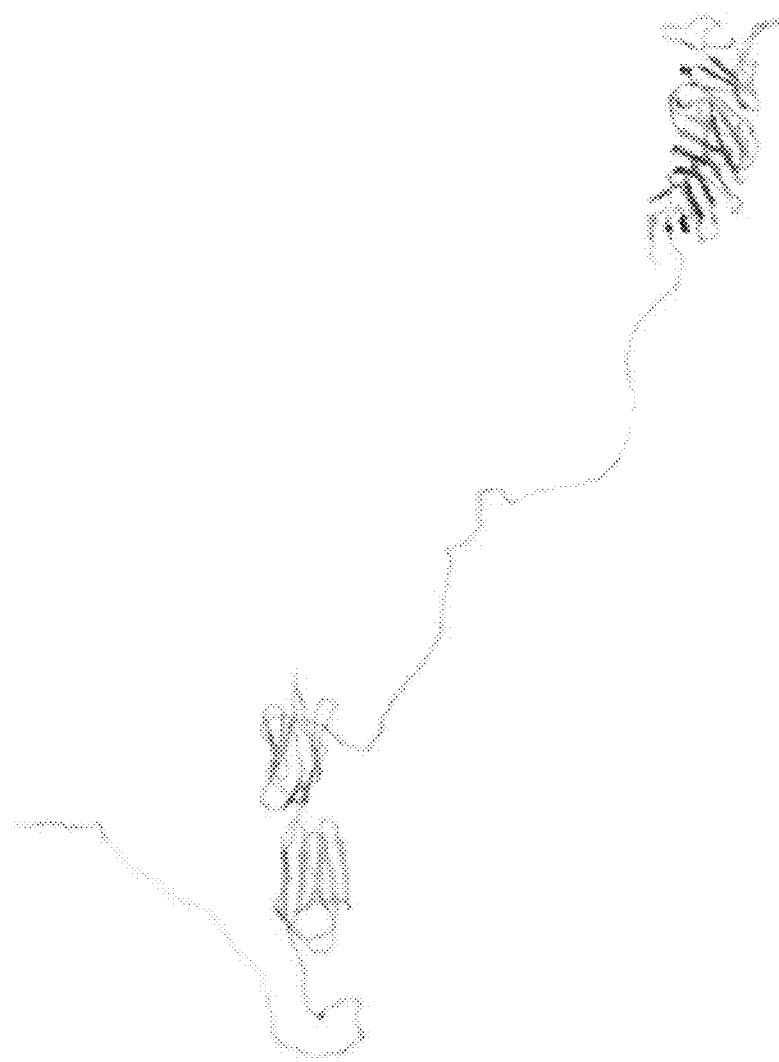

Without wishing to be bound to any particular theory, we present our biologic, CM19XA that identifies and target cancers according to the decreased pH of the membrane of cancer cells (FIGS. 7A-7C). The pHLIP peptide inserts into the membrane displaying the two soluble domains, CD19 and JAM-A. JAM-A increases tumor cell-to-cell interactions, decreasing cancer proliferation. Over the last decade, the key role of the tight junction in tumor progression and metastasis has been observed. In addition to its role in the control of paracellular diffusion, the tight junction has a role in maintaining cell-to-cell adhesion and tissue integrity. Thus, CM19XA, or any of its derivatives where the JAM domain is replaced by JAM-B, -C, or -4, strengthens the tight junction and cell-to-cell interactions (FIGS. 8A-8D). The modularity of our biologic can address the differences in tight junction composition due to tissue-specific expression of its membrane components. CD19 can be used as a recognition signal for anti-CD19 CAR-T cells.

The identification of pro- and anti-cancer roles among TJs such as claudins has been puzzling. Similarly, the role of JAM-A and JAM-C in the progression of malignant neoplasm has been described to have a number of contradicting phenotypes. The role of JAM proteins in cancer is, therefore, complex. JAMs function by interacting with other proteins via several mechanisms: direct cell-cell interaction on adjacent cells, stabilization of adjacent cell surface receptors on the same cell, and interactions between JAM and cell surface receptors expressed on adjacent cells. The diverse interactions contribute to both the pro- and antitumorigenic functions of JAM. This paradigm can also be observed in a study that presents evidence that JAM-A knockdown accelerates the proliferation and migration of human keratinocytes. Other research examined the role of JAM-A in multiple myeloma (MM). In vitro JAM-A inhibition impaired MM migration, while in vivo treatment with an anti-JAM-A monoclonal antibody impaired tumor progression. These results could correspond to JAM-A interactions and effects within the same cell or to a signal transduction that is not fully understood. The importance of mechanical transduction from cellular junctions, both TJ and AJ, is poorly understood. Other research highlights the need for further study of this phenomenon. Additionally, a report that JAM-A functions in a tumor-suppressive role by increasing apoptosis and suppressing proliferation in colorectal adenocarcinoma revealed that loss of JAM-A expression increased intestinal epithelial cell proliferation. The relevance of this paradigm may simply indicate that regulation of JAM-A expression in the context of cell proliferation may be tissue- and cell-specific.

Considering that JAM-A is a player that coordinates TJ and AJ's interplay, understanding its function in tumorigenesis and metastasis is germane to the identification and selection of junctional adhesion molecule domain. While assessing invasive breast cancer, data shows that cell lines with the lowest migratory capacity (T47D and MCF-7 cells) express higher levels of JAM-A relative to more migratory lines (MDA-MB-231 cells). Ectopic expression of JAM-A in these highly metastatic cells diminished both cell migration and invasion. On the contrary, silencing of JAM-A expression enhanced the invasiveness of the less migratory lines. Nevertheless, evidence for the opposite phenotypes can also be found. Functional inhibition of JAM-A protein activity inhibits the adhesion and trans-endothelial migration of breast cancer cells. Human nasopharyngeal cancer cells exhibit increased JAM-A levels, which leads to increased endothelial-to-mesenchymal transition. In lung adenocarcinoma, the suppression of JAM-A expression by siRNA inhibited cellular motility and invasiveness, while JAM-A inhibition caused a decrease in colony-forming capability in vitro and an inhibition of tumorigenicity in vivo.

As a final consideration, CM19XA lacks the capability of intracellular signaling. This could be a reason why the results we observed deviate from what could be expected according to the previous discussion. CM19XA is capable of carrying out two functions once inserted in the membrane through pHLIP. First, CD19 attracts CAR-T cells; second, JAM-A interacts with other TJ membrane proteins (trans and cis interactions) and also exhibits self-interaction; both will result in cis and trans interactions. From this point of view, CM19XA can be examined for its role as an adhesion molecule rather than its signal transduction leading to tumor related phenotypes. If our hypothesis is correct, then the idea that regulation of JAM-A expression in the context of cell proliferation may be tissue- and cell-specific will not apply. We imagine that as an adhesion promoting agent CM19XA will be tissue independent. Tissue specificity may require utilizing a different biology (FIGS. 8A-8D) among the modular designs we have prepared. Homeostasis in healthy tissues strongly relies on cell-to-cell adhesion and cell-to-extracellular matrix interactions. Despite many studies describing the relationships between malignant transformation, metastasis, and cellular adhesion processes, many questions remain. Cadherins and integrins are among the most studied classes of adhesion receptors. Integrins play a key role in single-cell migration, which requires the complete loss of AJs mediated by epithelial cadherin (E-CAD). In malignant transformation in the epithelium, cells lose their dependence on integrin-mediated interactions with the extracellular matrix. During this process, AJs and E-CAD are lost along cell-cell interactions. On the other hand, loss of E-CAD inhibits CD103 antitumor activity, reducing checkpoint blockade responsiveness in melanoma. Restoring E-CAD could be a potential approach for cancer therapy. Multiple natural compounds have been shown to possess antitumor activities through the regulation of key molecules in signaling pathways, including restoring E-CAD cell-cell adhesion. Considering the previous argument, we suggest that CM19XA acting mostly as a cell-adhesion enhancer is capable of decreasing metastasis. Considering that JAM-A may interact with E-CAD, then a possibility for signal transduction via CM19XA:E-CAD interactions should also be considered.

The modularity of our biologic can address the differences in TJ composition due to tissue-specific expression of its membrane components. CD19 can be used as a recognition signal for anti-CD19 CAR-T cells. In traditional anti-CD19 CAR-T therapies, the cell targets the naturally displayed CD19 of B cell malignancies. The modularity of our biologic will enable the selection of any surface biomarker desired based on the tumor type.

4. Conclusions

We designed and tested CM19XA, a three-domain biologic. We presented evidence that our biologic inserts itself into cancer cells using its pHLIP peptide. The second domain of the biologic, JAM-A, increases cell-to-cell interactions that in turn decrease proliferation and may prevent tumor cells from leaving their niche, inhibiting metastasis. The third domain of the biologic, CD19, is recognized by anti-CD19 CAR-T cells, allowing for targeted cancer cell killing. Our biologic produced similar results in two cell lines, CAL27 and A549 and had no effect on the non-cancer cell line HUVEC, showing that it is cancer specific. This suggests that CM19XA and protein constructs like it may be used as a therapeutic that recognizes multiple cancer cell lines. CM19XA's adhesive properties provide increased cell-to-cell interactions through its JAM domain, and cellular recognition of immune cells through the CD19 domain, resulting in cancer cell killing. We suggest that CM19XA is a new classification of protein-based biologic that pairs with current CAR therapies to recognize cancer cells, increases cell-to-cell interactions that lead to a decrease in proliferation and metastasis, and increases cancer cell killing.

CAR-T is produced from a patient's blood, where the gene for a single receptor is inserted with the purpose of attacking a specific cancer cell. These genetically engineered T-cells are then re-introduced into the patient. Looking forward, CM19XA (and biologics like it) will advance the treatment of cancer by serving as an additional tumor specific mechanism. This biologic can be manufactured at large scale and can be used to target CD19, CD38, or other specific tumor targets using the corresponding CAR-T cell design. Depending on the type of tumor cell to be targeted, the JAM proteins (A, B, C, and 4) can be interchanged. Future work will include in vivo experimentation and characterization of potency, stability, and specificity. Analysis of CM19XA and its derivatives will involve cytokine release syndrome (CRS) grading and other safety measurements as the research progresses.

A nucleic acid sequence useful for expressing a metastasis inhibiting fusion protein of plasmid pET28a is as follows (SEQ ID NO: 1):

```
  1    actatatccg gattggcgaa tgggacgcgc cctgtagcgg cgcattaagc gcggcgggtg
 60    tggtggttac gcgcagcgtg accgctacac ttgccagcgc cctagcgccc gctcctttcg
120    ctttcttccc ttcctttctc gccacgttcg ccggctttcc ccgtcaagct ctaaatcggg
180    ggctcccttt agggttccga tttagtgctt tacggcacct cgaccccaaa aaacttgatt
240    agggtgatgg ttcacgtagt gggccatcgc cctgatagac ggttttcgc cctttgacgt
300    tggagtccac gttctttaat agtggactct tgttccaaac tggaacaaca ctcaaccta
360    tctcggtcta ttcttttgat ttataaggga ttttgccgat ttcggcctat tggttaaaaa
420    atgagctgat ttaacaaaaa tttaacgcga attttaacaa aatattaacg cttacaattt
480    aggtggcact tttcgggaa atgtgcgcgg aacccctatt tgtttatttt tctaaataca
540    ttcaaatatg tatccgctca tgaattaatt cttagaaaaa ctcatcgagc atcaaatgaa
600    actgcaattt attcatatca ggattatcaa taccatattt ttgaaaaagc cgtttctgta
660    atgaaggaga aaactcaccg aggcagttcc ataggatggc aagatcctgg tatcggtctg
720    cgattccgac tcgtccaaca tcaatacaac ctattaattt ccctcgtca aaaataaggt
780    tatcaagtga gaaatcacca tgagtgacga ctgaatccgg tgagaatggc aaaagtttat
```

-continued

```
 840   gcatttcttt ccagacttgt tcaacaggcc agccattacg ctcgtcatca aaatcactcg
 900   catcaaccaa accgttattc attcgtgatt gcgcctgagc gagacgaaat acgcgatcgc
 960   tgttaaaagg acaattacaa acaggaatcg aatgcaaccg gcgcaggaac actgccagcg
1020   catcaacaat attttcacct gaatcaggat attcttctaa tacctggaat gctgttttcc
1080   cggggatcgc agtggtgagt aaccatgcat catcaggagt acggataaaa tgcttgatgg
1140   tcggaagagg cataaattcc gtcagccagt ttagtctgac catctcatct gtaacatcat
1200   tggcaacgct acctttgcca tgtttcagaa caactctggg cgcatcgggc ttcccataca
1260   atcgatagat tgtcgcacct gattgcccga cattatcgcg agcccattta tacccatata
1320   aatcagcatc catgttggaa tttaatcgcg gcctagagca agacgtttcc cgttgaatat
1380   ggctcataac acccttgta ttactgttta tgtaagcaga cagtttatt gttcatgacc
1440   aaaatccctt aacgtgagtt ttcgttccac tgagcgtcag accccgtaga aaagatcaaa
1500   ggatcttctt gagatccttt ttttctgcgc gtaatctgct gcttgcaaac aaaaaaacca
1560   ccgctaccag cggtggtttg tttgccggat caagagctac caactctttt tccgaaggta
1620   actggcttca gcagagcgca gataccaaat actgtccttc tagtgtagcc gtagttaggc
1680   caccacttca gaactctgt agcaccgcct acatacctcg ctctgctaat cctgttacca
1740   gtggctgctg ccagtggcga taagtcgtgt cttaccgggt tggactcaag acgatagtta
1800   ccggataagg cgcagcggtc gggctgaacg gggggttcgt gcacacagcc cagcttggag
1860   cgaacgacct acaccgaact gagataccta cagcgtgagc tatgagaaag cgccacgctt
1920   cccgaaggga gaaaggcgga caggtatccg gtaagcggca gggtcggaac aggagagcgc
1980   acgagggagc ttccaggggg aaacgcctgg tatctttata gtcctgtcgg gtttcgccac
2040   ctctgacttg agcgtcgatt tttgtgatgc tcgtcagggg gcggagcct atggaaaaac
2100   gccagcaacg cggccttttt acggttcctg gccttttgct ggccttttgc tcacatgttc
2160   tttcctgcgt tatcccctga ttctgtggat aaccgtatta ccgcctttga gtgagctgat
2220   accgctcgcc gcagccgaac gaccgagcgc agcgagtcag tgagcgagga agcggaagag
2280   cgcctgatgc ggtatttct ccttacgcat ctgtgcggta tttcacaccg caatggtgca
2340   ctctcagtac aatctgctct gatgccgcat agttaagcca gtatacactc cgctatcgct
2400   acgtgactgg gtcatggctg cgccccgaca cccgccaaca cccgctgacg cgccctgacg
2460   ggcttgtctg ctcccggcat ccgcttacag acaagctgtg accgtctccg ggagctgcat
2520   gtgtcagagg ttttcaccgt catcaccgaa acgcgcgagg cagctgcggt aaagctcatc
2580   agcgtggtcg tgaagcgatt cacagatgtc tgcctgttca tccgcgtcca gctcgttgag
2640   tttctccaga agcgttaatg tctggcttct gataaagcgg ccatgttaa gggcggtttt
2700   ttcctgtttg gtcactgatg cctccgtgta aggggattt ctgttcatgg gggtaatgat
2760   accgatgaaa cgagagagga tgctcacgat acgggttact gatgatgaac atgcccggtt
2820   actggaacgt tgtgagggta acaactggc ggtatggatg cggcgggacc agagaaaaat
2880   cactcaggt caatgccagc gcttcgttaa tacagatgta ggtgttccac agggtagcca
2940   gcagcatcct gcgatgcaga tccggaacat aatggtgcag ggcgctgact tccgcgtttc
3000   cagactttac gaaacacgga accgaagac cattcatgtt gttgctcagg tcgcagacgt
3060   tttgcagcag cagtcgcttc acgttcgctc gcgtatcggt gattcattct gctaaccagt
3120   aaggcaaccc cgccagccta gccgggtcct caacgacagg agcacgatca tgcgcacccg
3180   tggggccgcc atgccggcga taatggcctg cttctcgccg aaacgtttgg tggcgggacc
```

-continued

```
3240  agtgacgaag gcttgagcga gggcgtgcaa gattccgaat accgcaagcg acaggccgat
3300  catcgtcgcg ctccagcgaa agcggtcctc gccgaaaatg acccagagcg ctgccggcac
3360  ctgtcctacg agttgcatga taaagaagac agtcataagt gcggcgacga tagtcatgcc
3420  ccgcgcccac cggaaggagc tgactgggtt gaaggctctc aagggcatcg gtcgagatcc
3480  cggtgcctaa tgagtgagct aacttacatt aattgcgttg cgctcactgc ccgctttcca
3540  gtcgggaaac ctgtcgtgcc agctgcatta atgaatcggc caacgcgcgg ggagaggcgg
3600  tttgcgtatt gggcgccagg gtggtttttc ttttcaccag tgagacgggc aacagctgat
3660  tgcccttcac cgcctggccc tgagagagtt gcagcaagcg gtccacgctg gtttgcccca
3720  gcaggcgaaa atcctgtttg atggtggtta acggcgggat ataacatgag ctgtcttcgg
3780  tatcgtcgta tcccactacc gagatatccg caccaacgcg cagcccggac tcggtaatgg
3840  cgcgcattgc gcccagcgcc atctgatcgt tggcaaccag catcgcagtg gaacgatgc
3900  cctcattcag catttgcatg gtttgttgaa aaccggacat ggcactccag tcgccttccc
3960  gttccgctat cggctgaatt tgattgcgag tgagatattt atgccagcca gccagacgca
4020  gacgcgccga gacagaactt aatgggcccg ctaacagcgc gatttgctgg tgacccaatg
4080  cgaccagatg ctccacgccc agtcgcgtac cgtcttcatg ggagaaaata atactgttga
4140  tgggtgtctg gtcagagaca tcaagaaata acgccggaac attagtgcag gcagcttcca
4200  cagcaatggc atcctggtca tccagcggat agttaatgat cagcccactg acgcgttgcg
4260  cgagaagatt gtgcaccgcc gctttacagg cttcgacgcc gcttcgttct accatcgaca
4320  ccaccacgct ggcacccagt tgatcggcgc gagatttaat cgccgcgaca atttgcgacg
4380  gcgcgtgcag ggccagactg gaggtggcaa cgccaatcag caacgactgt ttgcccgcca
4440  gttgttgtgc cacgcggttg ggaatgtaat tcagctccgc catcgccgct tccactttt
4500  cccgcgtttt cgcagaaacg tggctggcct ggttcaccac gcgggaaacg gtctgataag
4560  agacaccggc atactctgcg acatcgtata acgttactgg tttcacattc accaccctga
4620  attgactctc ttccgggcgc tatcatgcca taccgcgaaa ggttttgcgc cattcgatgg
4680  tgtccgggat ctcgacgctc tcccttatgc gactcctgca ttaggaagca gcccagtagt
4740  aggttgaggc cgttgagcac cgccgccgca aggaatggtg catgcaagga gatggcgccc
4800  aacagtcccc cggccacggg gcctgccacc atacccacgc cgaaacaagc gctcatgagc
4860  ccgaagtggc gagcccgatc ttccccatcg gtgatgtcgg cgatataggc gccagcaacc
4920  gcacctgtgg cgccggtgat gccggccacg atgcgtccgg cgtagaggat cgagatctcg
4980  atcccgcgaa attaatacga ctcactatag ggaattgtg agcggataac aattcccctc
5040  tagaaataat tttgtttaac tttaagaagg agatatacca tgggcagcag ccatcatcat
5100  catcatcaca gcagcggcct ggtgccgcgc ggcagccata tggaaaacct gtatttccag
5160  gggcccgagg aaccctggt ggtgaaagtc gaggagggcg ataacgctgt cctgcaatgc
5220  cttaagggaa cgtctgacgg ccccacacaa caattaacat ggtctcgcga atccccttg
5280  aagcccttt tgaaactgtc attaggcttg cccggtcttg ggatccacat gcgtccatta
5340  gcgatttggc ttttcatctt caatgtctcg caacaaatgg gcggtttcta cctttgtcaa
5400  cctggacccc ctagtgaaaa agcgtggcaa cccgggtgga ctgtcaatgt cgaaggatct
5460  ggcgagcttt tccgttggaa cgtaagtgac ttaggtggac tgggctgcgg tcttaaaaat
5520  cgctccagcg agggcccaag tagtccatct ggcaaactga tgtcgccaaa gctttatgtt
5580  tgggcaaaag atcgcccaga aatttggaaa ggtgagccgc cctgcttacc acccgtgat
5640  tctttgaacc aatcacttag ccaggactta actatggcac caggagtac gctttggttg
```

-continued

```
5700  agttgcggcg ttcctcctga ttcagtctcc cgcggccctc tgtcttggac gcacgtccat
5760  ccaaagggcc cgaagtccct gttaagcctt gagttgaaag atgaccgccc tgctcgcgat
5820  atgtgggtca tggaaacggg gttgctttta ccgcgtgcca cagcgcaaga tgcgggaaaa
5880  tattactgcc accgcggaaa tttaacgatg tccttccatt tggagatcac cgcccgtccg
5940  gtattgtggc actggctgct gcgcacaggg ggctggaaag ggggatccgg tgggtctgga
6000  ggaagtggcg gaagtggtgg atctggcggt agttccgtga cggtccactc atctgagccg
6060  gaagttcgca ttcctgaaaa caaccccgta aaactgagtt gcgcctattc agggttttca
6120  tcacctcgcg tcgaatggaa attcgatcaa ggtgacacca ctcgcttagt gtgttataac
6180  aacaaaatca cggcgtcata cgaggatcgc gttactttct taccaacagg catcaccttt
6240  aaatctgtaa cacgcgagga tacaggaacc tatacttgta tggtttcgga ggagggtggg
6300  aattcgtacg gcgaggtaaa agtcaaattg attgtgttag tcccgccttc aaagcccacg
6360  gttaatattc cctcgtctgc tacaattggt aaccgcgccg ttcttacatg ctccgaacaa
6420  gatggtagtc cgccctccga atatacatgg ttcaaggacg gcatcgtaat gccaacaaat
6480  ccgaaaagta cacgcgcttt cagcaattcg tcatacgtct taaatcccac caccggcgaa
6540  ttggtcttcg atccactttc agcctctgac actggtgagt actcatgcga ggctcgtaat
6600  ggctatggta cgccaatgac aagtaacgct gtacgcatgg aggcggtcga acgcaacgtt
6660  ggagttgcct gtgagcagaa tcccatctac tgggcgcgct atgcggactg gttattcacg
6720  acaccttac tgctgttgga cttagcccctt cttgttgacg ccgatgaggg aactgggtga
6780  tgactcgagc accaccacca ccaccactga gatccggctg ctaacaaagc ccgaaaggaa
6840  gctgagttgg ctgctgccac cgctgagcaa taactagcat aaccccttgg ggcctctaaa
6900  cgggtcttga ggggtttttt gctgaaagga gga
```

The translation product of pET28a from the encoding nucleic acid SEQ ID NO: 1 is SEQ ID NO. 2:

```
Met Gly Ser Ser His His His His His His Ser Ser Gly Leu Val Pro
1               5                   10                  15

Arg Gly Ser His Met Glu Asn Leu Tyr Phe Gln Gly Pro Glu Glu Pro
            20                  25                  30

Leu Val Val Lys Val Glu Glu Gly Asp Asn Ala Val Leu Gln Cys Leu
            35                  40                  45

Lys Gly Thr Ser Asp Gly Pro Thr Gln Gln Leu Thr Trp Ser Arg Glu
        50                  55                  60

Ser Pro Leu Lys Pro Phe Leu Lys Leu Ser Leu Gly Leu Pro Gly Leu
65                  70                  75                  80

Gly Ile His Met Arg Pro Leu Ala Ile Trp Leu Phe Ile Phe Asn Val
                85                  90                  95

Ser Gln Gln Met Gly Gly Phe Tyr Leu Cys Gln Pro Gly Pro Pro Ser
                100                 105                 110

Glu Lys Ala Trp Gln Pro Gly Trp Thr Val Asn Val Glu Gly Ser Gly
            115                 120                 125

Glu Leu Phe Arg Trp Asn Val Ser Asp Leu Gly Gly Leu Gly Cys Gly
        130                 135                 140

Leu Lys Asn Arg Ser Ser Glu Gly Pro Ser Ser Pro Ser Gly Lys Leu
145                 150                 155                 160

Met Ser Pro Lys Leu Tyr Val Trp Ala Lys Asp Arg Pro Glu Ile Trp
                165                 170                 175
```

```
Glu Gly Glu Pro Pro Cys Leu Pro Pro Arg Asp Ser Leu Asn Gln Ser
            180             185             190

Leu Ser Gln Asp Leu Thr Met Ala Pro Gly Ser Thr Leu Trp Leu Ser
        195             200             205

Cys Gly Val Pro Pro Asp Ser Val Ser Arg Gly Pro Leu Ser Trp Thr
    210             215             220

His Val His Pro Lys Gly Pro Lys Ser Leu Leu Ser Leu Glu Leu Lys
225             230             235             240

Asp Asp Arg Pro Ala Arg Asp Met Trp Val Met Glu Thr Gly Leu Leu
            245             250             255

Leu Pro Arg Ala Thr Ala Gln Asp Ala Gly Lys Tyr Tyr Cys His Arg
            260             265             270

Gly Asn Leu Thr Met Ser Phe His Leu Glu Ile Thr Ala Arg Pro Val
        275             280             285

Leu Trp His Trp Leu Leu Arg Thr Gly Gly Trp Lys Gly Gly Ser Gly
        290             295             300

Gly Ser Gly Gly Ser Gly Ser Gly Gly Ser Gly Gly Ser Ser Val
305             310             315             320

Thr Val His Ser Ser Glu Pro Glu Val Arg Ile Pro Glu Asn Asn Pro
            325             330             335

Val Lys Leu Ser Cys Ala Tyr Ser Gly Phe Ser Ser Pro Arg Val Glu
            340             345             350

Trp Lys Phe Asp Gln Gly Asp Thr Thr Arg Leu Val Cys Tyr Asn Asn
            355             360             365

Lys Ile Thr Ala Ser Tyr Glu Asp Arg Val Thr Phe Leu Pro Thr Gly
        370             375             380

Ile Thr Phe Lys Ser Val Thr Arg Glu Asp Thr Gly Thr Tyr Thr Cys
385             390             395             400

Met Val Ser Glu Glu Gly Gly Asn Ser Tyr Gly Glu Val Lys Val Lys
            405             410             415

Leu Ile Val Leu Val Pro Pro Ser Lys Pro Thr Val Asn Ile Pro Ser
            420             425             430

Ser Ala Thr Ile Gly Asn Arg Ala Val Leu Thr Cys Ser Glu Gln Asp
        435             440             445

Gly Ser Pro Pro Ser Glu Tyr Thr Trp Phe Lys Asp Gly Ile Val Met
        450             455             460

Pro Thr Asn Pro Lys Ser Thr Arg Ala Phe Ser Asn Ser Ser Tyr Val
465             470             475             480

Leu Asn Pro Thr Thr Gly Glu Leu Val Phe Asp Pro Leu Ser Ala Ser
            485             490             495

Asp Thr Gly Glu Tyr Ser Cys Glu Ala Arg Asn Gly Tyr Gly Thr Pro
            500             505             510

Met Thr Ser Asn Ala Val Arg Met Glu Ala Val Glu Arg Asn Val Gly
        515             520             525

Val Ala Cys Glu Gln Asn Pro Ile Tyr Trp Ala Arg Tyr Ala Asp Trp
        530             535             540

Leu Phe Thr Thr Pro Leu Leu Leu Leu Asp Leu Ala Leu Leu Val Asp
545             550             555             560

Ala Asp Glu Gly Thr Gly
            565
```

The modularity of fusion protein described herein can be achieved by exchanging CM19XA within the plasmid that expresses the protein in a bacterial host. This process is called sub-cloning. Using Restriction Enzymes NdeI and XhoI CM19XA can be substituted by CM19XB, CM19XC or CM19X4 where XA corresponds to JAM-A, XB corresponds to JAM-B, XC corresponds to JAM-C, and X4 corresponds to JAM-4.

A nucleic acid sequence useful for expressing a metastasis inhibiting fusion protein for encoding CM19XA: CD19-JAM A-pHLIP is as follows (SEQ ID NO: 3):

```
   1 gaaaacctgt atttccaggg gcccgaggaa ccctggtgg tgaaagtcga ggagggcgat
  60 aacgctgtcc tgcaatgcct taagggaacg tctgacggcc ccacacaaca attaacatgg
 120 tctcgcgaat ccccttgaa gccctttttg aaactgtcat taggcttgcc cggtcttggg
 180 atccacatgc gtccattagc gatttggctt ttcatcttca atgtctcgca acaaatgggc
 240 ggtttctacc tttgtcaacc tggaccccct agtgaaaaag cgtggcaacc cgggtggact
 300 gtcaatgtcg aaggatctgg cgagcttttc cgttggaacg taagtgactt aggtggactg
 360 ggctgcggtc ttaaaaatcg ctccagcgag ggcccaagta gtccatctgg caaactgatg
 420 tcgccaaagc tttatgtttg ggcaaaagat cgcccagaaa tttgggaagg tgagccgccc
 480 tgcttaccac cccgtgattc tttgaaccaa tcacttagcc aggacttaac tatggcacca
 540 gggagtacgc tttggttgag ttgcggcgtt cctcctgatt cagtctcccg cggccctctg
 600 tcttggacgc acgtccatcc aaagggcccg aagtccctgt taagccttga gttgaaagat
 660 gaccgccctg ctcgcgatat gtgggtcatg gaaacggggt tgcttttacc gcgtgccaca
 720 gcgcaagatg cgggaaaata ttactgccac cgcggaaatt taacgatgtc cttccatttg
 780 gagatcaccg cccgtccggt attgtggcac tggctgctgc gcacaggggg ctggaaaggg
 840 ggatccggtg ggtctggagg aagtggcgga agtggtggat ctggcggtag ttccgtgacg
 900 gtccactcat ctgagccgga agttcgcatt cctgaaaaca ccccgtaaa actgagttgc
 960 gcctattcag ggttttcatc acctcgcgtc gaatggaaat tcgatcaagg tgacaccact
1020 cgcttagtgt gttataacaa caaaatcacg gcgtcatacg aggatcgcgt tactttctta
1081 ccaacaggca tcacctttaa atctgtaaca cgcgaggata caggaaccta tacttgtatg
1141 gtttcggagg agggtgggaa ttcgtacggc gaggtaaaag tcaaattgat tgtgttagtc
1201 ccgccttcaa agcccacggt taatattccc tcgtctgcta caattggtaa ccgcgccgtt
1261 cttacatgct ccgaacaaga tggtagtccg ccctccgaat atacatggtt caaggacggc
1321 atcgtaatgc caacaaatcc gaaaagtaca cgcgctttca gcaattcgtc atacgtctta
1381 aatcccacca ccggcgaatt ggtcttcgat ccactttcag cctctgacac tggtgagtac
1441 tcatgcgagg ctcgtaatgg ctatggtacg ccaatgacaa gtaacgctgt acgcatggag
1501 gcggtcgaac gcaacgttgg agttgcctgt gagcagaatc ccatctactg ggcgcgctat
1561 gcggactggt tattcacgac acccttactg ctgttggact tagcccttct tgttgacgcc
1621 gatgagggaa ctgggtgatg a
```

The translation product from the encoding nucleic acid SEQ ID NO: 3 is SEQ ID NO. 4 (CD19-JAM A-pHLIP):

```
Glu Asn Leu Tyr Phe Gln Gly Pro Glu Glu Pro Leu Val Val Lys Val
1               5                  10                  15

Glu Glu Gly Asp Asn Ala Val Leu Gln Cys Leu Lys Gly Thr Ser Asp
                20                  25                  30

Gly Pro Thr Gln Gln Leu Thr Trp Ser Arg Glu Ser Pro Leu Lys Pro
                35                  40                  45

Phe Leu Lys Leu Ser Leu Gly Leu Pro Gly Leu Gly Ile His Met Arg
        50                  55                  60

Pro Leu Ala Ile Trp Leu Phe Ile Phe Asn Val Ser Gln Gln Met Gly
65                  70                  75                  80
```

-continued

```
Gly Phe Tyr Leu Cys Gln Pro Gly Pro Ser Glu Lys Ala Trp Gln
                 85                  90                  95

Pro Gly Trp Thr Val Asn Val Glu Gly Ser Gly Glu Leu Phe Arg Trp
            100                 105                 110

Asn Val Ser Asp Leu Gly Gly Leu Gly Cys Gly Leu Lys Asn Arg Ser
            115                 120                 125

Ser Glu Gly Pro Ser Pro Ser Gly Lys Leu Met Ser Pro Lys Leu
    130                 135                 140

Tyr Val Trp Ala Lys Asp Arg Pro Glu Ile Trp Glu Gly Glu Pro Pro
145                 150                 155                 160

Cys Leu Pro Pro Arg Asp Ser Leu Asn Gln Ser Leu Ser Gln Asp Leu
                165                 170                 175

Thr Met Ala Pro Gly Ser Thr Leu Trp Leu Ser Cys Gly Val Pro Pro
            180                 185                 190

Asp Ser Val Ser Arg Gly Pro Leu Ser Trp Thr His Val His Pro Lys
            195                 200                 205

Gly Pro Lys Ser Leu Leu Ser Leu Glu Leu Lys Asp Asp Arg Pro Ala
    210                 215                 220

Arg Asp Met Trp Val Met Glu Thr Gly Leu Leu Leu Pro Arg Ala Thr
225                 230                 235                 240

Ala Gln Asp Ala Gly Lys Tyr Tyr Cys His Arg Gly Asn Leu Thr Met
                245                 250                 255

Ser Phe His Leu Glu Ile Thr Ala Arg Pro Val Leu Trp His Trp Leu
            260                 265                 270

Leu Arg Thr Gly Gly Trp Lys Gly Gly Ser Gly Gly Ser Gly Gly Ser
            275                 280                 285

Gly Gly Ser Gly Gly Ser Gly Gly Ser Ser Val Thr Val His Ser Ser
    290                 295                 300

Glu Pro Glu Val Arg Ile Pro Glu Asn Asn Pro Val Lys Leu Ser Cys
305                 310                 315                 320

Ala Tyr Ser Gly Phe Ser Ser Pro Arg Val Glu Trp Lys Phe Asp Gln
                325                 330                 335

Gly Asp Thr Thr Arg Leu Val Cys Tyr Asn Asn Lys Ile Thr Ala Ser
            340                 345                 350

Tyr Glu Asp Arg Val Thr Phe Leu Pro Thr Gly Ile Thr Phe Lys Ser
    355                 360                 365

Val Thr Arg Glu Asp Thr Gly Thr Tyr Thr Cys Met Val Ser Glu Glu
    370                 375                 380

Gly Gly Asn Ser Tyr Gly Glu Val Lys Val Lys Leu Ile Val Leu Val
385                 390                 395                 400

Pro Pro Ser Lys Pro Thr Val Asn Ile Pro Ser Ser Ala Thr Ile Gly
                405                 410                 415

Asn Arg Ala Val Leu Thr Cys Ser Glu Gln Asp Gly Ser Pro Pro Ser
            420                 425                 430

Glu Tyr Thr Trp Phe Lys Asp Gly Ile Val Met Pro Thr Asn Pro Lys
            435                 440                 445

Ser Thr Arg Ala Phe Ser Asn Ser Ser Tyr Val Leu Asn Pro Thr Thr
    450                 455                 460

Gly Glu Leu Val Phe Asp Pro Leu Ser Ala Ser Asp Thr Gly Glu Tyr
465                 470                 475                 480

Ser Cys Glu Ala Arg Asn Gly Tyr Gly Thr Pro Met Thr Ser Asn Ala
                485                 490                 495

Val Arg Met Glu Ala Val Glu Arg Asn Val Gly Val Ala Cys Glu Gln
            500                 505                 510
```

```
Asn Pro Ile Tyr Trp Ala Arg Tyr Ala Asp Trp Leu Phe Thr Thr Pro
        515                 520                 525

Leu Leu Leu Leu Asp Leu Ala Leu Leu Val Asp Ala Asp Glu Gly Thr
        530                 535                 540

Gly
545
```

All proteins are expressed and purified under the same directives of the protocols presented above. The production in small scale and under regular laboratories conditions demonstrate differences among the proteins in regard to yields (mg/L).

| Biologic Name | Yield (mg/L) |
|---|---|
| CM19XA | 1.75 |
| CM19XB | 1.40 |
| CM19XC | 1.35 |
| CM19X4 | 0.99 |

A nucleic acid sequence useful for expressing a metastasis inhibiting fusion protein for encoding CM19XB: CD19-JAM B-pHLIP is as follows (SEQ ID NO: 5):

```
   1 gaaaacctgt atttccaggg gccagaagaa ccgttagtag tgaaagtaga ggaaggtgat
  60 aacgctgttc tgcaatgtct taagggtaca tccgatgggc ccactcagca gttaacttgg
 120 agtcgtgagt caccccttaa gccctttttg aagctttccc ttggcttacc tggactggga
 180 atccacatgc gcccttfggc aatctggctg tttattttta acgtctcaca gcaaatgggg
 240 ggattctatt tgtgccaacc tgggcccccg agtgagaaag cgtggcaacc aggttggacc
 300 gtgaacgttg aaggttcagg tgagttattc cgctggaacg tgtccgacct tggaggctta
 360 ggttgtggct taaagaaccg ttcatcagag gggccctcca gcccagtgg taagctgatg
 420 agtccaaagc tgtacgtgtg ggctaaagat cgtcccgaaa tctgggaagg gaaccaccg
 480 tgtctgcctc ctcgtgacag tttaaaccag tcgctgtcac aggaccttac catggcccct
 540 gggtccacct tatggctgag ttgcggcgtt ccaccggatt cggtttcacg cggccctctg
 600 agttggactc acgtccaccc taaggggccg aaaagcttgt tatcgttgga gctgaaagac
 660 gaccgcccgg ctcgtgatat gtgggtaatg gagacaggat tactttttgcc tcgcgcaact
 720 gcacaagatg cgggtaagta ttactgccac cgtgggaact tgaccatgag cttccacttg
 780 gagattaccg cacgcccggt tttatggcac tggttgttac gtaccggtgg ctggaagggt
 840 ggatcgggcg gctctggggg gagcggcgga tcaggaggta gcggggggtag tttctccgcg
 900 ccgaaagatc agcaagtagt cactgccgta gaatatcagg aggcgattct ggcgtgtaaa
 960 acgcctaaaa agaccgtctc gtcacgtctt gagtggaaga aactgggacg ttctgtttcc
1020 tttgttttact atcaacagac gttgcagggt gatttcaaaa atcgtgctga gatgattgat
1080 ttcaacatcc gtattaagaa cgtcactcgc tctgatgcag ggaaataccg ttgcgaagta
1140 agcgcacctt cggaacaggg ccagaattta gaggaagata cggtgacctt ggaggtgttg
1200 gtagctccgg cagtcccgtc ctgcgaagta ccgagttctg ccctgtcggg gactgttgta
1260 gagcttcgtt gccaagacaa ggaagggaat cctgctccgg aatacacctg gttcaaggat
1320 ggcatccgtc ttctggaaaa cccgcgcctt ggtagccaaa gcacaaactc ctcctacacc
1380 atgaatacta agactggtac gctgcagttc aataccgtga gcaagctgga caccggcgaa
1440 tattcttgtg aggcacgcaa cagcgtcggg tatcgtcgtt gccccggtaa acgcatgcaa
1500 gtagatgact tgaacatttc cgcatgcgag cagaatccca tctactgggc gcgttacgcc
1560 gattggttgt tcacgacgcc gttgctgtta cttgatcttg cgttactggt ggatgcagat
1620 gaaggaacag ggtga
```

The translation product from the encoding nucleic acid SEQ ID NO: 5 is SEQ ID NO: 6 (CD19-JAM B-pHLIP):

```
Glu Asn Leu Tyr Phe Gln Gly Pro Glu Pro Leu Val Val Lys Val
1               5                   10                  15

Glu Glu Gly Asp Asn Ala Val Leu Gln Cys Leu Lys Gly Thr Ser Asp
            20                  25                  30

Gly Pro Thr Gln Gln Leu Thr Trp Ser Arg Glu Ser Pro Leu Lys Pro
        35                  40                  45

Phe Leu Lys Leu Ser Leu Gly Leu Pro Gly Leu Gly Ile His Met Arg
    50                  55                  60

Pro Leu Ala Ile Trp Leu Phe Ile Phe Asn Val Ser Gln Gln Met Gly
65                  70                  75                  80

Gly Phe Tyr Leu Cys Gln Pro Gly Pro Pro Ser Glu Lys Ala Trp Gln
                85                  90                  95

Pro Gly Trp Thr Val Asn Val Glu Gly Ser Gly Glu Leu Phe Arg Trp
            100                 105                 110

Asn Val Ser Asp Leu Gly Gly Leu Gly Cys Gly Leu Lys Asn Arg Ser
        115                 120                 125

Ser Glu Gly Pro Ser Ser Pro Ser Gly Lys Leu Met Ser Pro Lys Leu
    130                 135                 140

Tyr Val Trp Ala Lys Asp Arg Pro Glu Ile Trp Glu Gly Glu Pro Pro
145                 150                 155                 160

Cys Leu Pro Pro Arg Asp Ser Leu Asn Gln Ser Leu Ser Gln Asp Leu
                165                 170                 175

Thr Met Ala Pro Gly Ser Thr Leu Trp Leu Ser Cys Gly Val Pro Pro
            180                 185                 190

Asp Ser Val Ser Arg Gly Pro Leu Ser Trp Thr His Val His Pro Lys
        195                 200                 205

Gly Pro Lys Ser Leu Leu Ser Leu Glu Leu Lys Asp Asp Arg Pro Ala
    210                 215                 220

Arg Asp Met Trp Val Met Glu Thr Gly Leu Leu Leu Pro Arg Ala Thr
225                 230                 235                 240

Ala Gln Asp Ala Gly Lys Tyr Tyr Cys His Arg Gly Asn Leu Thr Met
                245                 250                 255

Ser Phe His Leu Glu Ile Thr Ala Arg Pro Val Leu Trp His Trp Leu
            260                 265                 270

Leu Arg Thr Gly Gly Trp Lys Gly Gly Ser Gly Gly Ser Gly Gly Ser
        275                 280                 285

Gly Gly Ser Gly Gly Ser Gly Gly Ser Phe Ser Ala Pro Lys Asp Gln
    290                 295                 300

Gln Val Val Thr Ala Val Glu Tyr Gln Glu Ala Ile Leu Ala Cys Lys
305                 310                 315                 320

Thr Pro Lys Lys Thr Val Ser Ser Arg Leu Glu Trp Lys Lys Leu Gly
                325                 330                 335

Arg Ser Val Ser Phe Val Tyr Tyr Gln Gln Thr Leu Gln Gly Asp Phe
            340                 345                 350

Lys Asn Arg Ala Glu Met Ile Asp Phe Asn Ile Arg Ile Lys Asn Val
        355                 360                 365

Thr Arg Ser Asp Ala Gly Lys Tyr Arg Cys Glu Val Ser Ala Pro Ser
    370                 375                 380

Glu Gln Gly Gln Asn Leu Glu Glu Asp Thr Val Thr Leu Glu Val Leu
385                 390                 395                 400

Val Ala Pro Ala Val Pro Ser Cys Glu Val Pro Ser Ser Ala Leu Ser
                405                 410                 415
```

```
Gly Thr Val Val Glu Leu Arg Cys Gln Asp Lys Glu Gly Asn Pro Ala
            420                 425                 430

Pro Glu Tyr Thr Trp Phe Lys Asp Gly Ile Arg Leu Leu Glu Asn Pro
        435                 440                 445

Arg Leu Gly Ser Gln Ser Thr Asn Ser Ser Tyr Thr Met Asn Thr Lys
    450                 455                 460

Thr Gly Thr Leu Gln Phe Asn Thr Val Ser Lys Leu Asp Thr Gly Glu
465                 470                 475                 480

Tyr Ser Cys Glu Ala Arg Asn Ser Val Gly Tyr Arg Arg Cys Pro Gly
                485                 490                 495

Lys Arg Met Gln Val Asp Asp Leu Asn Ile Ser Ala Cys Glu Gln Asn
            500                 505                 510

Pro Ile Tyr Trp Ala Arg Tyr Ala Asp Trp Leu Phe Thr Thr Pro Leu
        515                 520                 525

Leu Leu Leu Asp Leu Ala Leu Leu Val Asp Ala Asp Glu Gly Thr Gly
    530                 535                 540
```

A nucleic acid sequence useful for expressing a metastasis inhibiting fusion protein for encoding CM19XC: CD19-JAM C-pHLIP is as follows (SEQ ID NO: 7):

```
   1  gaaaacctgt atttccaggg gcccgaagaa ccccttgtag ttaaagtaga agagggtgac
  60  aatgccgttc ttcagtgttt aaaaggcaca tcagacgggc ccacacagca gttgacatgg
 120  agccgtgaat ccccttgaa gccattttta agctgtcct tagggttacc ggggttaggt
 180  atccacatgc ccccttgc tatctggctt tttatctta acgtatctca gcagatgggg
 240  ggcttctacc tttgccagcc gggtccccct tcagagaaag cctggcagcc gggctggaca
 300  gtcaatgtgg aaggcagcgg cgagttgttt cgctggaatg tctcagatct tggggcttg
 360  gggtgtggcc ttaaaaatcg ctcttcggag ggaccctcaa gcccgagtgg aaaacttatg
 420  tcgcctaagc tttacgtatg ggctaaggac cgccctgaga tttgggaggg agaaccccct
 480  tgtttacctc cccgtgattc gttgaaccaa tctttatccc aggatttaac tatggcgcca
 540  ggatcaactt tatggctgag ctgcggggtg ccccctgact cagtgtcccg cgggcctta
 600  agttggacgc atgtgcaccc taagggggcca aaatcgctgc tgagtttgga gcttaaggat
 660  gatcgcccag cgcgtgatat gtgggtaatg gaaactgggt tgctgttgcc ccgtgcgacc
 720  gctcaggatg ccgggaagta ttattgtcac cgcggcaacc ttaccatgtc atttcatttg
 780  gaaatcaccg cccgcccagt tttgtggcat tggcttttgc gcactggcgg gtggaaggc
 840  ggttcaggag gcagcggcgg tagcggtggt agcggaggtt caggcgggtc ggtaaatctg
 900  aaatcatcga atcgcactcc tgtagttcaa gagtttgaga gcgttgagtt aagctgcatt
 960  attacggata gtcagacatc agatcctcgt atcgagtgga aaagattca ggacgagcaa
1020  actacttacg tcttcttcga caacaaaatt cagggcgact ggctggccg cgcagagatt
1080  ctgggcaaaa ctagccttaa gatctggaac gtcacgcgcc gtgacagtgc attgtaccgc
1140  tgtgaagtgg tggcccgtaa cgaccgcaag gagatcgatg agattgttat tgaattgaca
1200  gttcaggtga agccagtaac cccagtgtgc cgtgtcccaa aggccgtacc ggttggtaaa
1260  atggcaactt tgcattgcca ggagtcagaa ggtcatccgc gcccacacta ttcgtggtat
1320  cgtaatgacg tacccttacc cactgattca cgcgctaatc ctcgcttccg caactcaagt
1380  ttccacttaa attccgaaac tggtacatta gtattcaccg ctgtccacaa ggacgactcg
1440  ggtcaatatt actgtattgc atctaatgac gccggatctg cacgttgcga agagcaggag
```

-continued

```
1500  atggaagtct acgatttaaa tgcttgtgaa caaaatccaa tttattgggc gcgctatgcc 1560  gattggttgt ttacaacgcc gttactgtta ttggatttag ctttacttgt agacgccgat 1620  gagggaacag gatga
```

The translation product from the encoding nucleic acid SEQ ID NO: 7 is SEQ ID NO. 8 (CD19-JAM C-pHLIP):

```
Glu Asn Leu Tyr Phe Gln Gly Pro Glu Glu Pro Leu Val Val Lys Val
1               5                   10                  15

Glu Glu Gly Asp Asn Ala Val Leu Gln Cys Leu Lys Gly Thr Ser Asp
                20                  25                  30

Gly Pro Thr Gln Gln Leu Thr Trp Ser Arg Glu Ser Pro Leu Lys Pro
            35                  40                  45

Phe Leu Lys Leu Ser Leu Gly Leu Pro Gly Leu Gly Ile His Met Arg
    50                  55                  60

Pro Leu Ala Ile Trp Leu Phe Ile Phe Asn Val Ser Gln Gln Met Gly
65                  70                  75                  80

Gly Phe Tyr Leu Cys Gln Pro Gly Pro Pro Ser Glu Lys Ala Trp Gln
                85                  90                  95

Pro Gly Trp Thr Val Asn Val Glu Gly Ser Gly Glu Leu Phe Arg Trp
            100                 105                 110

Asn Val Ser Asp Leu Gly Gly Leu Gly Cys Gly Leu Lys Asn Arg Ser
        115                 120                 125

Ser Glu Gly Pro Ser Ser Pro Ser Gly Lys Leu Met Ser Pro Lys Leu
    130                 135                 140

Tyr Val Trp Ala Lys Asp Arg Pro Glu Ile Trp Glu Gly Glu Pro Pro
145                 150                 155                 160

Cys Leu Pro Pro Arg Asp Ser Leu Asn Gln Ser Leu Ser Gln Asp Leu
                165                 170                 175

Thr Met Ala Pro Gly Ser Thr Leu Trp Leu Ser Cys Gly Val Pro Pro
            180                 185                 190

Asp Ser Val Ser Arg Gly Pro Leu Ser Trp Thr His Val His Pro Lys
        195                 200                 205

Gly Pro Lys Ser Leu Leu Ser Leu Glu Leu Lys Asp Asp Arg Pro Ala
    210                 215                 220

Arg Asp Met Trp Val Met Glu Thr Gly Leu Leu Leu Pro Arg Ala Thr
225                 230                 235                 240

Ala Gln Asp Ala Gly Lys Tyr Tyr Cys His Arg Gly Asn Leu Thr Met
                245                 250                 255

Ser Phe His Leu Glu Ile Thr Ala Arg Pro Val Leu Trp His Trp Leu
            260                 265                 270

Leu Arg Thr Gly Gly Trp Lys Gly Gly Ser Gly Gly Ser Gly Gly Ser
        275                 280                 285

Gly Gly Ser Gly Gly Ser Gly Gly Ser Val Asn Leu Lys Ser Ser Asn
    290                 295                 300

Arg Thr Pro Val Val Gln Glu Phe Glu Ser Val Glu Leu Ser Cys Ile
305                 310                 315                 320

Ile Thr Asp Ser Gln Thr Ser Asp Pro Arg Ile Glu Trp Lys Lys Ile
                325                 330                 335

Gln Asp Glu Gln Thr Thr Tyr Val Phe Phe Asp Asn Lys Ile Gln Gly
            340                 345                 350

Asp Leu Ala Gly Arg Ala Glu Ile Leu Gly Lys Thr Ser Leu Lys Ile
        355                 360                 365
```

-continued

```
Trp Asn Val Thr Arg Arg Asp Ser Ala Leu Tyr Arg Cys Glu Val Val
    370                 375                 380
Ala Arg Asn Asp Arg Lys Glu Ile Asp Glu Ile Val Ile Glu Leu Thr
385                 390                 395                 400
Val Gln Val Lys Pro Val Thr Pro Val Cys Arg Val Pro Lys Ala Val
                405                 410                 415
Pro Val Gly Lys Met Ala Thr Leu His Cys Gln Glu Ser Glu Gly His
                420                 425                 430
Pro Arg Pro His Tyr Ser Trp Tyr Arg Asn Asp Val Pro Leu Pro Thr
            435                 440                 445
Asp Ser Arg Ala Asn Pro Arg Phe Arg Asn Ser Ser Phe His Leu Asn
450                 455                 460
Ser Glu Thr Gly Thr Leu Val Phe Thr Ala Val His Lys Asp Asp Ser
465                 470                 475                 480
Gly Gln Tyr Tyr Cys Ile Ala Ser Asn Asp Ala Gly Ser Ala Arg Cys
                485                 490                 495
Glu Glu Gln Glu Met Glu Val Tyr Asp Leu Asn Ala Cys Glu Gln Asn
                500                 505                 510
Pro Ile Tyr Trp Ala Arg Tyr Ala Asp Trp Leu Phe Thr Thr Pro Leu
            515                 520                 525
Leu Leu Leu Asp Leu Ala Leu Leu Val Asp Ala Asp Glu Gly Thr Gly
530                 535                 540
```

A nucleic acid sequence useful for expressing a metastasis inhibiting fusion protein for encoding CM19X4: CD19-JAM 4-pHLIP is as follows (SEQ ID NO: 9):

```
   1 gaaaacctgt atttccaggg gccagaggaa ccattagtgg ttaaggtaga ggaaggcgat
  60 aatgcagtct tacagtgtct taaaggaact tcagacggcc cgacccaaca gctgacttgg
 120 tctcgtgaaa gcccgttaaa accctttcctt aagctgagcc tgggtttgcc tggtttagga
 180 attcacatgc gtccccttgc gatctggctg tttattttta atgtgtctca gcaaatgggc
 240 gggttttact tgtgtcagcc agggccccca tcggagaagg cttggcaacc cggctggacc
 300 gtgaacgtcg agggtagtgg ggaacttttc cgctggaacg tttccgattt aggcggtctt
 360 ggctgcggcc ttaagaatcg ttcttcggaa gggccgagtt ccccgtctgg aaagctgatg
 420 tcacctaagt tatatgtttg ggccaaggat cgtccagaga tttgggaggg cgagcccccc
 480 tgtctgccgc cacgtgacag cctgaaccag agtttgagcc aggatcttac gatggcccct
 540 gggtcgactc tttggttatc gtgcggggtt ccacccgact cggtttcacg cggcccctta
 600 tcgtggaccc acgtacatcc aaaggggccg aaatcgttat tgagcttgga attaaaagat
 660 gaccgtcctg ctcgcgacat gtgggtaatg gagaccgggc tgctgttacc gcgtgcgact
 720 gctcaagatg ctggcaaata ctattgccac cgtggaaact tgactatgag ctttcacctg
 780 gaaatcacag ctcgccccgt tttatggcac tggttgttac gcacgggcgg ttggaagggg
 840 ggctcaggag gtagcggcgg gtcaggtgga tcgggaggtt ccggcgggag tatggacag
 900 aaagaacgtt caacagccga tacactgcca gatttggagg agtggaagag cgcagctggc
 960 cttcgttggt ggcagacagc cgttgtggat ggttctgggt cagggaatga ggtgattgag
1020 ggaccgcaga atgcacgtgt attgaagggt tcccaggctc gctttaactg caccgtgagc
1080 cagggctgga agctgattat gtgggcactg agcgacatgg tggttctttc agttcgccca
1140 atggagccta tcatcacgaa tgaccgcttc actagtcagc gctatgacca aggggaaac
1200 ttcactagcg agatgatcat ccacaatgtc gagccctctg atagcggaaa tatccgttgt
```

-continued

```
1260 tcactgcaga attcgcgtct tcacgggtct gcgtacctta ccgtccaggt catgggagag 1320 ttatttatcc caagcgtaaa tttggtggta gctgagaatg agccctgtga ggtgacttgt 1380 ctgccctctc attggacccg cttgcccgac atttcatggg aattaggctt gttggtctca 1440 cactcgtctt attactttgt accggaaccc tctgatttgc aatcagcagt ctcaattctg 1500 gctctgactc ctcaatcaaa cggtacgctt acgtgtgttg cgacatggaa aagtctgaaa 1560 gcgcgtaaat ccgcgacagt caatcttact gttattcgct gtccacaaga cacgggtgga 1620 gggattaata tcccaggagt attgtcctct ttaccgtcgc tggggttcag tcttccgaca 1680 tgggggaagg catgcgaaca aaatccaatt tattgggcgc gttatgctga ttggttattt 1740 acaaccccac tgttactgct tgatttggca ctgcttgttg acgctgacga gggcaccggc 1800 tga
```

The translation product from the encoding nucleic acid
SEQ ID NO: 9 is SEQ ID NO. 10 (CD19-JAM 4-pHLIP):

```
Glu Asn Leu Tyr Phe Gln Gly Pro Glu Glu Pro Leu Val Val Lys Val
1               5                   10                  15

Glu glu Gly Asp Asn Ala Val Leu Gln Cys Leu Lys Gly Thr Ser Asp
            20                  25                  30

Gly Pro Thr Gln Gln Leu Thr Trp Ser Arg Glu Ser Pro Leu Lys Pro
            35                  40                  45

Phe Leu Lys Leu Ser Leu Gly Leu Pro Gly Leu Gly Ile His Met Arg
    50                  55                  60

Pro Leu Ala Ile Trp Leu Phe Ile Phe Asn Val Ser Gln Gln Met Gly
65                  70                  75                  80

Gly Phe Tyr Leu Cys Gln Pro Gly Pro Pro Ser Glu Lys Ala Trp Gln
                85                  90                  95

Pro Gly Trp Thr Val Asn Val Glu Gly Ser Gly Glu Leu Phe Arg Trp
            100                 105                 110

Asn Val Ser Asp Leu Gly Gly Leu Gly Cys Gly Leu Lys Asn Arg Ser
            115                 120                 125

Ser Glu Gly Pro Ser Ser Pro Ser Gly Lys Leu Met Ser Pro Lys Leu
        130                 135                 140

Tyr Val Trp Ala Lys Asp Arg Pro Glu Ile Trp Glu Gly Glu Pro Pro
145                 150                 155                 160

Cys Leu Pro Pro Arg Asp Ser Leu Asn Gln Ser Leu Ser Gln Asp Leu
                165                 170                 175

Thr Met Ala Pro Gly Ser Thr Leu Trp Leu Ser Cys Gly Val Pro Pro
            180                 185                 190

Asp Ser Val Ser Arg Gly Pro Leu Ser Trp Thr His Val His Pro Lys
            195                 200                 205

Gly Pro Lys Ser Leu Leu Ser Leu Glu Leu Lys Asp Asp Arg Pro Ala
        210                 215                 220

Arg Asp Met Trp Val Met Glu Thr Gly Leu Leu Leu Pro Arg Ala Thr
225                 230                 235                 240

Ala Gln Asp Ala Gly Lys Tyr Tyr Cys His Arg Gly Asn Leu Thr Met
                245                 250                 255

Ser Phe His Leu Glu Ile Thr Ala Arg Pro Val Leu Trp His Trp Leu
            260                 265                 270

Leu Arg Thr Gly Gly Trp Lys Gly Gly Ser Gly Gly Ser Gly Gly Ser
        275                 280                 285
```

```
Gly Gly Ser Gly Gly Ser Gly Gly Ser Met Gly Gln Lys Glu Arg Ser
            290                 295                 300
Thr Ala Asp Thr Leu Pro Asp Leu Glu Glu Trp Lys Ser Ala Ala Gly
305                 310                 315                 320
Leu Arg Trp Trp Gln Thr Ala Val Val Asp Gly Ser Gly Ser Gly Asn
                325                 330                 335
Glu Val Ile Glu Gly Pro Gln Asn Ala Arg Val Leu Lys Gly Ser Gln
            340                 345                 350
Ala Arg Phe Asn Cys Thr Val Ser Gln Gly Trp Lys Leu Ile Met Trp
        355                 360                 365
Ala Leu Ser Asp Met Val Val Leu Ser Val Arg Pro Met Glu Pro Ile
    370                 375                 380
Ile Thr Asn Asp Arg Phe Thr Ser Gln Arg Tyr Asp Gln Gly Gly Asn
385                 390                 395                 400
Phe Thr Ser Glu Met Ile Ile His Asn Val Glu Pro Ser Asp Ser Gly
                405                 410                 415
Asn Ile Arg Cys Ser Leu Gln Asn Ser Arg Leu His Gly Ser Ala Tyr
            420                 425                 430
Leu Thr Val Gln Val Met Gly Glu Leu Phe Ile Pro Ser Val Asn Leu
        435                 440                 445
Val Val Ala Glu Asn Glu Pro Cys Glu Val Thr Cys Leu Pro Ser His
    450                 455                 460
Trp Thr Arg Leu Pro Asp Ile Ser Trp Glu Leu Gly Leu Leu Val Ser
465                 470                 475                 480
His Ser Ser Tyr Tyr Phe Val Pro Glu Pro Ser Asp Leu Gln Ser Ala
                485                 490                 495
Val Ser Ile Leu Ala Leu Thr Pro Gln Ser Asn Gly Thr Leu Thr Cys
            500                 505                 510
Val Ala Thr Trp Lys Ser Leu Lys Ala Arg Lys Ser Ala Thr Val Asn
        515                 520                 525
Leu Thr Val Ile Arg Cys Pro Gln Asp Thr Gly Gly Ile Asn Ile
    530                 535                 540
Pro Gly Val Leu Ser Ser Leu Pro Ser Leu Gly Phe Ser Leu Pro Thr
545                 550                 555                 560
Trp Gly Lys Ala Cys Glu Gln Asn Pro Ile Tyr Trp Ala Arg Tyr Ala
                565                 570                 575
Asp Trp Leu Phe Thr Thr Pro Leu Leu Leu Leu Asp Leu Ala Leu Leu
            580                 585                 590
Val Asp Ala Asp Glu Gly Thr Gly
        595                 600
```

What is claimed is:

1. A three-domain fusion protein selected from the group consisting of SEQ ID NO: 4, SEQ ID NO: 6, SEQ ID NO: 8, and SEQ ID NO: 10.

2. The three-domain fusion protein of claim 1, wherein the three-domain fusion protein is SEQ ID NO: 4.

3. The three-domain fusion protein claim 1, wherein the three-domain protein is SEQ ID NO: 6.

4. The three-domain fusion protein of claim 1, wherein the three-domain fusion protein is SEQ ID NO: 8.

5. The three-domain fusion protein of claim 1, wherein the three-domain fusion protein is SEQ ID NO: 10.

6. A protein comprising SEQ ID NO: 4, SEQ ID NO: 6, SEQ ID NO: 8, or SEQ ID NO: 10.

7. The protein of claim 6, wherein the protein comprises SEQ ID NO: 4.

8. The protein of claim 6, wherein the protein comprises SEQ ID NO: 6.

9. The protein of claim 6, wherein the protein comprises SEQ ID NO: 8.

10. The protein of claim 6, wherein the protein comprises SEQ ID NO: 10.

11. A pharmaceutically acceptable composition, comprising a pharmaceutically acceptable carrier and at least one protein selected from the group consisting of SEQ ID NO: 4, SEQ ID NO: 6, SEQ ID NO: 8 and SEQ ID NO: 10.

12. The pharmaceutically acceptable composition of claim 11, wherein the at least one protein is SEQ ID NO: 4.

13. The pharmaceutically acceptable composition of claim 11, wherein the at least one protein is SEQ ID NO: 6.

14. The pharmaceutically acceptable composition of claim 11, wherein the at least one protein is SEQ ID NO: 8.

15. The pharmaceutically acceptable composition of claim 11, wherein the at least one protein is SEQ ID NO: 10.

16. The pharmaceutically acceptable composition of claim 11, wherein the composition comprises at least two proteins selected from the group consisting of SEQ ID NO: 4, SEQ ID NO: 6, SEQ ID NO: 8, and SEQ ID NO: 10.

* * * * *